United States Patent
Asano

(10) Patent No.: US 8,242,661 B2
(45) Date of Patent: Aug. 14, 2012

(54) AXIAL GAP ROTARY ELECTRIC MACHINE AND ROTARY DRIVING DEVICE

(75) Inventor: Yoshinari Asano, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 249 days.

(21) Appl. No.: 12/676,093

(22) PCT Filed: Sep. 11, 2008

(86) PCT No.: PCT/JP2008/066404
§ 371 (c)(1),
(2), (4) Date: Mar. 2, 2010

(87) PCT Pub. No.: WO2009/035026
PCT Pub. Date: Mar. 19, 2009

(65) Prior Publication Data
US 2010/0187934 A1    Jul. 29, 2010

(30) Foreign Application Priority Data

Sep. 11, 2007  (JP) ................................ 2007-235389
Feb. 18, 2008  (JP) ................................ 2008-036518

(51) Int. Cl.
*H02K 21/26* (2006.01)
*H02K 21/24* (2006.01)

(52) U.S. Cl. .................................... 310/268; 310/154.04
(58) Field of Classification Search ............. 310/156.32, 310/154.05, 268
See application file for complete search history.

(56) References Cited

U.S. PATENT DOCUMENTS
2006/0273676 A1   12/2006   Naruse et al.

FOREIGN PATENT DOCUMENTS

| EP | 1 830 455 A1 | 9/2007 |
|---|---|---|
| JP | 56-101169 U | 8/1981 |
| JP | 61-185040 A | 8/1986 |
| JP | 2006-204084 A | 8/2006 |
| JP | 2006-353078 A | 12/2006 |

*Primary Examiner* — Burton Mullins
(74) *Attorney, Agent, or Firm* — Birch, Stewart, Kolasch & Birch, LLP.

(57) ABSTRACT

An axial gap rotary electric machine includes a rotor, an armature and a stator. The rotor is a magnetic body, which is capable of rotating in a circumferential direction about a rotation axis. The armature includes an armature coil opposed to the rotor from one side in a rotation axis direction parallel to the rotation axis. The stator causes the armature coil to interlink with a magnetic field flux from the other side in the rotation axis direction via the rotor.

19 Claims, 37 Drawing Sheets

F I G. 9
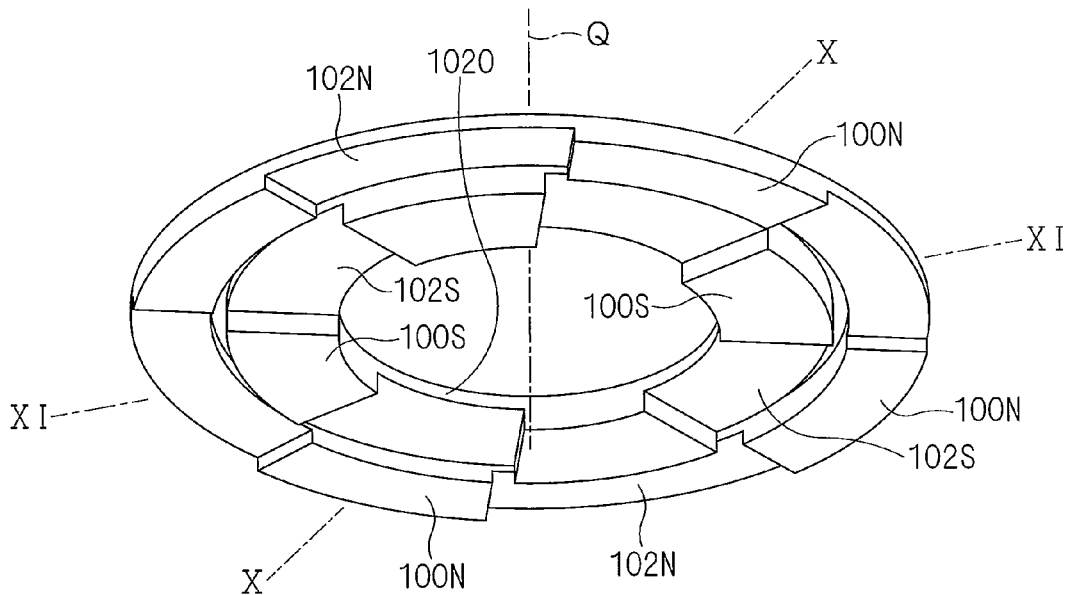
F I G. 1 0
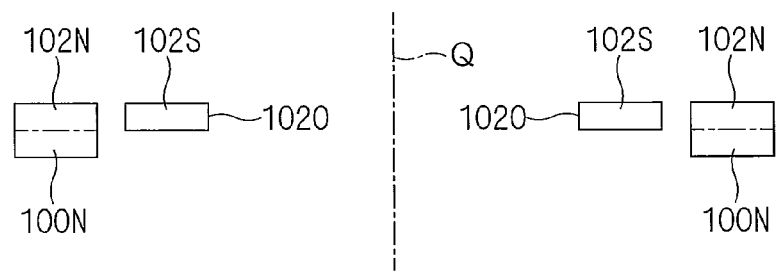
F I G. 1 1
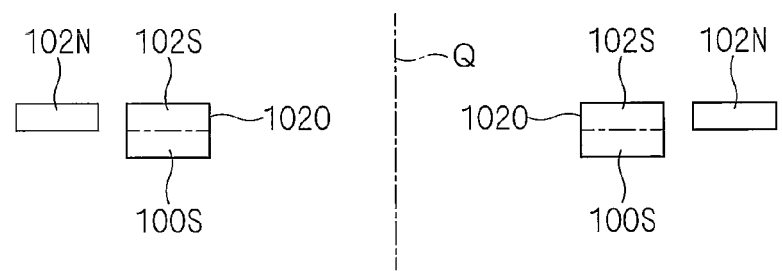

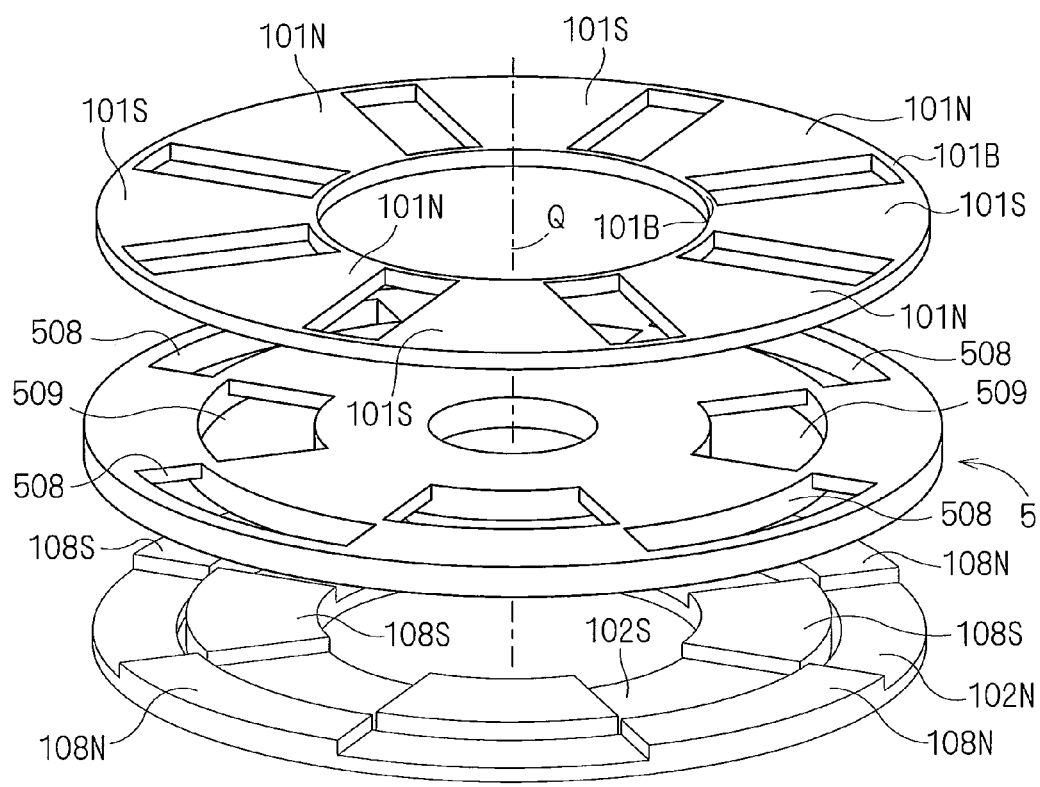
F I G . 2 0

F I G. 4 5
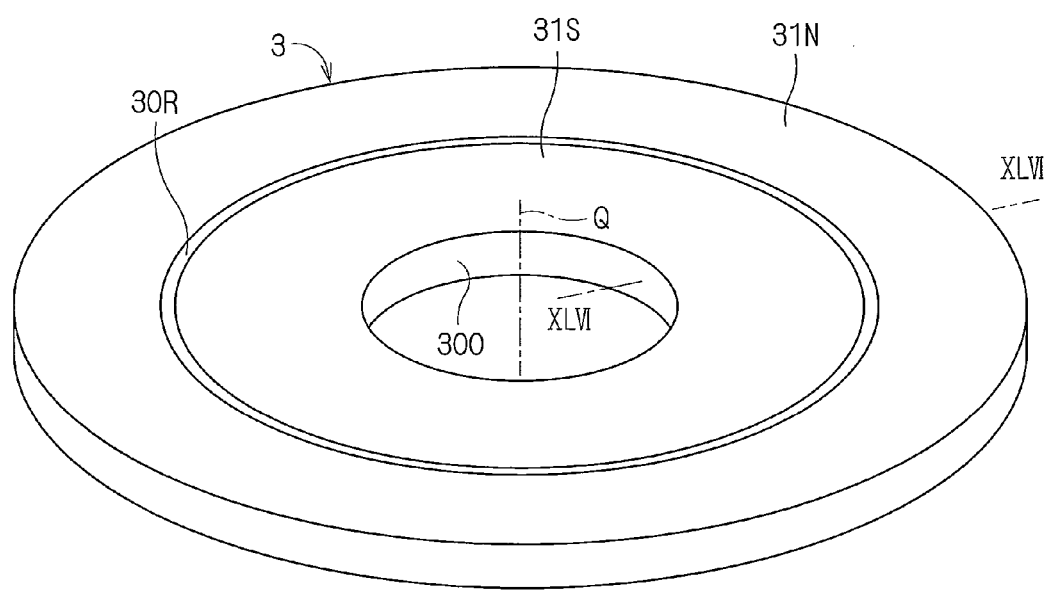
F I G. 4 6
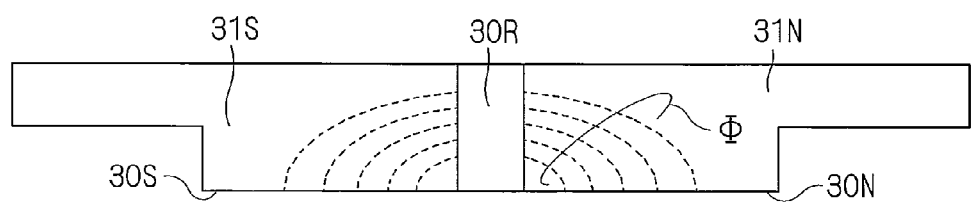

F I G. 4 7
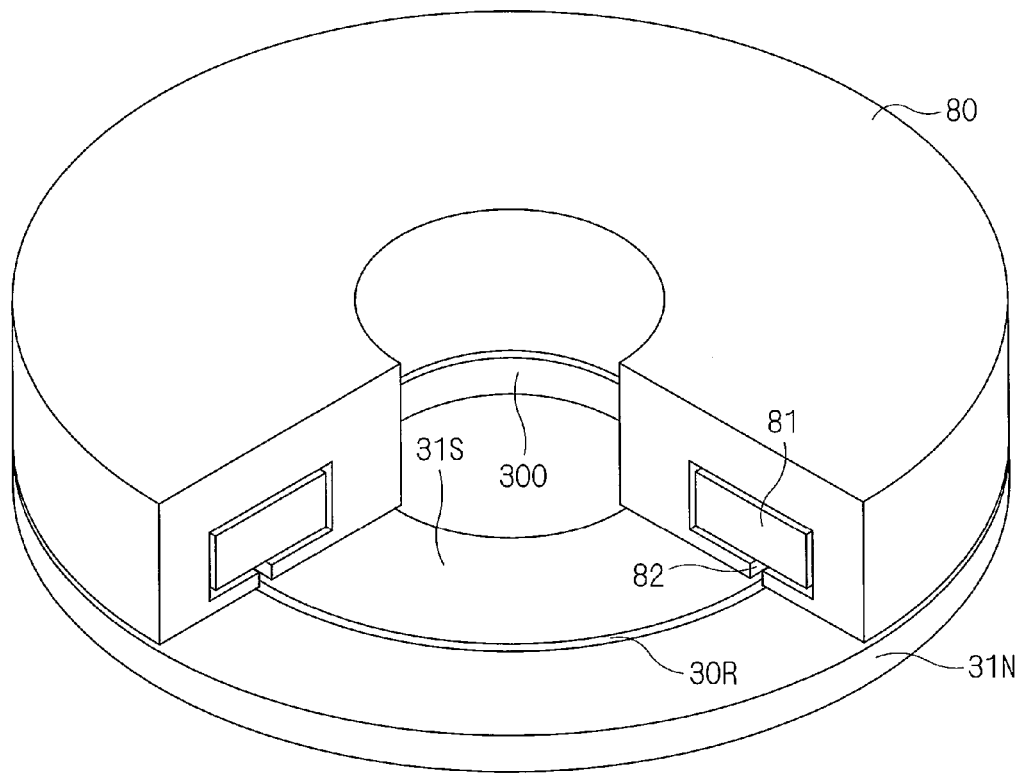
F I G. 4 8
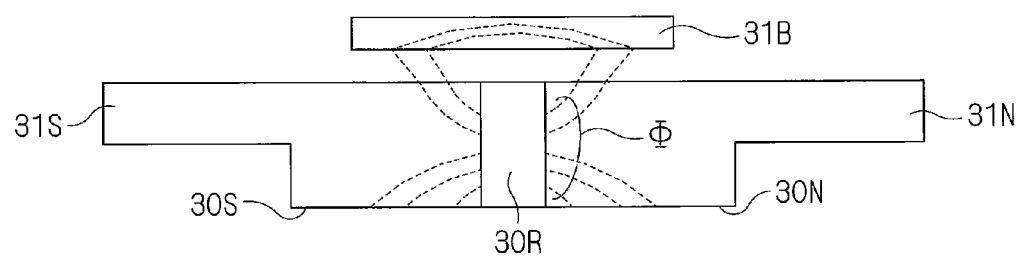

34 : FIN

24 : BEARING

AXIAL GAP ROTARY ELECTRIC MACHINE AND ROTARY DRIVING DEVICE

TECHNICAL FIELD

The present invention relates to an axial gap rotary electric machine.

BACKGROUND ART

In an axial gap rotary electric machine (hereinafter, merely referred to as "rotary electric machine"), a stator and a rotor are disposed with a gap along a rotation axis. Such a configuration has the following advantages. That is, it is possible to increase a magnetic pole surface of a permanent magnet for generating a magnetic field flux, to increase a space factor of a coil with ease, and to increase torque or output in proportion to a size even when slimming down is aimed in a rotation axis direction.

In the rotary electric machine, an attraction force (referred to as "thrust force" herein) acts between the stator and the rotor along a direction parallel to the rotation axis (referred to as "rotation axis direction" herein). This attraction force incurs problems such as an increase in bearing loss and a reduction in bearing life.

In order to prevent a force acting in a thrust axis direction, the following configurations may be employed in the rotary electric machine. For example, two rotors are provided on both sides of one stator along the rotation axis direction. Alternatively, two stators are provided on both sides of one rotor along the rotation axis direction. A pair of thrust forces in directions opposed to each other are generated along the rotation axis direction in any of the above-mentioned two types of configurations, leading to a reduction in thrust force generated in the rotation axis direction as a whole.

Documents related to the present application are as follows.

DISCLOSURE OF INVENTION

Problems to be Solved by the Invention

However, the configuration of the bearing becomes complicated with the configuration in which two rotors are provided. In addition, the rotation axis becomes longer, which causes such a problem that torsional vibrations are easily generated.

In Japanese Patent Application Laid-Open No. 2006-353078, two rotors are provided, and a permanent magnet is provided in one of them. However, the above-mentioned problems cannot be solved because two rotors are provided.

Further, an armature is employed for a conventional stator, and accordingly there are two back yokes, where an alternating magnetic field is generated, in the configuration in which two stators are provided. The generation of the alternating magnetic field in the back yoke causes iron loss and, in particular, hysteresis loss, and therefore it is not desired to increase the number of back yokes of an armature.

An object of the present invention is therefore to provide, in an axial gap rotary electric machine, a technology of preventing an increase in the number of back yokes in which an alternating magnetic field is generated while reducing a thrust force by providing stators on both sides along a rotation axis of a rotor. Another object thereof is to reduce an effect of a demagnetizing field acting on a permanent magnet which causes a magnetic field flux. Still another object thereof is to adjust a magnetic field flux with ease.

Means to Solve the Problem

A first aspect of an axial gap rotary electric machine of the present invention includes: a rotor (1) being a magnetic body and capable of rotating in a circumferential direction about a rotation axis (Q); an armature (2) including an armature coil (22) opposed to the rotor from one side in a rotation axis direction parallel to the rotation axis; and a stator (3) causing the armature coil to be interlinked with a magnetic field flux via the rotor from another side in the rotation axis direction.

According to a second aspect of the axial gap rotary electric machine of the present invention, in the first aspect, the rotor (1) includes: a first magnetic ring (102N) supplied with the magnetic field flux of a first polarity from the stator (3); a second magnetic ring (102S) disposed on a side closer to the rotation axis (Q) compared with the first magnetic ring and supplied with the magnetic field flux of the second polarity from the stator; a first magnetic plate (100N; 101N) circularly disposed in the circumferential direction so as to be opposed to the armature (2), magnetically separated from the second magnetic ring, and magnetically coupled to the first magnetic ring; and a second magnetic plate (100S, 101S) circularly disposed so as to be opposed to the armature with positions thereof in the circumferential direction alternating with the first magnetic plate, magnetically separated from the first magnetic ring and the first magnetic plate, and magnetically coupled to the second magnetic ring.

According to a third aspect of the axial gap rotary electric machine of the present invention, in the second aspect, a side opposite to the rotation axis of the first magnetic plate (101N) is coupled to the first magnetic ring (102N) and extends in a radial direction so as to reach the armature (2) side of the second magnetic ring (102S). The rotation axis side of the second magnetic plate (101S) is coupled to the second magnetic ring and extends so as to reach the armature side of the first magnetic ring.

According to a fourth aspect of the axial gap rotary electric machine of the present invention, in the second or third aspect, the stator (3) includes: a first magnetic pole surface (30N) supplying the first magnetic ring (102N) with the magnetic field flux of the first polarity; a second magnetic pole surface (30S) supplying the second magnetic ring (102S) with the magnetic field flux of the second polarity; and permanent magnets (30A, 30R) supplying the first magnetic pole surface and the second magnetic pole surface with the magnetic field flux.

According to a fifth aspect of the axial gap rotary electric machine of the present invention, in the fourth aspect, the permanent magnet (30R) has a circular shape around the rotation axis (Q) and is magnetized in the radial direction with respect to the rotation axis; the stator (3) further includes a first core (31N) and a second core (31S) covering the permanent magnet from an outer circumferential side and an inner circumferential side, respectively; and the first core and the second core show the first magnetic pole surface (30N) and the second magnetic pole surface (30S), respectively.

According to a sixth aspect of the axial gap rotary electric machine of the present invention, in the fifth aspect, the stator (3) further includes a third core (31B) for partially short-circuiting a magnetic flux generated from the permanent magnet (30R) by magnetically coupling the first core (31N) and the second core (31S) to each other from a side opposite to the rotor (1).

According to a seventh aspect of the axial gap rotary electric machine of the present invention, in the fourth aspect, the permanent magnet (30A) shows at least any one of the first magnetic pole surface (30N) and the second magnetic pole surface (30S).

According to an eighth aspect of the axial gap rotary electric machine of the present invention, in the seventh aspect, the permanent magnet (30A) is circularly disposed in the circumferential direction.

According to a ninth aspect of the axial gap rotary electric machine of the present invention, in the eighth aspect, the permanent magnet (30A) shows both of the first magnetic pole surface (30N) and the second magnetic pole surface (30S). The stator (3) further includes: a first auxiliary core (33N) disposed so as to be opposed to the first magnetic ring (102N) and magnetically coupled to the first magnetic pole surface (30N); and a second auxiliary core (33S) disposed so as to be opposed to the second magnetic ring (102S) and magnetically coupled to the second magnetic pole surface (30S).

According to a tenth aspect of the axial gap rotary electric machine of the present invention, in the fourth aspect, the permanent magnet (30A) shows any one of the first magnetic pole surface (30N) and the second magnetic pole surface (30S). The stator (3) further includes a yoke (30Y) magnetically coupled to the permanent magnet (30A) and showing another of the first magnetic pole surface (30N) and the second magnetic pole surface (30S).

According to an eleventh aspect of the axial gap rotary electric machine of the present invention, in any one of the fourth to tenth aspects, the stator (3) further includes a magnetic field coil (32) wound in the circumferential direction.

According to a twelfth aspect of the axial gap rotary electric machine of the present invention, in the fourth aspect, the rotor (1) further includes a plurality of magnetic bodies (101Q) circularly disposed so as to be opposed to the armature with positions thereof in the circumferential direction alternating with the first magnetic plate (100N; 101N) and the second magnetic plate (100S, 101S), and magnetically coupled to each other while being magnetically separated from the first magnetic ring (102N) and the second magnetic ring (102S).

According to a thirteenth aspect of the axial gap rotary electric machine of the present invention, in the twelfth aspect, the rotor (1) further includes a magnetic ring (101Qa) coupling the plurality of magnetic bodies (101Q) to each other in the circumferential direction on the side opposite to the rotation axis (Q).

According to a fourteenth aspect of the axial gap rotary electric machine of the present invention, in the twelfth aspect, the rotor (1) further includes a magnetic ring (101Qc) coupling the plurality of magnetic bodies (101Q) to each other in the circumferential direction between the first magnetic ring (102N) and the second magnetic ring (102S).

According to a fifteenth aspect of the axial gap rotary electric machine of the present invention, in the twelfth aspect, the rotor (1) further includes a magnetic ring (101Qb) coupling the plurality of magnetic bodies (101Q) to each other in the circumferential direction on the side opposite to of the rotation axis (Q).

According to a sixteenth aspect of the axial gap rotary electric machine of the present invention, in the twelfth aspect, the stator (3) further includes a projection (30Q) being in proximity to the plurality of magnetic bodies (101Q).

According to a seventeenth aspect of the axial gap rotary electric machine of the present invention, in any of the first to fifteenth aspects, the stator (3) includes: a magnetic field coil (32) wound in the circumferential direction, for generating the magnetic field flux; and a magnetic field yoke (31) sandwiching the magnetic field coil between an inner circumferential side and an outer circumferential side thereof, which are coupled to each other on a side opposite to said rotor.

A first aspect of a rotary driving device of the present invention includes: the axial gap rotary electric machine according to any one of the fourth to sixteenth aspects; a rotation shaft (8) coupled to the rotor (1) while being apart from the stator (3); and an engine (9) disposed on a side opposite to the rotor with respect to the armature (2) along the rotation axis direction, and coupled to the rotation shaft to provide and receive rotational movement with the rotation shaft. The armature is provided with a through hole (200) causing the rotation shaft to penetrate therethrough without hampering rotation of the rotation shaft.

According to a second aspect of the rotary driving device of the present invention, in the first aspect, an end of the rotation shaft (8) on the stator (3) side retracts to the engine (9) side in the rotation axis direction with respect to the stator.

According to a third aspect of the rotary driving device of the present invention, in the first or second aspect, the stator (3) is provided with a heat radiation member (34).

Effects of the Invention

According to the first aspect of the axial gap rotary electric machine of the present invention, the source of the magnetic field flux is provided in the stator, which reduces iron loss in the stator, is resistant to demagnetization by the magnetic field generated from the armature, and cancels a thrust force along the rotation axis direction.

According to the second and third aspects of the axial gap rotary electric machine of the present invention, it is possible to easily increase the number of magnetic poles of the rotor while obtaining the source of the magnetic field flux with a simple configuration.

According to the seventeenth aspect of the axial gap rotary electric machine of the present invention, adjustment of the magnetic field flux is facilitated by adjusting a current caused to flow through the magnetic field coil.

In particular, in a case where the permanent magnets according to the fourth aspect are provided in the seventeenth aspect, it is possible to perform a high-speed operation by performing field weakening or increase the magnetic field flux for increasing torque at low-speed operation, used as a motor. This means that a high-speed operation and a low-speed operation with high efficiency are made compatible with each other, which is particularly suitable for an on-vehicle motor. Alternatively, when it is used as a generator, it is possible to generate required voltage irrespective of the number of revolutions by adjusting the magnetic field flux in accordance with fluctuations of the number of revolutions, which is particularly suitable for an on-vehicle alternator. Still alternatively, when it is used as a train motor, it is possible to reduce the magnetic field flux in a coasting operation in which relatively long driving is performed.

An aspect in which the permanent magnets are not provided in the seventeenth aspect is suitable for being used as a train motor. Cogging torque is not generated during the coasting operation because it does not function as a generator, and thus smooth rotation is made.

According to the fourth aspect of the axial gap rotary electric machine of the present invention, the source of the magnetic field flux is achieved by the permanent magnet with a simple configuration, which decreases the current. Accordingly, miniaturization and high output can be achieved.

According to the fifth aspect of the axial gap rotary electric machine of the present invention, the permanent magnet is easily obtained by magnetization from the side opposite to the rotor even after the rotary electric machine is assembled.

According to the sixth aspect of the axial gap rotary electric machine of the present invention, the magnetic field flux supplied to the rotor is reduced by the third core, whereby field weakening is achieved.

According to the seventh aspect of the axial gap rotary electric machine of the present invention, the magnetic field flux is easily increased by designing the magnetic pole surface of the permanent magnet to be large.

According to the eighth aspect of the axial gap rotary electric machine of the present invention, in particular, a permanent magnet having a large energy product is easily manufactured.

According to the ninth aspect of the axial gap rotary electric machine of the present invention, the first auxiliary core and the second auxiliary core supply the rotor with the magnetic field flux which is uniform in the circumferential direction even when the permanent magnet is divided in the circumferential direction.

According to the tenth aspect of the axial gap rotary electric machine of the present invention, it is possible to reduce the number of permanent magnets. Further, the permanent magnet is easily obtained by magnetization in only one direction using an air-core coil even after the rotary electric machine is used.

According to the eleventh aspect of the axial gap rotary electric machine of the present invention, adjustment of the magnetic field flux, for example, field weakening is performed easily by adjusting a current caused to flow through the magnetic field coil.

According to the twelfth to sixteenth aspects of the axial gap rotary electric machine of the present invention, an inductance in a so-called q-axis direction is increased, whereby reluctance torque is easily obtained.

In particular, according to the fifteenth aspect thereof, there is an advantage in that a magnetic path for coupling the magnetic bodies to each other is short.

Further, according to the sixteenth aspect thereof, there is no need to provide the configuration for coupling the magnetic bodies to each other in the rotor, with the result that an attraction force acting between the armature and the rotor in the rotation axis direction is reduced.

According to the first to third aspects of the rotary driving device of the present invention, even if heat of the engine is conducted to the rotation shaft, the heat is difficult to be conducted to the stator because the rotation shaft is apart from the stator, which makes it difficult to generate heat demagnetization of the permanent magnet.

In particular, according to the second aspect thereof, heat conduction from the engine to the stator via the rotation shaft is effectively reduced.

Further, according to the third aspect thereof, heat radiation from the stator is effectively performed, which makes it more difficult to generate heat demagnetization.

The object, features, aspects, and advantages of the present invention will be more apparent from the following detailed description in conjunction with the attached drawings.

BRIEF DESCRIPTION OF DRAWINGS

FIG. 9 is another perspective view showing the configuration of the rotor;

FIG. 10 shows a cross-section of the rotor at a position X-X of FIG. 9;

FIG. 11 shows a cross-section of the rotor at a position XI-XI of FIG. 9;

FIG. 20 is a perspective view showing a fourth modification of the rotor;

FIGS. 44 and 45 are perspective views showing a seventh modification of the stator;

FIG. 46 shows a cross-section of the stator at a position XLVI-XLVI of FIG. 45;

FIG. 47 is a perspective view showing a method of magnetizing a permanent magnet;

FIG. 48 is a configuration for weakening a magnetic field flux in the seventh modification of the stator;

FIGS. 53 to 71 are cross-sectional views partially showing the rotor and the stator;

BEST MODE FOR CARRYING OUT THE INVENTION

First Embodiment

Figure 1:
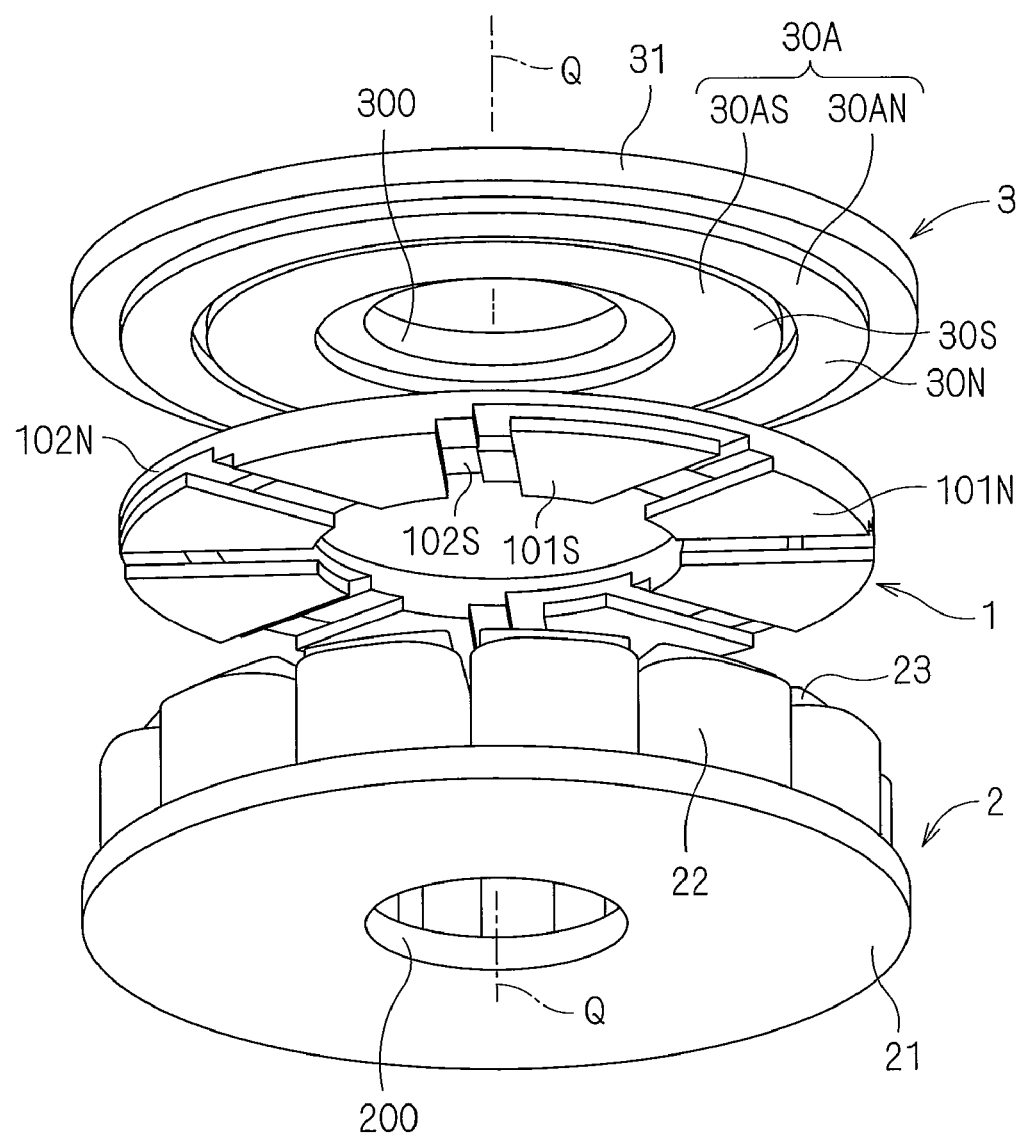
FIGS. 1 and 2 are perspective views showing a configuration of a rotary electric machine according to a first embodiment of the present invention.
Figure 2:
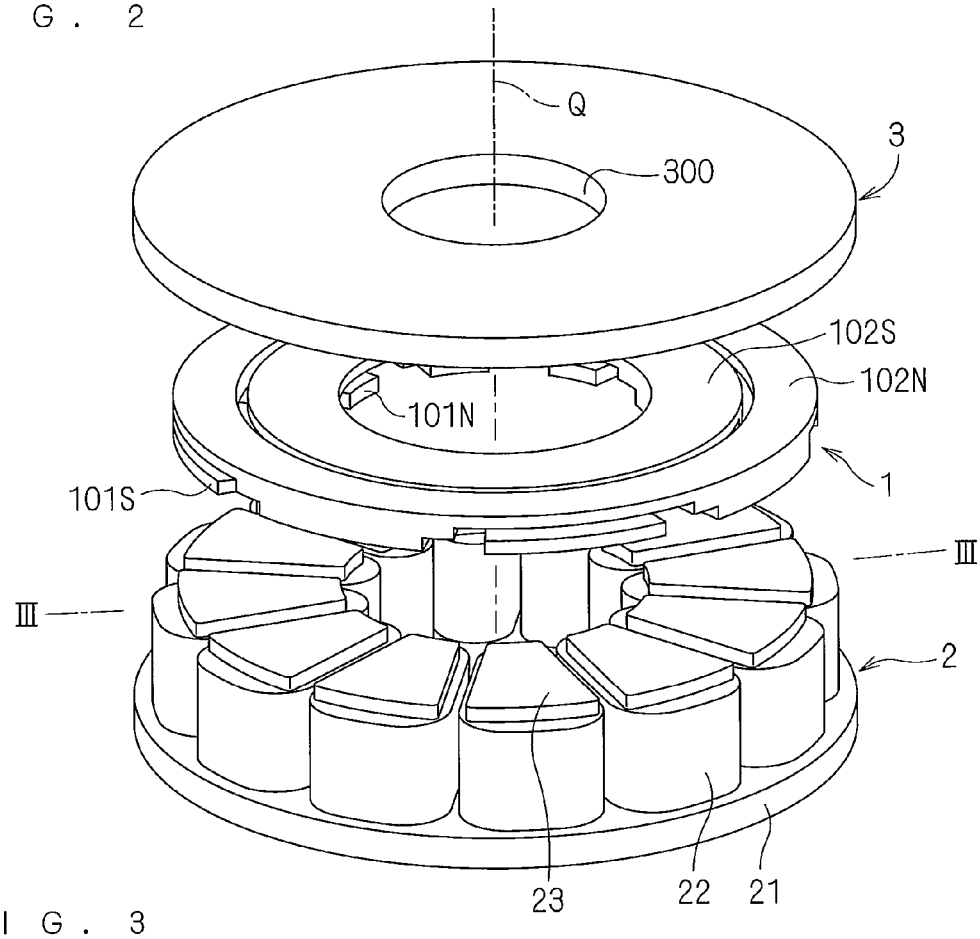

FIG. 1 and FIG. 2 are perspective views showing a configuration of a rotary electric machine according to a first embodiment of the present invention. The rotary electric machine includes a rotor 1, an armature 2 and a stator 3. For clarification of the configuration, intervals (commonly referred to as "air gaps") between ones of the rotor 1, the armature 2 and the stator 3 along a rotation axis Q are highlighted in FIG. 1 and FIG. 2.

The rotor 1 is a magnetic body and is capable of rotating in a circumferential direction about the rotation axis Q. FIG. 1 is the perspective view which is viewed from the armature 2 side with a tilt with respect to the rotation axis Q, and FIG. 2 is the perspective view which is viewed from the stator 3 side with a tilt with respect to the rotation axis Q. Note that drawings of the rotor 1 show only the magnetic body unless otherwise noted, and structural members for holding the magnetic body are omitted.

Figure 3:
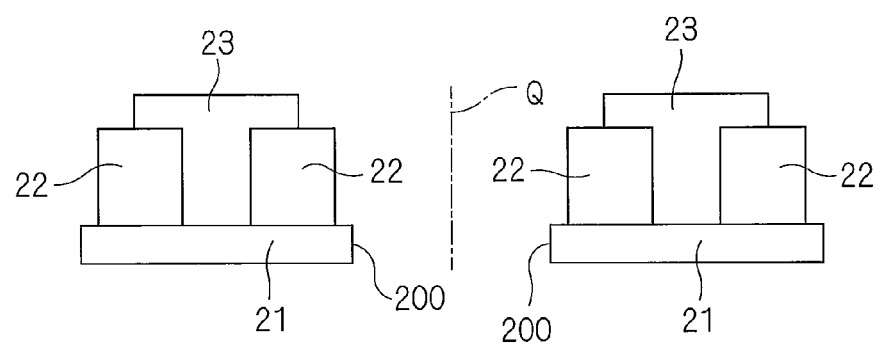
FIG. 3 shows a cross-section of an armature at a position III-III of FIG. 2.
Figure 4:
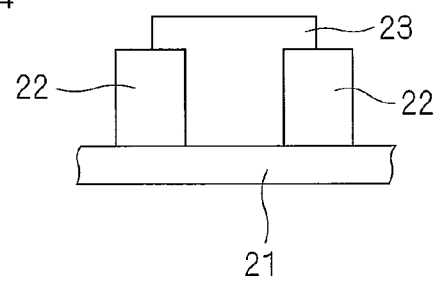
FIG. 4 shows a cross-section of the armature along a circumferential direction.

The armature 2 is opposed to the rotor 1 from one side (lower side in FIG. 1) in the rotation axis direction. The armature 2 includes a yoke 21, teeth 23 and an armature coil 22. FIG. 3 is a cross-sectional view showing a cross-section of the armature 2 at a position III-III of FIG. 2, which includes the rotation axis Q and is parallel thereto. Further, FIG. 4 is a cross-sectional view showing a cross-section of the armature 2 in a vicinity of a center of the teeth 23 in a radial direction. This cross-section is along the circumferential direction. In FIG. 3 and FIG. 4, the teeth 23 are widened on the air gap side. This is for transferring the magnetic flux of the rotor as much as possible to the armature. These configurations are not necessarily required.

The teeth 23 are provided to the yoke 21 on the rotor 1 side, and are circularly disposed around the rotation axis Q. The armature coil 22 is wound around the teeth 23. Therefore, the armature coil 22 is circularly disposed around the rotation axis Q as well. Here, the armature coil 22 shows so-called concentrated winding in which the armature coil 22 is wound around each of the teeth 23, but the armature coil 22 may be wound by distributed winding. That is, the armature 2 is capable of adapting an armature (wound stator) of a publicly-known rotary electric machine.

Note that unless particularly noted in the present application, the armature coil 22 refers to a mode in which wires are wound as a whole, not to each wire constituting this. This holds true for the drawings as well. Leading lines in start and end of winding and wire connection thereof are also omitted in the drawings.

The armature 2 typically functions as a stator with the yoke 21 fixed to an outside thereof. The yoke 21 is formed of, for example, an electromagnetic steel plate in which one long electromagnetic steel plate is wound and layered into a hoop shape in parallel to the rotation axis direction (hereinafter referred to as "wound core"), electromagnetic steel plates laminated in the circumferential direction, electromagnetic steel plates laminated in the rotation axis direction, or a dust core. In the case where the yoke 21 is formed of the electromagnetic steel plates laminated in the rotation axis direction or the dust core, it may be divided into a plurality of pieces in the circumferential direction.

Alternatively, the yoke 21 may double as a part of a mechanism to which the rotary electric machine is applied. For example, in a case where the rotary electric machine is applied to a compressor as a motor, the yoke 21 may function as a part of a frame of the compressor. The armature 2 is provided with a through hole 200 for causing a rotation shaft (not shown) provided in the rotor 1 to penetrate therethrough.

The stator 3 is opposed to the rotor 1 from the other side (upper side in FIG. 1) in the rotation axis direction. The stator 3 is provided with a hole 300 for causing the rotation shaft (not shown) provided in the rotor 1 to penetrate therethrough.

The stator 3 causes the armature coil 22 to interlink with the magnetic field flux via the rotor 1. That is, the stator 3 is provided with magnetic field flux generating means. With reference to FIG. 1, the stator 3 includes a magnetic pole surface 30N for supplying the rotor 1 with the magnetic field flux of the first polarity (for example, N pole), and a magnetic pole surface 30S for supplying the rotor 1 with the magnetic field flux of a second polarity (for example, S pole). That is, in the present embodiment, the stator 3 functions not as an armature, but as a source of the magnetic field flux for causing the rotor 1 to function as a field element. Here, there is illustrated a case in which the magnetic pole surface 30S is disposed on a side closer to the rotation axis Q compared with the magnetic pole surface 30N.

The armature 2 (which also functions as a stator) and the stator 3 are provided on both sides of the rotor 1 in this manner, and thus a thrust force along the rotation axis direction is canceled. In addition, the source of the magnetic field flux is provided in the stator 3, whereby the alternating magnetic flux does not flow in the stator 3. Therefore, compared with a case where two armatures are provided, iron loss in the armature decreases as a whole.

The rotor 1 is not provided with a source of a magnetic field flux, and accordingly a structure in which the source (for example, permanent magnet described below) is held against a centrifugal force is not required.

The stator 3 includes a permanent magnet 30A. Here, the permanent magnet 30A is composed of permanent magnets 30AN and 30AS. A magnetic pole surface of the permanent magnet 30AN on the rotor 1 side is a magnetic pole surface 30N, and a magnetic pole surface of the permanent magnet 30AS on the rotor 1 side is a magnetic pole surface 30S.

From the viewpoint of reducing a magnetic resistance of a magnetic path through which the magnetic field flux generated in the permanent magnets 30AN and 30AS flows, the stator 3 desirably includes a yoke 31 formed of a magnetic body. Specifically, the yoke 31 short-circuits in magnetic pole surfaces of the permanent magnets 30AN and 30AS on a side opposite to the rotor 1.

Figure 5:
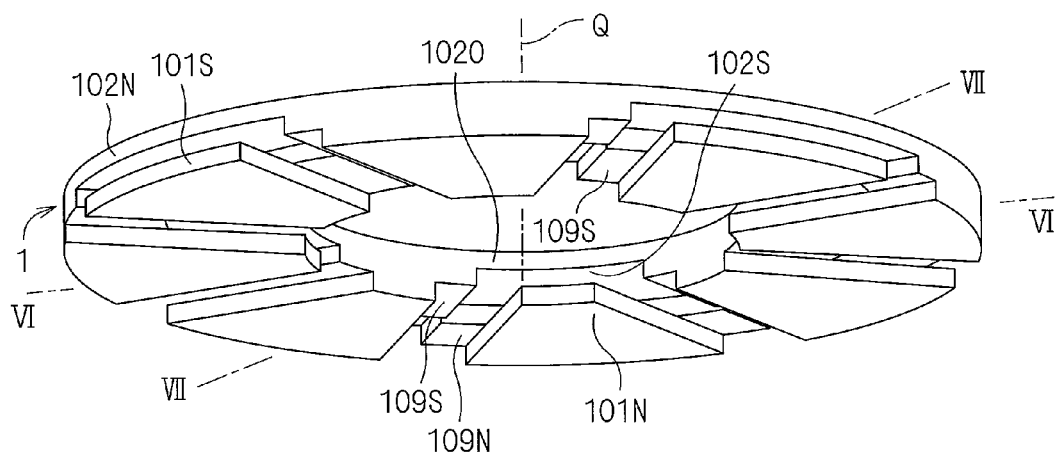
FIG. 5 shows a perspective view showing a configuration of a rotor.
Figure 6:
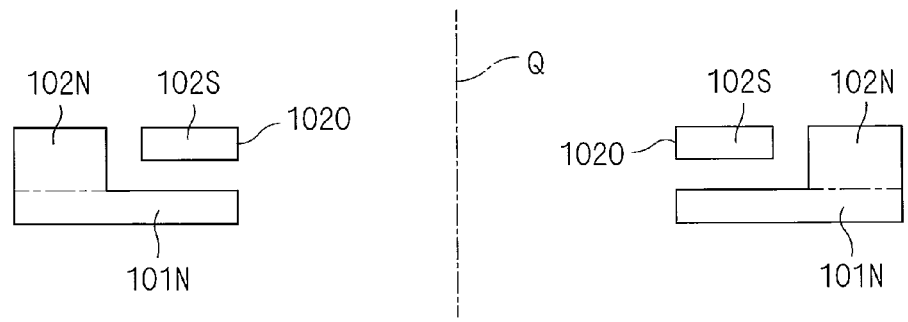
FIG. 6 shows a cross-section of the rotor at a position VI-VI of FIG. 5.
Figure 7:
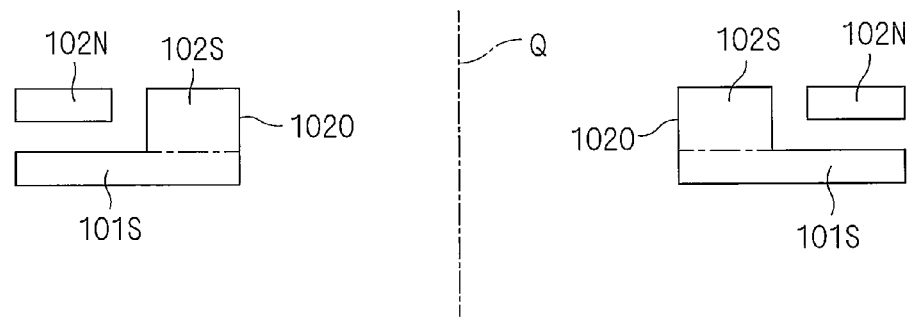
FIG. 7 shows a cross-section of the rotor at a position VII-VII of FIG. 5.

FIG. 5 is a perspective view showing the configuration of the rotor 1. FIG. 6 and FIG. 7 are cross-sectional views showing cross-sections of the rotor 1 at a position VI-VI and a position VII-VII of FIG. 5, respectively. FIG. 6 and FIG. 7 each show the cross-section which includes the rotation axis Q and is parallel thereto.

The rotor 1 includes magnetic plates 101N and 101S and magnetic rings 102N and 102S. The magnetic ring 102S is disposed on a side closer to the rotation axis Q compared with the magnetic ring 102N. The magnetic rings 102N and 102S are supplied with the magnetic field flux from the magnetic pole surfaces 30N and 30S, respectively. An inner circumferential surface 1020 of the magnetic ring 102S is fixed by a holding member formed of a non-magnetic body, which is provided with a hole for causing the rotation shaft (not shown) to penetrate therethrough and fixing.

The magnetic plates 101N and 101S are disposed so as to be opposed to the armature 2. The magnetic plates 101N and the magnetic plates 101S are circularly disposed so that positions thereof in the circumferential direction alternate with each other. The magnetic plate 101N is magnetically separated from the magnetic ring 102S and is magnetically coupled to the magnetic ring 102N. The magnetic plate 101S is magnetically separated from the magnetic ring 102N and is magnetically coupled to the magnetic ring 102S.

A large area is taken for the magnetic pole surface of the rotor 1, and thus the magnetic plates 101N and 101S occupy positions substantially equal to each other in the radial direction. Specifically, an outer circumferential side of the magnetic plate 101N is coupled to the magnetic ring 102N. In addition, the magnetic plate 101N extends in the radial direction so that an inner circumferential side thereof reaches the armature 2 side of the magnetic ring 102S. In the similar manner, an inner circumferential side of the magnetic plate 101S is coupled to the magnetic ring 102S. In addition, the magnetic plate 101S extends in the radial direction so that an outer circumferential side thereof reaches the armature 2 side of the magnetic ring 102N.

In order to achieve a balance of the magnetic field flux, a distance between the magnetic plate 101N and the armature 2 and a distance between the magnetic plate 101S and the armature 2 in the rotation axis direction are desirably selected to be equal to each other.

In order to prevent the situation in which the magnetic field flux flows in the rotor 1 in a short-circuit manner, which prevents internlinkage of the armature 2 with the armature coil 22, the following point is to be noted in terms of a size. That is, a distance between the magnetic plate 101S and the magnetic ring 102N in the rotation axis direction and a distance between the magnetic plate 101N and the magnetic ring 102S in the rotation axis direction are respectively twice as large as the distances between the magnetic plates 101N and the armature 2 and the distance between the magnetic plate 101S and the armature 2. In other words, the distances between the magnetic plates 101N and the armature 2 and the distance between the magnetic plate 101S and the armature 2, which are highlighted in FIG. 1 and FIG. 2, are in actuality, are respectively less than a half of the distance between the magnetic plate 101S and the magnetic ring 102N in the rotation axis direction and the distance between the magnetic plate 101N and the magnetic ring 102S in the rotation axis direction.

The rotor 1 is configured as described above, and accordingly the number of magnetic poles of the rotor 1 is increased more easily while obtaining the source of the magnetic field flux with a simple configuration. More specifically, though it is only required to increase the number of the magnetic plates 101N and 101S for increasing the number of magnetic poles of the rotor 1, the number of the magnetic rings 102N and 102S are not required to be increased for such modification. Further, there are minor changes in magnetic flux of the magnetic pole surfaces 30N and 30S and the magnetic rings 102N and 102S even when the rotor 1 rotates.

When the permanent magnet 30A is employed, the source of the magnetic field flux is achieved with a simple configuration or, in this case, by the permanent magnets 30AN and 30AS having a ring shape. The respective permanent magnets 30AN and 30AS are only required to be magnetized in the rotation axis direction with the same polarity irrespective of the position in the circumferential direction even when the number of the magnetic plates 101N and 101S are increased for increasing the number of magnetic poles of the rotor 1. Accordingly, magnetization is facilitated. Moreover, there is no occurrence of leakage flux between magnetic poles of opposite polarities which are adjacent to each other in the same permanent magnet, nor insufficient magnetization in a vicinity of a boundary between magnetic poles.

Further, the magnetic pole surfaces 30N and 30S of the permanent magnets 30AN and 30AS are designed to be large to increase the magnetic field flux with more ease. However, areas of the magnetic pole surfaces 30N and 30S are desirably made equal to each other in terms of a balance of the magnetic field flux. Specifically, assuming that the magnetic pole surfaces 30N and 30S both have an annular shape, a width in the radial direction of one of them positioned on an outer circumference is made to be smaller than that of the other of them positioned on an inner circumference.

Note that the distance between the magnetic pole surfaces 30N and 30S is desirably twice as large as a sum of an air gap between the rotor 1 and the armature 2 and an air gap between the rotor 1 and the stator 3. This is because the magnetic field flux makes one shuttle, between the magnetic pole surfaces 30N and 30S, in those air gaps, and thus the magnetic field flux does not flow in a short-circuit manner between the magnetic pole surfaces 30N and 30S inside the stator 3.

The alternating magnetic flux does not flow in the stator 3 as described above, and accordingly iron loss is not increased even when the yoke 31 is provided. In addition, the rotor 1 is provided between the stator 3 and the armature 2, and there are two air gaps on both sides of the rotor 1. Therefore, even when the permanent magnets 30AN and 30AS are employed for the source of the magnetic field flux, they are difficult to be affected by the magnetic field generated by the armature 2. That is, the above-mentioned configuration has an advantage that it is resistant to demagnetization in terms of configuration.

Thanks to the structural advantages as described above, degree of freedom in selecting a material for the permanent magnets 30AN and 30AS is increased. This is because it is not required to select from materials having high magnetic coercive force. Therefore, it is possible to select a material having high remanent magnetic flux density as a material for the permanent magnets 30AN and 30AS without considering such request. Alternatively, there may be employed an inexpensive ferrite magnet or a bonded magnet whose shape is designed freely.

With reference to FIG. 5, a part of the magnetic ring 102N, which is coupled to the magnetic plate 101N, extends in the rotation axis direction. Therefore, the magnetic ring 102N is thick at a position where the magnetic plate 101N is provided, and is thin at a position where the magnetic plate 101S is provided, which accordingly generates a step 109N. In a similar manner, a step 109S is generated in the magnetic ring 102S. The steps 109N and 109S are desirably moderated for smooth flow of the magnetic field flux. In addition, the magnetic rings 102N and 102S are easily saturated, and thus may be made longer in the radial direction to reduce saturation compared with other parts of the rotor.

Further, it is not necessarily required that the inner circumferential side extends in the radial direction so as to reach the armature 2 side of the magnetic ring 102S as in the case of the magnetic plate 101N, nor that the outer circumferential side extends in the radial direction so as to reach the armature 2 side of the magnetic ring 102N as in the case of the magnetic plate 101S. Parts of the magnetic rings 102N and 102S, which project at selected positions in the circumferential direction, may function as the magnetic plate while keeping the thicknesses thereof almost constant.

Figure 8:
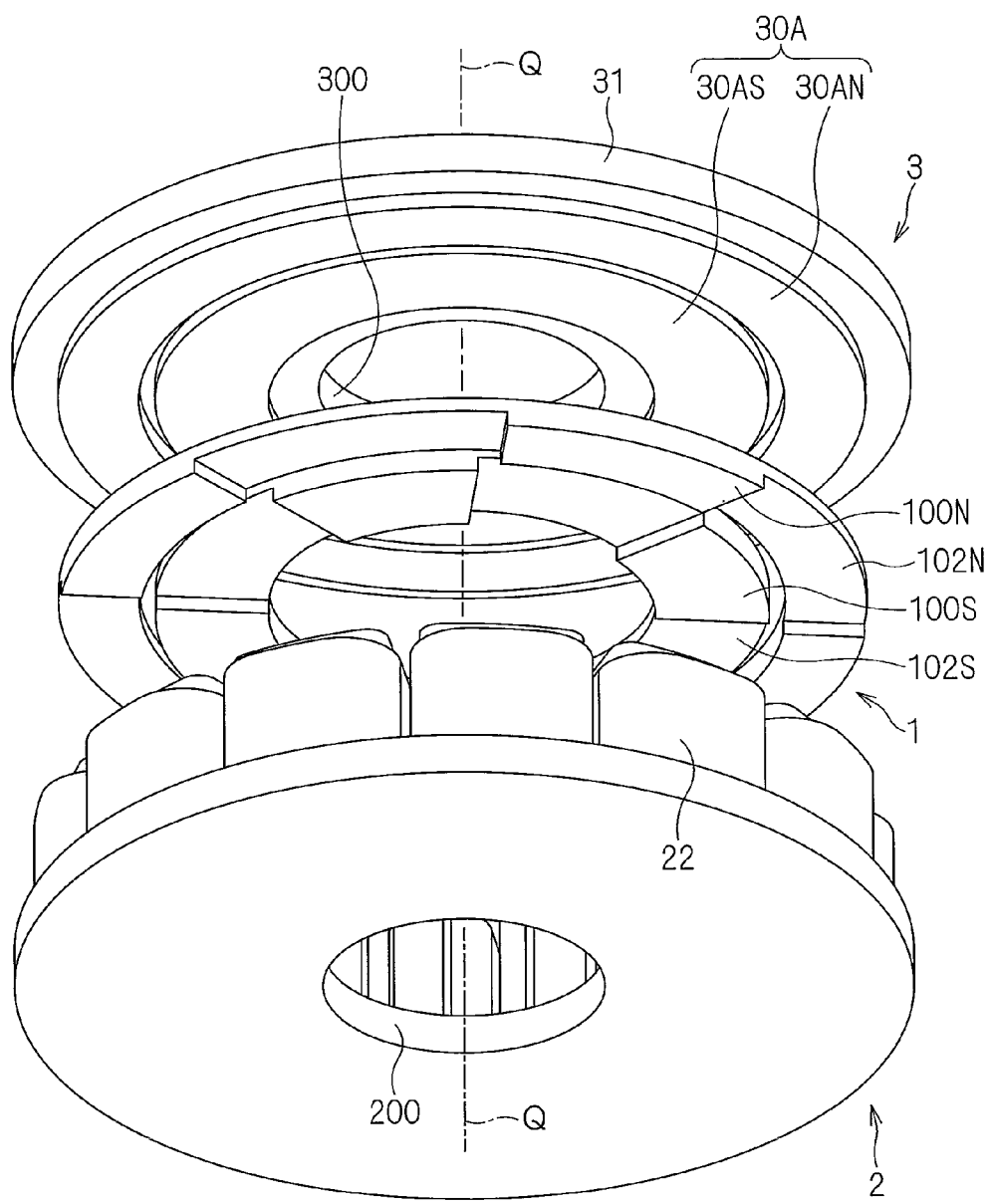
FIG. 8 is another perspective view showing the configuration of the rotary electric machine according to the first embodiment of the present invention.

FIG. 8 is a perspective view corresponding to FIG. 1, which shows a configuration in which the magnetic plates 101N and 101S are replaced with magnetic plates 100N and 100S, respectively. The magnetic plates 100N and 100S occupy the same positions as those of the magnetic rings 102N and 102S in the radial direction, respectively, and project toward the armature 2 side to be opposed to each other. Further, the magnetic plates 100N and the magnetic plates 100S are circularly disposed so that positions thereof in the circumferential direction alternate with each other.

FIG. 9 corresponds to FIG. 5, which is a perspective view showing the configuration of the rotor 1. FIG. 10 and FIG. 11 are cross-sectional views showing cross-sections of the rotor 1 at a position X-X and a position XI-XI of FIG. 9, respectively. FIG. 10 and FIG. 11 each show the cross-section including the rotation axis Q and is parallel thereto.

In respective embodiments and modifications described below, description will be given of, as an example, the case where the magnetic plates 101N and 101S are used unless particularly noted. However, the magnetic plates 101N and 101S may be replaced with the magnetic plates 100N and 100S unless functions of the respective embodiments and modifications are not impeded.

Figure 12:
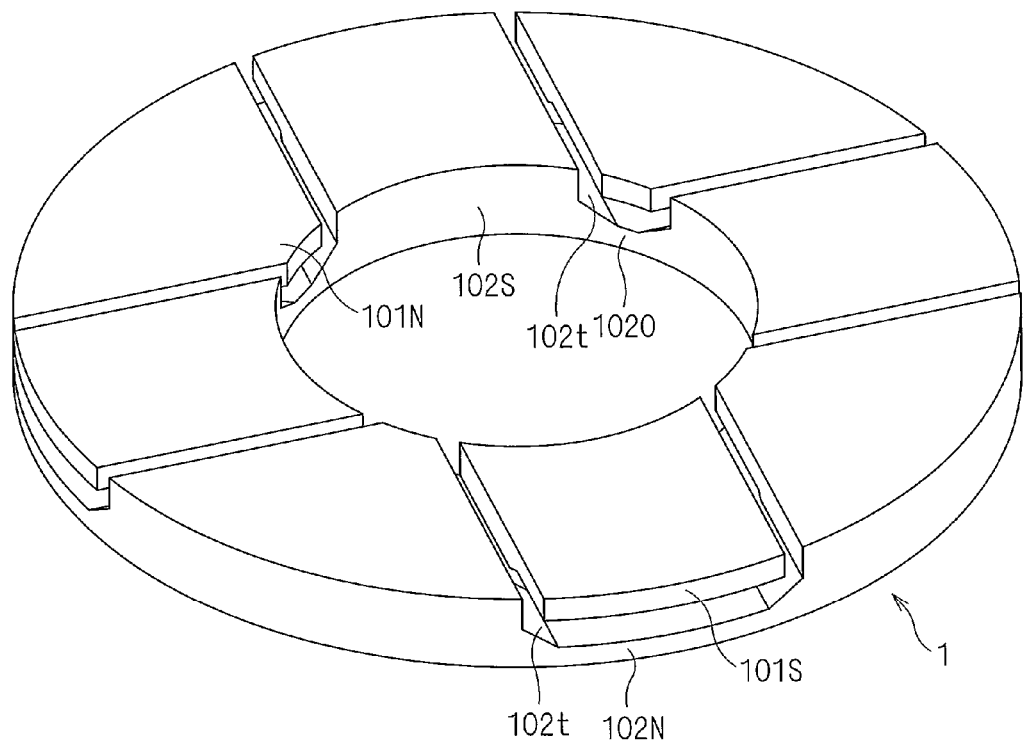
FIG. 12 is a perspective view showing another shape of the rotor.

FIG. 12 is a perspective view showing other shape of the rotor 1. In the shape shown in FIG. 12, the above-mentioned steps have a shape of a taper 102t, and thus more smooth flow of the magnetic field flux is expected compared with the step-wise shape as shown in FIG. 5. Further, a boundary between the magnetic plates 101N and 101S is inclined with respect to a line in the radial direction, which passes through the center of rotation, and accordingly there is achieved a so-called skew effect to be expected to reduce cogging torque or the like.

In the rotor 1, the magnetic field flux has components not only in the rotation axis direction but also in the radial direction and the circumferential direction. In addition, iron loss in the rotor 1 is mainly eddy-current loss with little hysteresis loss. Therefore, the rotor 1 is desirably formed of a dust core.

Second Embodiment

In the present embodiment, a desirable modification of the rotor 1 will be described. Desirably, the magnetic plates 101N and 101S are structurally coupled to each other while being magnetically separated from each other. Alternatively, it is desirable that the magnetic rings 102N and 102S be structurally coupled to each other while being magnetically separated from each other.

Figure 13:
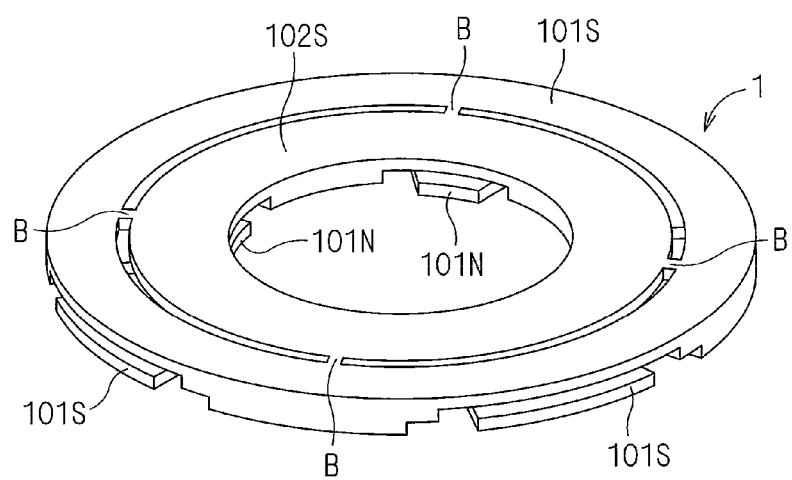
FIG. 13 is a perspective showing a first modification of the rotor.

FIG. 13 is a perspective view showing a first modification of the rotor 1, which shows a configuration in which bridges B are additionally provided to the rotor 1 shown in FIG. 5. The bridge B couples the magnetic rings 102N and 102S to each other on a side opposite to the magnetic plates 101N and 101S (stator 3 side shown in FIG. 1 and FIG. 2). Such a configuration is obtained with ease by forming the magnetic rings 102N and 102S and the magnetic plates 101N and 101S of a dust core.

Note that the bridge B is essentially formed to be thin to an extent that it is magnetically saturated with ease so as not to magnetically short-circuit the magnetic rings 102N and 102S. This is because the magnetically saturated bridge B essentially functions as a magnetic barrier.

Figure 14:
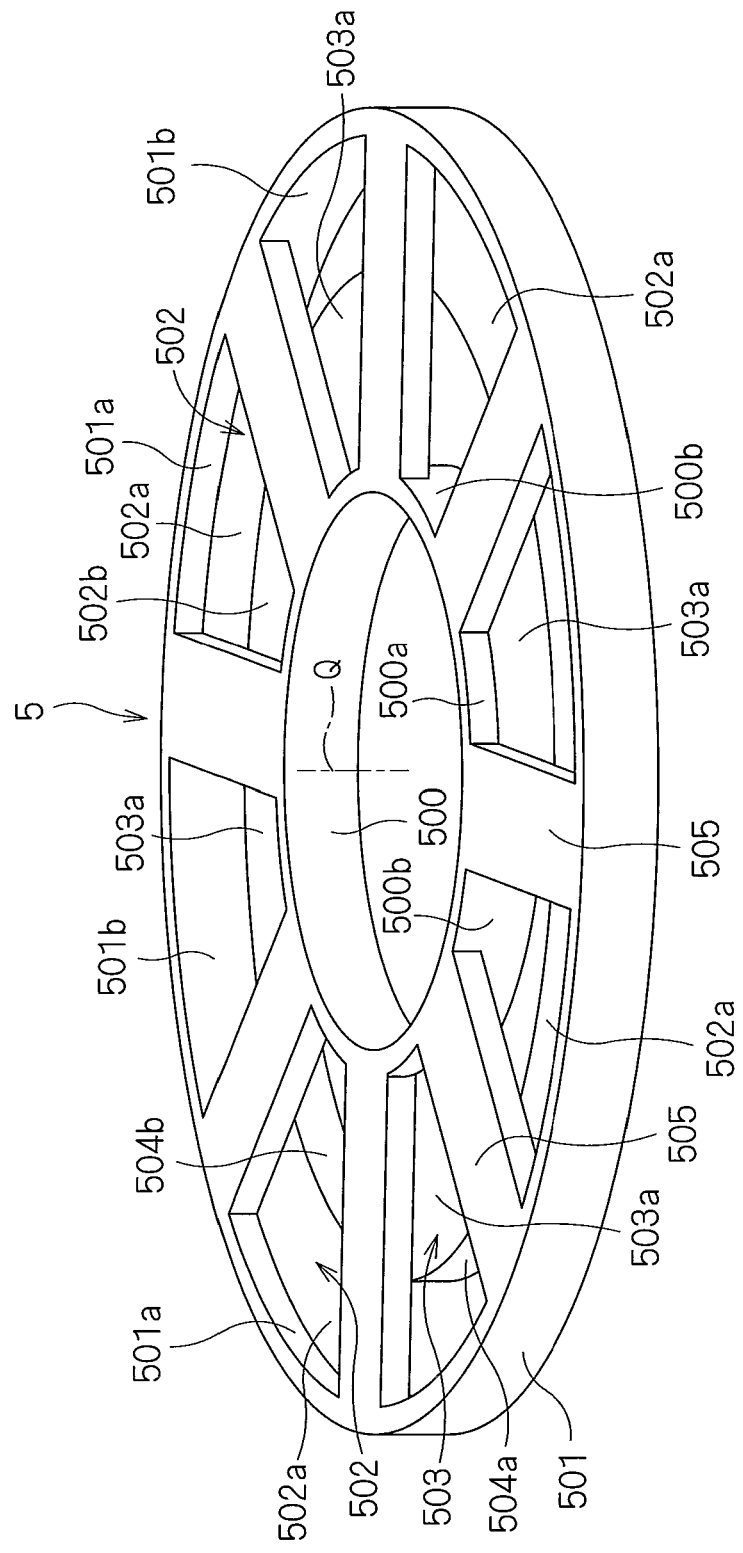
FIGS. 14 and 15 are perspective views showing a second modification of the rotor.
Figure 15:
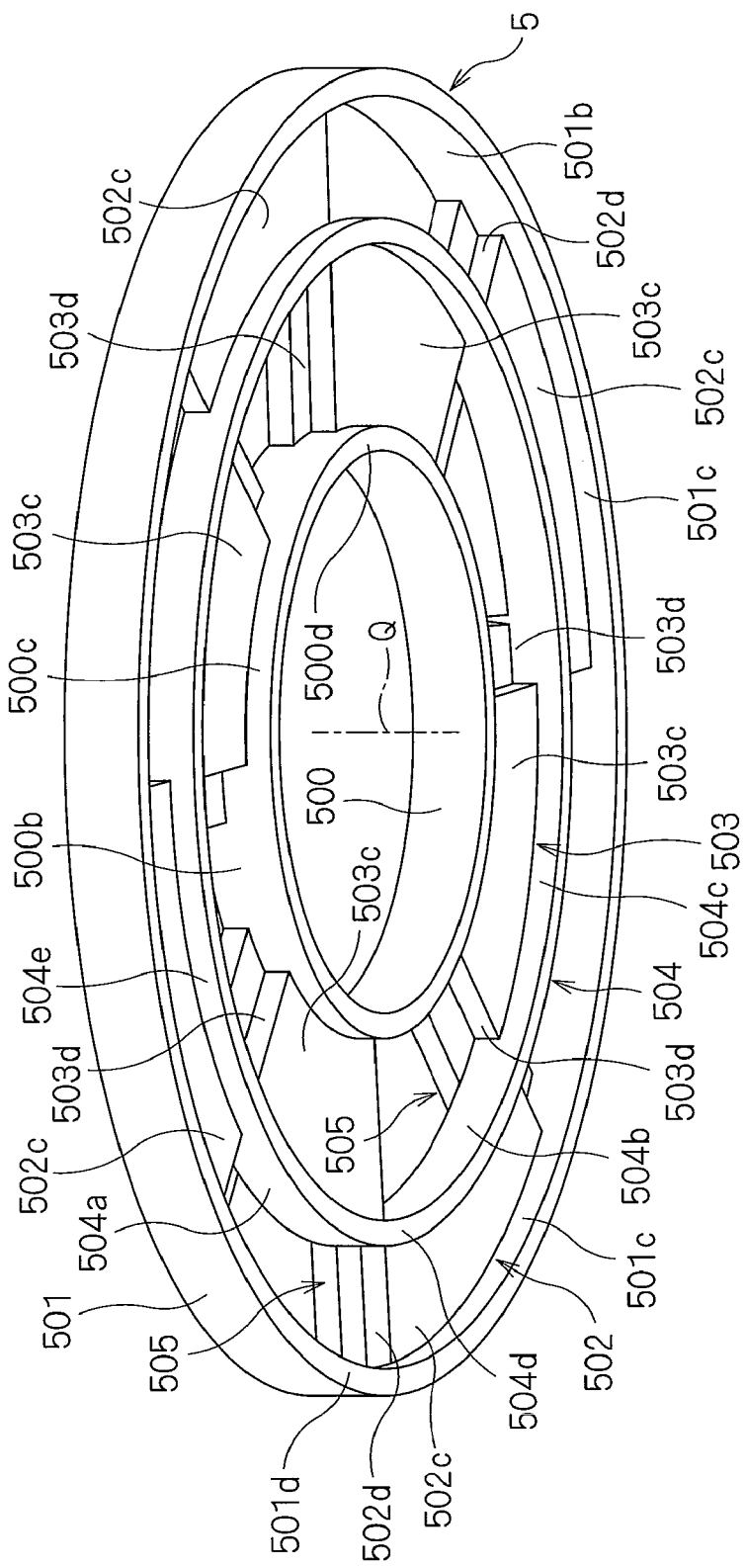

FIG. 14 and FIG. 15 are perspective views showing a second modification of the rotor 1, which show a configuration of a holder 5 which holds the magnetic plates 101N and 101S and the magnetic rings 102N and 102S. FIG. 14 is the perspective view which is viewed with a tilt with respect to the rotation axis Q from the side on which the magnetic plates 101N and 101S are held. FIG. 15 is the perspective view which is viewed with a tilt with respect to the rotation axis Q from the side on which the magnetic rings 102N and 102S are held. The holder 5 is a non-magnetic body.

The holder 5 includes an outer ring 501, a middle ring 504 and an inner ring 500, and the middle ring 504 is sandwiched between the outer ring 501 and the inner ring 500 in the radial direction. The rotation shaft (not shown) is caused to penetrate through the inner ring 500.

The outer ring 501 has inner circumferential surfaces 501a, 501b and 501c on the inner circumferential side, and shows a bottom surface 501d on the side on which the magnetic rings 102N and 102S are held. The middle ring 504 shows outer circumferential surfaces 504a and 504e on the outer circumferential side, inner circumferential surfaces 504b and 504c on the inner circumferential side, and a bottom surface 504d. The inner ring 500 shows outer circumferential surfaces 500a, 500b and 500c on the outer circumferential side, and a bottom surface 500d. The bottom surfaces 500d, 501d and 504d are located at the positions which are equal in the rotation axis direction.

Plates 502 are intermittently provided in the circumferential direction between the outer ring 501 and the middle ring 504. Plates 503 are intermittently provided in the circumferential direction between the inner ring 500 and the middle ring 504. The plates 502 and 503 are alternately disposed in the circumferential direction. The plates 502 and 503 occupy the equal position in the rotation axis direction. The plate 502 shows a bottom surface 502c on the bottom surface 504d side, and a top surface 502a on a side opposite to the bottom surface 502c. The plate 503 shows a bottom surface 503c on the bottom surface 504d side, and a top surface 503a on a side opposite to the bottom surface 503c.

The inner circumferential surface 501b is present at a position at which the plate 502 is not provided in the circumferential direction. The inner circumferential surface 501c is present at a position at which the plate 502 is provided in the circumferential direction and on the bottom surface 501d side in the rotation axis direction. The inner circumferential surface 501a is present at the position at which the plate 502 is provided in the circumferential direction and on a side opposite to the bottom surface 501d in the rotation axis direction.

The outer circumferential surface 504a is present at the position at which the plate 502 is not provided in the circumferential direction. The outer circumferential surface 504e is present at the position at which the plate 502 is provided in the circumferential direction and on the bottom surface 504d side in the rotation axis direction.

The inner circumferential surface 504b is present at a position at which the plate 503 is not provided in the circumferential direction. The inner circumferential surface 504c is present at a position at which the plate 503 is provided in the circumferential direction and on the bottom surface 504d side in the rotation axis direction.

The outer circumferential surface 500b is present at the position at which the plate 503 is not provided in the circumferential direction. The outer circumferential surface 500c is present at the position at which the plate 503 is provided in the circumferential direction and on the bottom surface 500d side in the rotation axis direction.

In the rotation axis direction, a rib 505 is provided to the plates 502 and 503 on a side opposite to the bottom surface 501d. An end of the rib 505 in the circumferential direction overlaps, in the rotation axis direction, ends of the plates 502 and 503 in the circumferential direction. The end of the plate 502 in the circumferential direction and the rib 505 form a step 502d, and the end of the plate 503 in the circumferential direction and the rib 505 form a step 503d.

The plate 502 is sandwiched between the magnetic plate 101S and the magnetic ring 102N, and the plate 503 is sandwiched between the magnetic plate 101N and the magnetic ring 102S. More specifically, the top surface 502a is in contact with the surface of the magnetic plate 101S on the magnetic ring 102N side, the bottom surface 502c is in contact with the surface of the magnetic ring 102N on the magnetic plate 101S side, the top surface 503a is in contact with the surface of the magnetic plate 101N on the magnetic ring 102S side, and the bottom surface 503c is in contact with the surface of the magnetic ring 102S on the magnetic plate 101N side. The step 109N of the magnetic ring 102N is fitted with the step 502d, and the step 109S of the magnetic ring 102S is fitted with the step 503d.

Specifically, the following technique is desirably employed for holding the rotor 1 by the holder 5. That is, a magnetic powder is pressed with the holder 5, and the rotor 1 is formed of a dust core.

Figure 16:
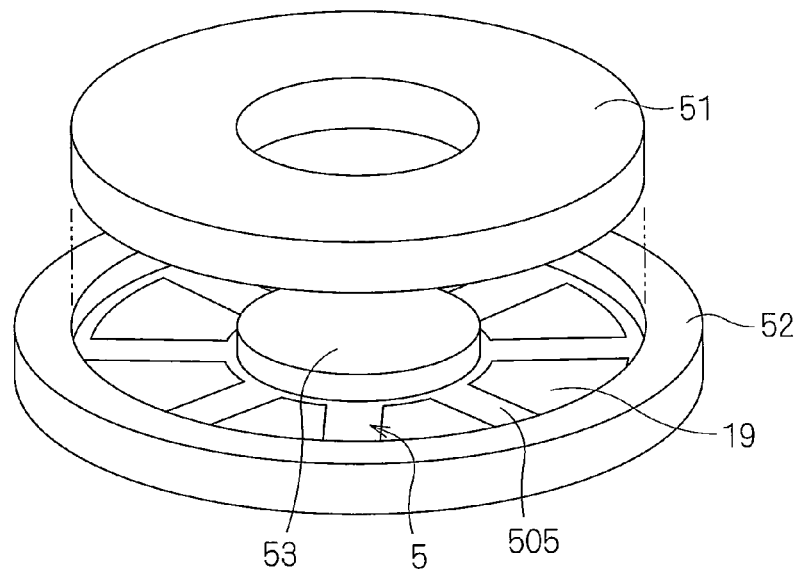
FIG. 16 is a perspective view illustrating a state in which a magnetic powder is pressed to form a rotor.

FIG. 16 is a perspective view illustrating a state of the above-mentioned pressing. A magnetic powder 19 is pressed using molds 51, 52 and 53, and the holder 5.

The mold 52 is circularly-shaped and has a bottom, and is provided on the outer circumferential side of the holder 5. The mold 53 has a cylindrical shape and is provided on the inner circumferential side of the holder 5. The mold 51 has a circular shape and is in contact with the mold 53 on an inner circumferential side thereof with an appropriate clearance. The molds 52 and 53 are formed to have a thickness larger than a thickness of the holder 5, and form a concave portion together with the holder 5. The mold 51 is pressed into the concave portion, whereby the magnetic powder 19 is pressed.

Figure 17:
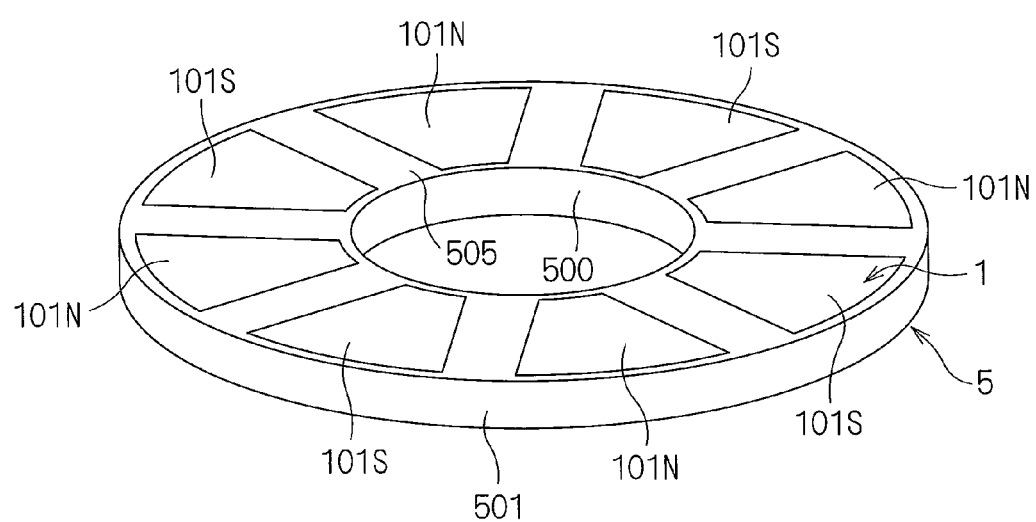
FIG. 17 is a perspective view showing the rotor in a state of being held by a holder.

FIG. 17 is a perspective view showing the rotor 1 in the state of being held by the holder 5. In this state, the magnetic plates 101N and 101S are caught by the rib 505, the outer ring 501 and the inner ring 500 to be exposed.

Through pressing as described above, it is possible to obtain the rotor 1 having the configuration shown in FIG. 5 and to cause the rotor 1 to hold the rotation shaft via the holder 5.

Figure 18:
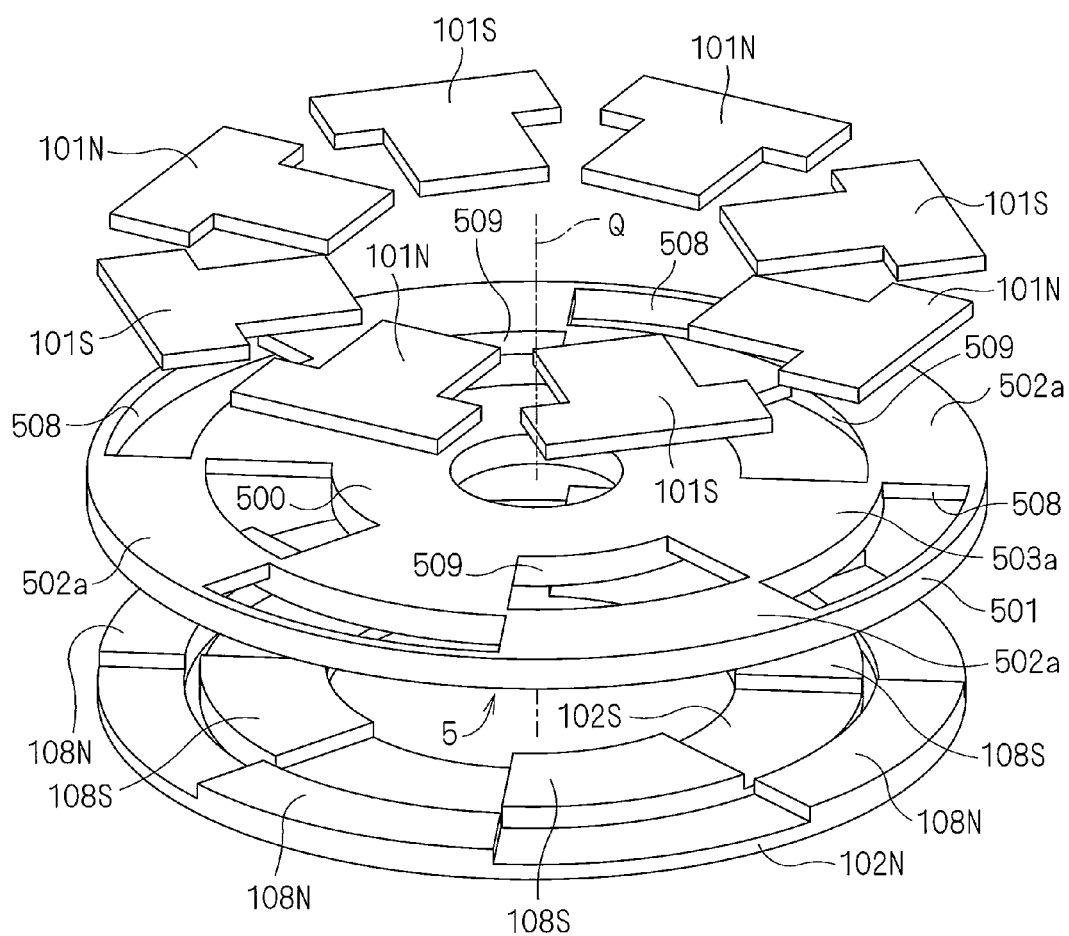
FIGS. 18 and 19 are perspective views showing a third modification of the rotor.
Figure 19:
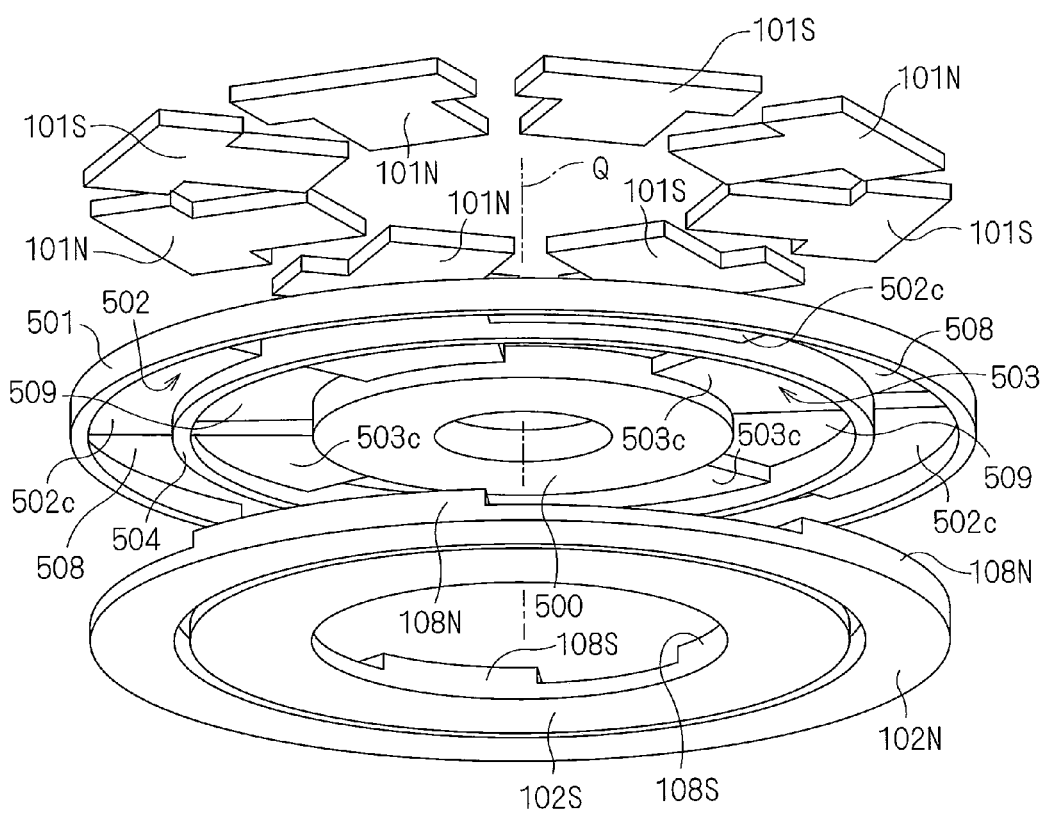

FIG. 18 and FIG. 19 are perspective views showing a third modification of the rotor 1, which show other configurations of the non-magnetic holder 5 and the rotor 1. FIG. 18 is the perspective view which is viewed with a tilt with respect to the rotation axis Q from the side on which the magnetic plates 101N and 101S are held. FIG. 19 is the perspective view which is viewed with a tilt with respect to the rotation axis Q from the side on which the magnetic rings 102N and 102S are held. Those perspective views show a state in which the magnetic plates 101N and 101S, the non-magnetic holder 5, and the magnetic rings 102N and 102S are disassembled along the rotation axis direction but, in actuality, they are brought into contact with each other by performing penetration described below.

The magnetic ring 102N includes a projection 108N which is coupled to the magnetic plate 101N. The magnetic ring 102S includes a projection 108S which is coupled to the magnetic plate 101S. The projections 108N and 108S project toward the rotation axis direction.

Note that the projections 108N and 108S may have the same shapes as those of the magnetic plates 100N and 100S, which have been described with reference to FIG. 8 to FIG. 11.

The magnetic plates 101N and 101S each have a shape in which two rectangles are coupled in the radial direction in FIG. 18 and FIG. 19, but may have a trapezoidal shape, a fan shape or an arc shape.

The holder 5 has a configuration shown in FIG. 14, in which the rib 505 is removed, and heights of the inner ring 500 and the outer ring 501 are reduced by a height of the rib 505 in the rotation axis direction. Accordingly, the positions of the top surfaces 502a and 503a and the positions of the top surfaces of the inner ring 500, the middle ring 504 and the outer ring 501 coincide with each other in the rotation axis direction.

Open are holes 508 each provided between a pair of plates 502 adjacent to each other in the circumferential direction and between the outer ring 501 and the middle ring 504. Open are holes 509 each provided between a pair of plates 503 adjacent to each other in the circumferential direction and between the inner ring 500 and the middle ring 504. The projections 108N and 108S penetrate through the holes 508 and 509 to be coupled to the magnetic plates 101N and 101S, respectively. Therefore, thicknesses of the plates 502 and 503 are desirably equal to or smaller than thicknesses of the projections 108S and 108N.

In the coupling, an adhesive having magnetism may be desirably used, or welding may be desirably performed. Alternatively, as described above, molds are used to compress a magnetic powder together with the non-magnetic holder 5.

FIG. 20 is a perspective view showing a fourth modification of the rotor 1. The magnetic plates 101N and 101S in the third modification are each modified to have an arc shape in the fourth modification. In addition, in the circumferential direction, the magnetic plates 101N and 101S are coupled to each other on the outer circumferential side and the inner circumferential side by a thin portion 101B. FIG. 20 shows a state in which the magnetic plates 101N and 101S, the non-magnetic holder 5, and the magnetic rings 102N and 102S are disassembled along the rotation axis direction but, in actuality, they are brought into contact with each other by performing penetration similar to that of the third modification.

The thin portion 101B is formed integrally with the magnetic plates 101N and 101S, and thus positioning thereof is performed with ease. For example, the thin portion 101B and the magnetic plates 101N and 101S are configured by laminating electromagnetic steel plates. The thin portion 101B essentially functions as a magnetic barrier because it is magnetically saturated with ease, whereby it is possible to avoid magnetic short-circuit between the magnetic plates 101N and 101S in the circumferential direction.

Figure 21:
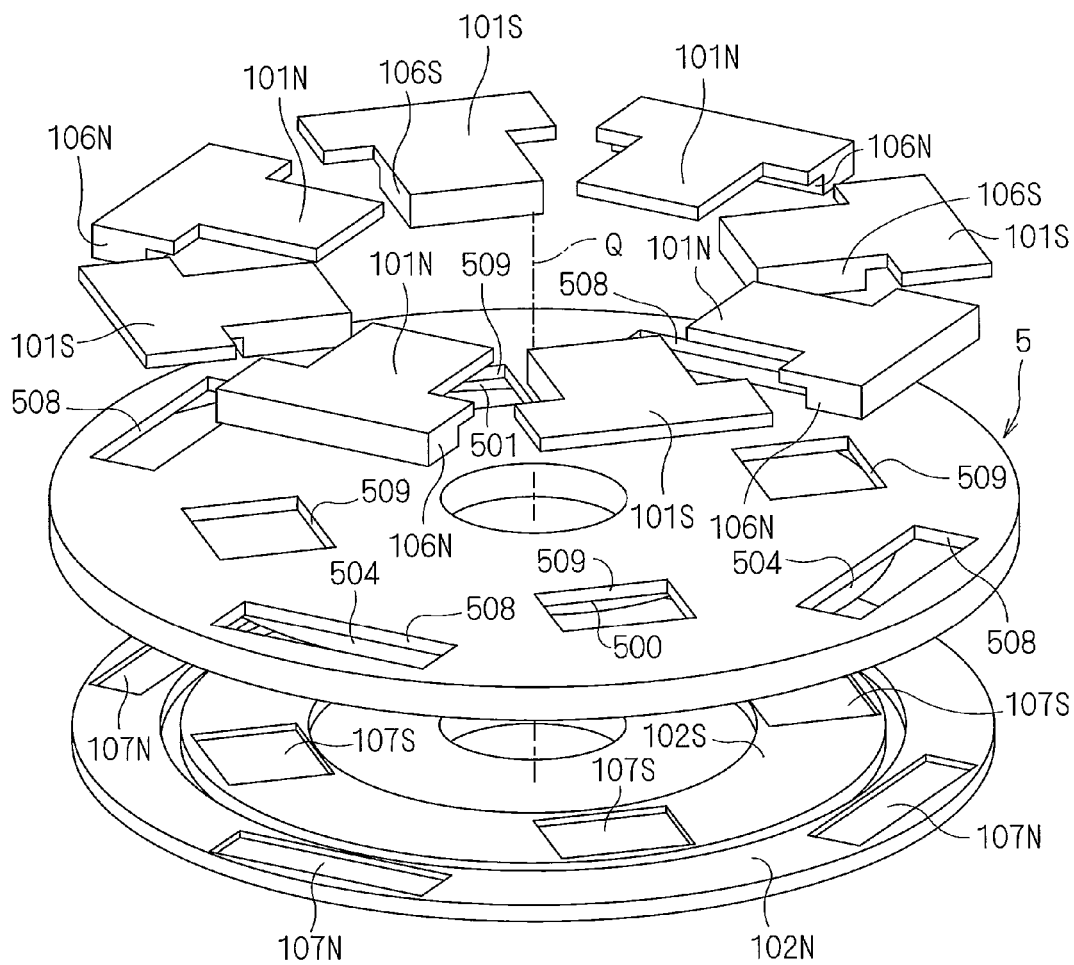
FIGS. 21 to 23 are perspective views showing a fifth modification of the rotor.

FIG. 21 is a perspective view showing a fifth modification of the rotor 1. The fifth modification has a configuration in which the projections 108N and 108S in the third modification are replaced with concave portions 107N and 107S, respectively. The concave portions 107N and 107S are open toward the magnetic plates 101N and 101S side, and may penetrate therethrough in the rotation axis direction. FIG. 21 shows a state in which the magnetic plates 101N and 101S, the non-magnetic holder 5, and the magnetic rings 102N and 102S are disassembled along the rotation axis direction but, in actuality, they are brought into contact with each other by performing penetration described below.

The magnetic plate 101N is provided with a projection 106N on the magnetic ring 102N side. The magnetic plate 101S is provided with a projection 106S on the magnetic ring 102S side. The projections 106N and 106S penetrate through the holes 508 and 509 to be fitted with the concave portions 107N and 107S, respectively. Accordingly, the magnetic plates 101N and 101S are coupled to the magnetic rings 102N and 102S, respectively. Therefore, the thicknesses of the plates 502 and 503 are desirably equal to or less than a thickness obtained by subtracting the depths of the concave portions 107N and 107S from the heights of the projections 106N and 106S, respectively. Note that the holes 508 and 509 are different in shape from those of the third modification because the projections 106N and 106S are caused to penetrate therethrough.

Figure 22:
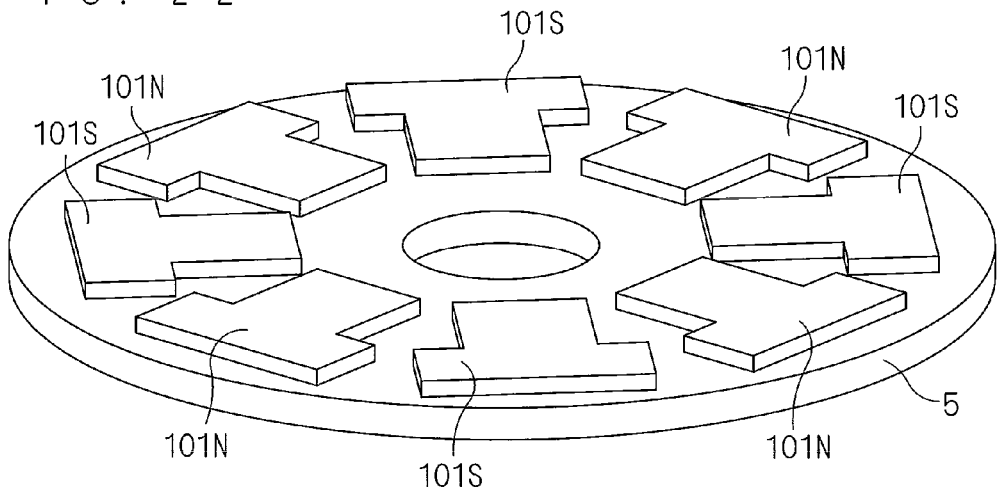
Figure 23:
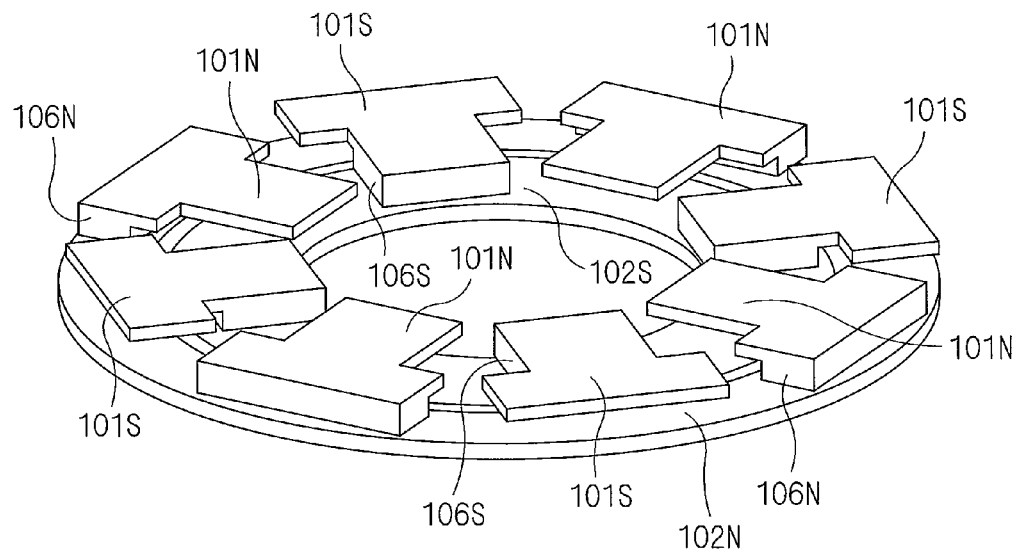

FIG. 22 is a perspective view showing a state in which the above-mentioned penetration is achieved in the fifth modification. FIG. 23 is a perspective view in which the holder 5 is removed in the state in which the above-mentioned penetration is achieved in the fifth embodiment.

In the fifth modification, the projections 106N and 106S are fitted with the concave portions 107N and 107S, respectively, whereby the magnetic plates 101N and 101S are fixed to the magnetic rings 102N and 102S, respectively, which facilitates the formation of the rotor 1. However, in order to obtain the above-mentioned shape, the magnetic plates 101N and 101S and the magnetic rings 102N and 102S are desirably formed of a dust core.

Figure 24:
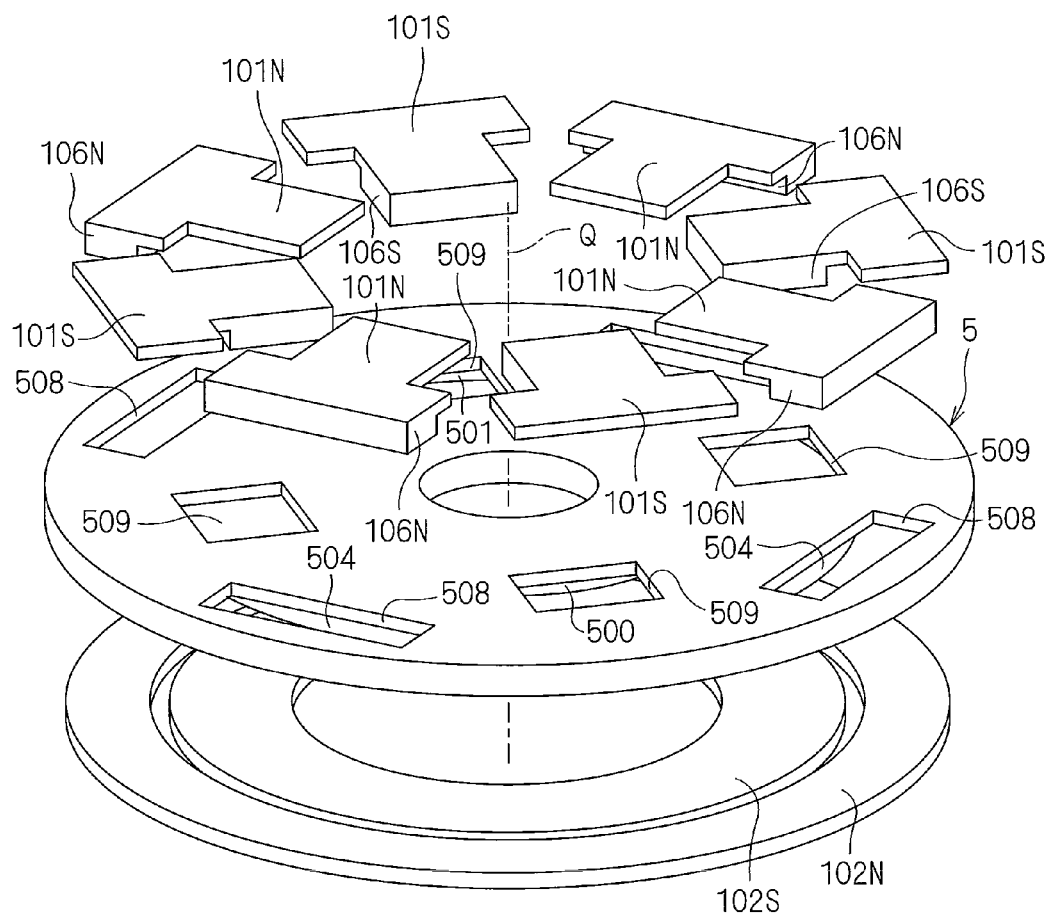
FIG. 24 is a perspective view showing a sixth modification of the rotor.

FIG. 24 is a perspective view showing a sixth modification of the rotor 1. In the sixth modification, the concave portions 107N and 107S are omitted from the fifth modification. In this case, a wound core is used for the magnetic rings 102N and 102S. This is because the magnetic rings 102N and 102S perform a function of causing the magnetic field flux from the stator 3 to flow in the rotation axis direction to the magnetic plates 101N and 101S which expand in the circumferential direction.

Electromagnetic steel plates laminated in the circumferential direction are used for the magnetic plate 101N provided with the projection 106N and the magnetic plate 101S provided with the projection 106S. The wound cores forming the magnetic rings 102N and 102S are desirably welded for preventing unwinding thereof. Note that positions abutting the projections 106N and 106S are desirably avoided as a position of the welding.

In a similar manner, it is desirable to perform welding on the electromagnetic steel plates forming the magnetic plate 101N provided with the projection 106N and the magnetic plate 101S provided with the projection 106S so that laminated layers are difficult to come off. However, positions abutting the magnetic rings 102N and 102S and positions on the armature 2 side are desirably avoided as the position of the welding. For example, welding is desirably performed on the outer circumferential side or the inner circumferential side.

The projections 106N and 106S are desirably fixed to the magnetic rings 102N and 102S by bonding or welding.

Figure 25:
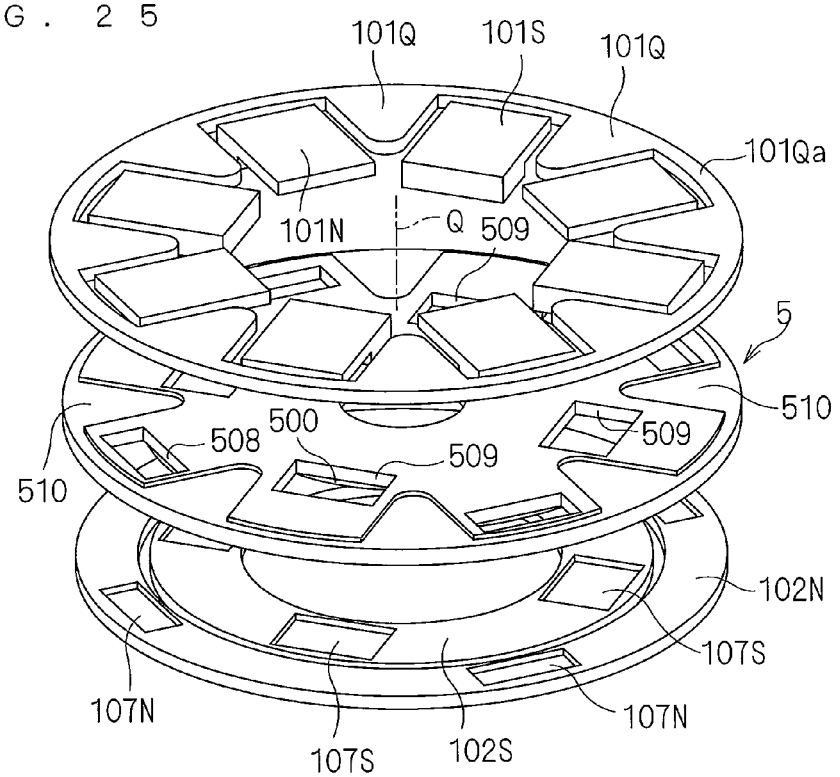
FIGS. 25 and 26 are perspective views showing a seventh modification of the rotor.

FIG. 25 is a perspective view showing a seventh modification of the rotor 1. The seventh modification has a configuration in which magnetic bodies 101Q are added to the fifth modification. The magnetic bodies 101Q are disposed so as to alternate with the magnetic plates 101N and 101S in the circumferential direction and be magnetically separated therefrom. In this case, there is assumed a case where electromagnetic steel plates laminated in the circumferential direction are used for the magnetic plate 101N provided with the projection 106N and the magnetic plate 101S provided with the projection 106S. Accordingly, shapes thereof viewed from the rotation axis direction are rectangular. When such a shape is employed, there is generated a triangular gap which opens toward the outer circumferential side between the magnetic plates 101N and 101S. The magnetic body 101Q is provided in this gap.

That is, the magnetic bodies 101Q are circularly disposed to be opposed to the armature 2 in such a manner that positions thereof in the circumferential direction alternate with those of the magnetic plates 101N and 101S. The magnetic bodies 101Q are magnetically separated from the magnetic plates 101N and 101S.

The magnetic bodies 101Q are coupled to each other in the circumferential direction by a magnetic ring 101Qa provided on an outer circumferential side thereof. The holder 5 is provided with concave portions 510 for positioning of the magnetic bodies 101Q and the magnetic ring 101Qa, with which those are fitted.

Figure 26:
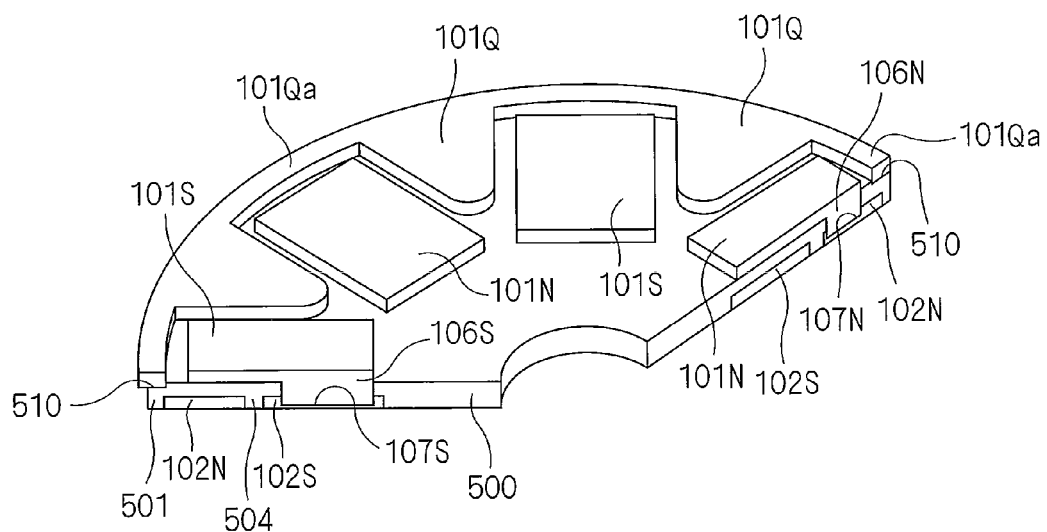

FIG. 25 shows a state in which the magnetic plates 101N and 101S, the magnetic bodies 101Q, the non-magnetic holder 5, and the magnetic rings 102N and 102S are disassembled along the rotation axis direction but, in actuality, they are brought into contact with each other by performing the above-mentioned penetration. FIG. 26 is a perspective view showing a state in which the penetration is achieved, which partially shows a cross-section. The projections 106N and 106S are fitted with the concave portions 107N and 107S, respectively, and the magnetic bodies 101Q and the magnetic ring 101Qa are fitted with the concave portions 510.

The magnetic body 101Q and the magnetic ring 101Qa perform a function of increasing an inductance in a so-called q-axis direction. This is desirable in terms of increasing a difference between a so-called d-axis inductance and a so-called q-axis inductance, which makes it easy to obtain reluctance torque.

Figure 27:
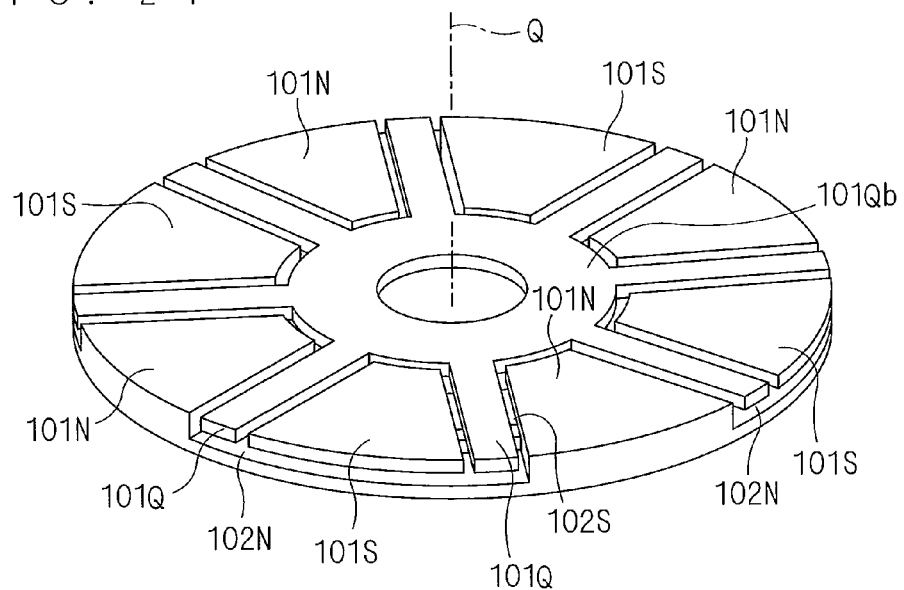
FIG. 27 is a perspective view showing an eighth modification of the rotor.

FIG. 27 is a perspective view showing an eighth modification of the rotor 1. The eighth modification has a configuration in which the steps 109N and 109S are removed from the configuration of the rotor 1 shown in FIG. 5 and the magnetic bodies 101Q are added thereto. The magnetic bodies 101Q are disposed in the circumferential direction so as to alternate with the magnetic plates 101N and 101S and be magnetically separated therefrom. The magnetic plates 101N and 101S have an arc shape, and thus the magnetic bodies 101Q are coupled to each other in the circumferential direction by a magnetic ring 101Qb provided on the inner circumferential side thereof. Coupling of the magnetic bodies 101Q on the inner circumferential side in this manner is advantageous in terms of short magnetic path.

The magnetic field flux does not flow in the magnetic ring 101Qb. Accordingly, even when the rotation shaft (not shown) formed of a magnetic body is held on the inner circumferential side of the magnetic ring 101Qb, the magnetic field flux does not flow in the rotor 1 via the rotation shaft in a short-circuit manner.

Figure 28:
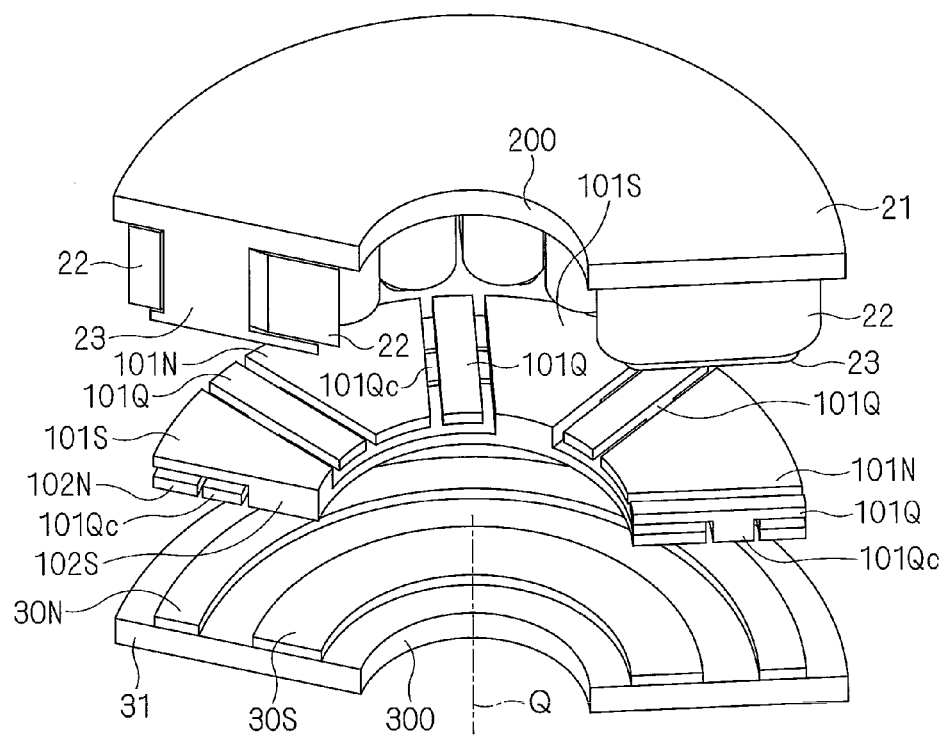
FIG. 28 is a perspective view showing a ninth modification of the rotor.
Figure 29:
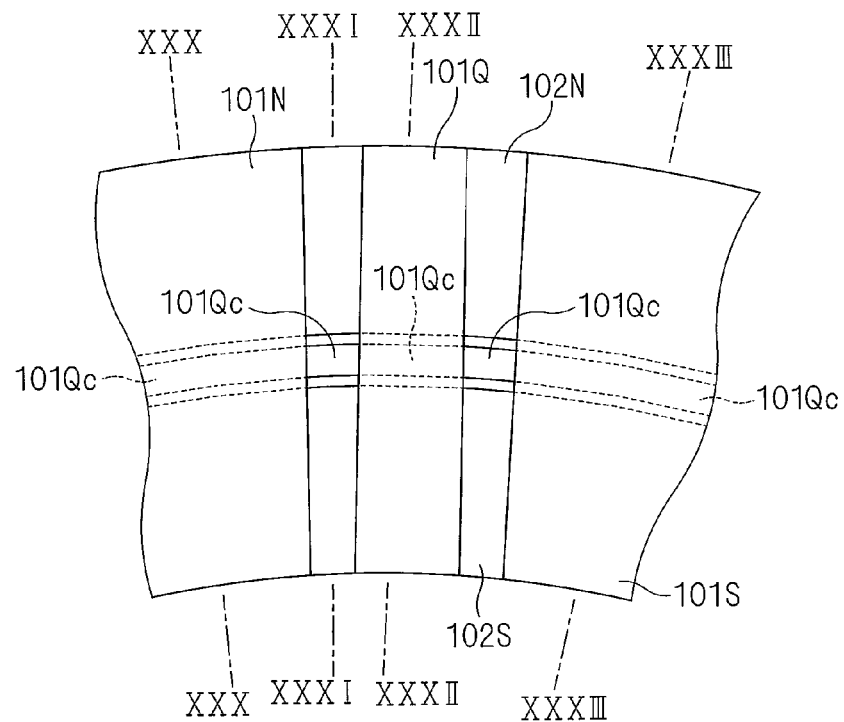
FIG. 29 is a plan view of a vicinity of a magnetic body, which is viewed from a rotation axis direction.
Figure 30:
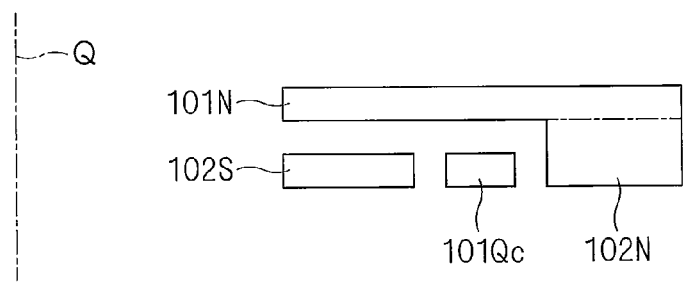
FIG. 30 shows a cross-section at a position XXX-XXX of FIG. 29.
Figure 31:
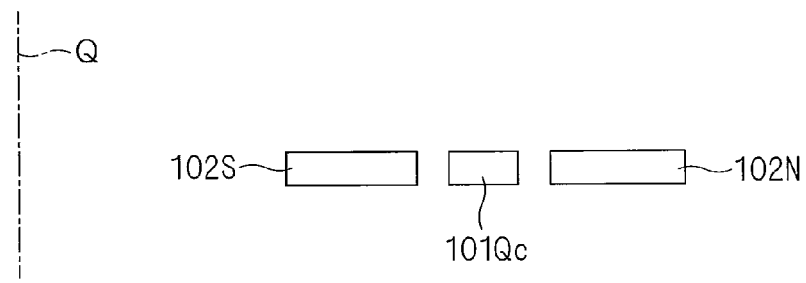
FIG. 31 shows a cross-section at a position XXXI-XXXI of FIG. 29.
Figure 32:
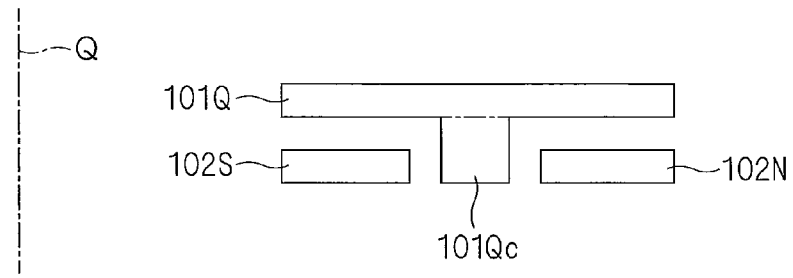
FIG. 32 shows a cross-section at a position XXXII-XXXII of FIG. 29.
Figure 33:
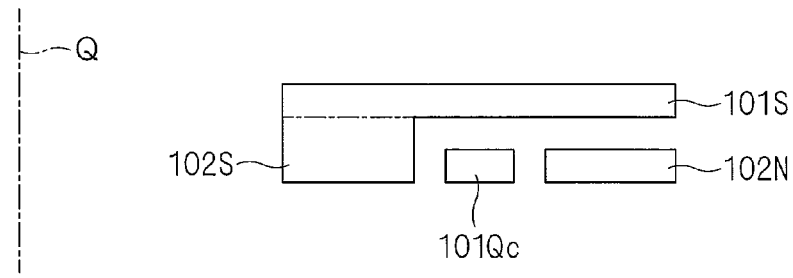
FIG. 33 shows a cross-section at a position XXXIII-XXXIII of FIG. 29.

FIG. 28 is a partially cut-out perspective view showing a configuration of a ninth embodiment of the rotor 1. FIG. 29 is a plan view of a vicinity of the magnetic body 101Q having this configuration, which is viewed from the rotation axis direction. FIG. 30 to FIG. 33 are cross-sectional views showing cross-sections in the circumferential direction at positions XXX-XXX, XXXI-XXXI, XXXII-XXXII and XXXIII-XXXIII of FIG. 29, respectively. In this modification, the magnetic bodies 101Q are coupled to each other in the circumferential direction between the magnetic rings 102N and 102S by a magnetic ring 101Qc.

Figure 34:
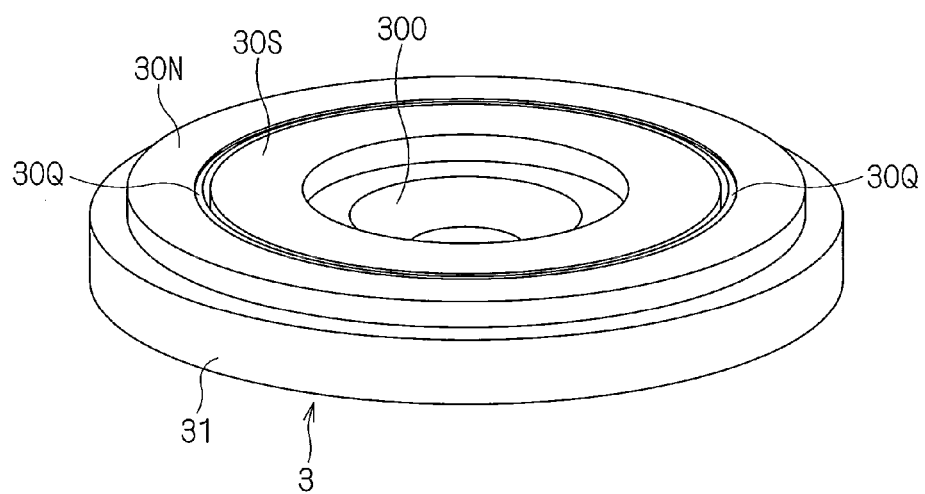
FIG. 34 is a perspective view illustrating a configuration of a stator.

Note that the function of magnetically coupling the magnetic bodies 101Q to each other may be performed by the stator 3. FIG. 34 is a perspective view illustrating the configuration of the stator 3 performing such a function. The stator 3 further includes a projection 30Q extending in the circumferential direction between the magnetic pole surfaces 30N and 30S. The projection 30Q magnetically couples the magnetic bodies 101Q included in the rotor 1 to each other in the circumferential direction.

When the projection 30Q is employed in this manner, there is no need to provide the configuration for magnetically coupling the magnetic bodies 101Q to each other to the rotor 1. Therefore, it is possible to reduce an attraction force acting between the configuration for magnetically coupling the magnetic bodies 101Q to each other and the armature.

Figure 35:
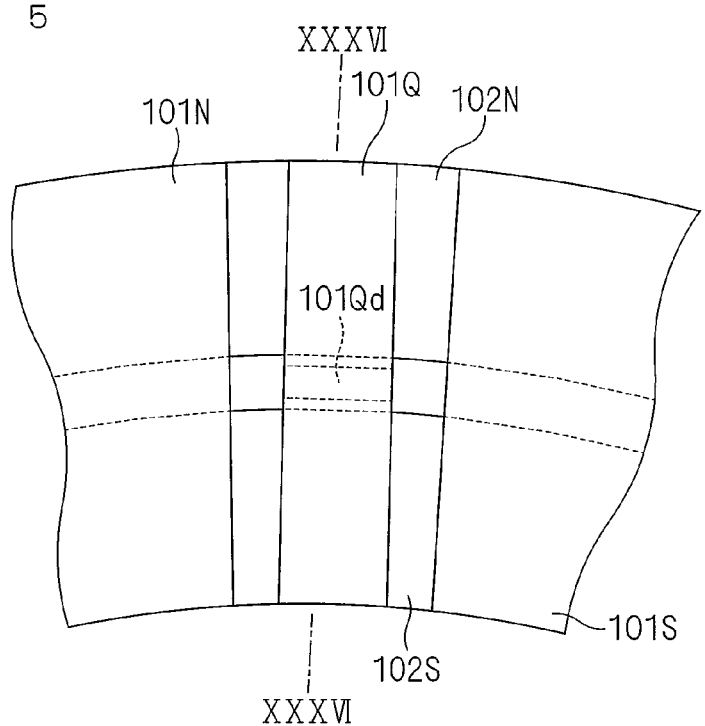
FIG. 35 is a plan view of the rotor, which is viewed from the rotation axis direction in the vicinity of the magnetic body.
Figure 36:
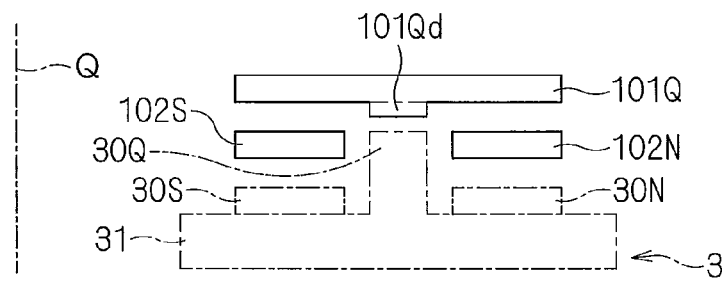
FIG. 36 shows a cross-section at a position XXXVI-XXXVI of FIG. 35.

In a case where the stator 3 as described above is employed, the magnetic body 101Q desirably includes a projection which projects toward the stator 3 side for reducing a magnetic resistance between the magnetic body 101Q and the projection 30Q. FIG. 35 is a plan view of the rotor 1 including a projection 101Qd, which is viewed from the rotation axis direction in the vicinity of the magnetic body 101Q. FIG. 36 is a cross-sectional view showing a cross-section in the circumferential direction at a position XXXVI-XXXVI of FIG. 35. The projections 30Q and 101Qd essentially reduce the magnetic resistance between the magnetic body 101Q and the stator 3.

Note that if the magnetic ring 101Qb and the magnetic ring 102S are coupled with the bridge B shown in FIG. 13, they can be essentially coupled to each other while being magnetically separating from each other. Alternatively, the magnetic body 101Q may be coupled to the magnetic plates 101N and 101S in the circumferential direction by a thin magnetic body. Still alternatively, the magnetic ring 101Qb may be coupled to the magnetic plates 101N and 101S in the radial direction by a thin magnetic body. Further, the magnetic body 101Q, the magnetic plates 101N and 101S, and the magnetic rings 102N, 102S and 101Qb may be integrally molded in a temporally-fixed state.

Third Embodiment

Figure 37:
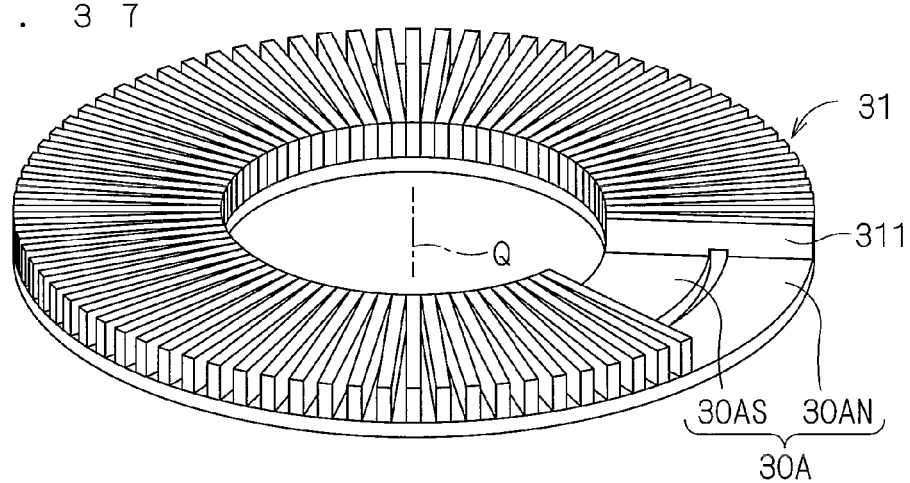
FIG. 37 is a perspective view showing a first modification of the stator.

In the present embodiment, a desired modification of the stator 3 will be described. FIG. 37 is a perspective view showing a first modification of the stator 3.

The yoke 31 short-circuits the permanent magnet 30A on a side opposite to the magnetic pole surfaces 30N and 30S, and accordingly causes the magnetic flux to flow in the rotation axis direction and the radial direction therein. Therefore, electromagnetic steel plates 311 may be laminated in the circumferential direction to form the yoke 31.

However, the above-mentioned configuration causes gaps which extend in the radial direction between the electromagnetic steel sheets 311. Therefore, the yoke 31 may be formed of a wound core or electromagnetic steel plates laminated in the axis direction. In this case, a flow of the magnetic flux in the radial direction passes through a minute air gap between the laminated layers. However, there is hardly any change in magnetic flux of the yoke 31, and accordingly a low magnetic permeability does not pose a serious problem. In addition, iron loss is not increased.

The yoke 31 may be formed of a dust core. The dust core has a characteristic that its hysteresis loss is large though its eddy current loss is small. The alternating magnetic flux is not generated in the yoke 31, and thus this characteristic slightly impedes the function of the yoke 31.

A larger force is required for pressing using a mold to form a dust core as an area for pressing down with the mold increases. Therefore, the yoke 31 may be formed to be divided in the circumferential direction. In this case, an air gap at a position at which divided parts are adjacent to each other extends in the radial direction. The magnetic flux does not pass through the air gap by crossing (that is, in the circumferential direction), and thus the air gap slightly impedes the function of the yoke 31.

Electromagnetic soft iron may be employed as a material of the yoke 31. Alternatively, an electromechanical component (such as a frame or a compression mechanism portion) made of iron may double as the yoke 31.

Figure 38:
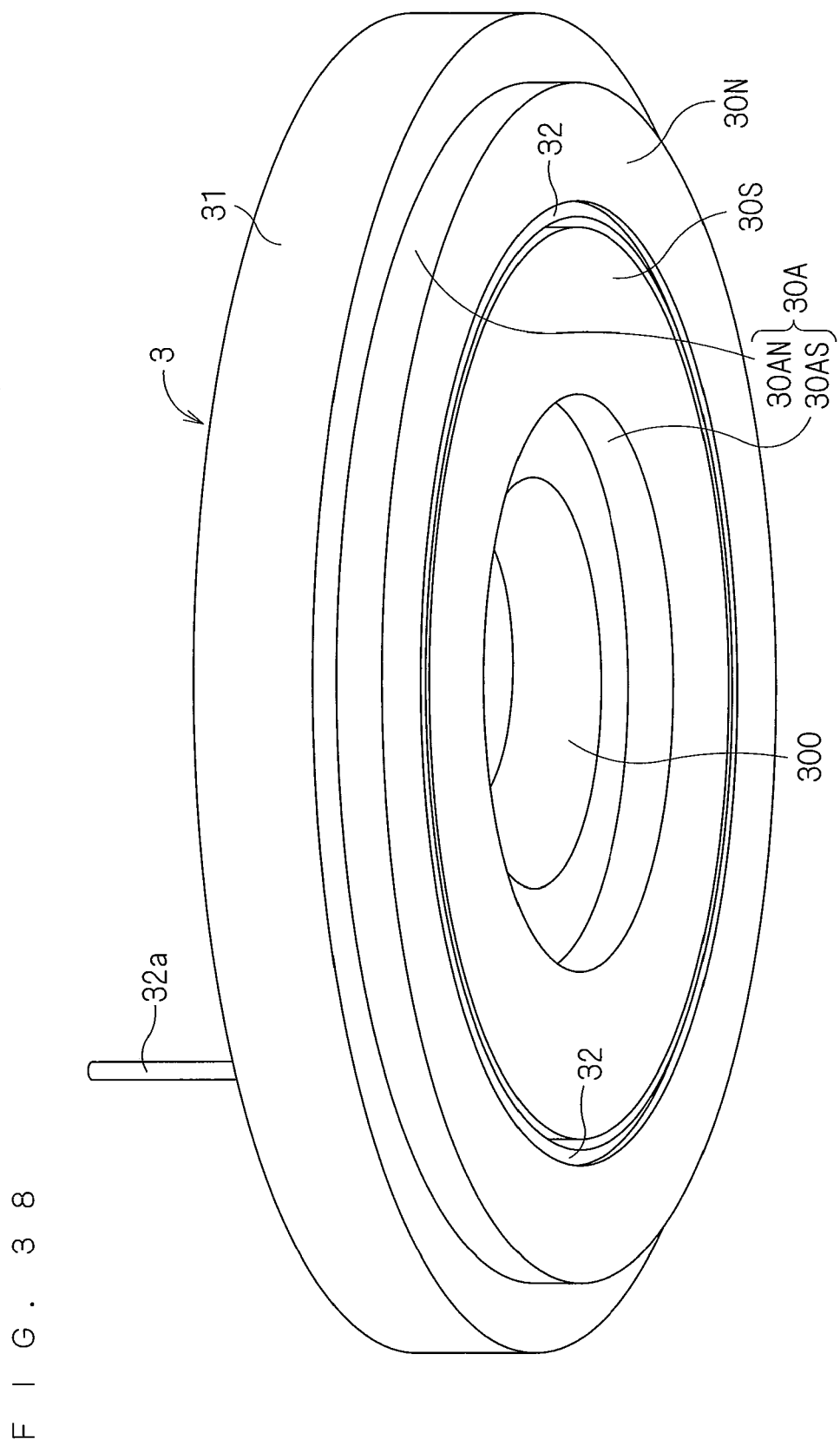
FIG. 38 is a perspective view showing a second modification of the stator.

FIG. 38 is a perspective view showing a second modification of the stator 3. The stator 3 includes a magnetic field coil 32 which is wound in the circumferential direction. Here, there is illustrated a case where the magnetic field coil 32 is disposed between the magnetic pole surfaces 30N and 30S, but may be disposed on the outer circumferential side of the magnetic pole surface 30N or the inner circumferential side of the magnetic pole surface 30S.

In a case where a bonded magnet is employed for the permanent magnets 30AN and 30AS, the magnetic field coil 32 may be embedded in a resin forming the bonded magnet.

An end 32a of the magnetic field coil 32 is drawn from the yoke 31 on the side opposite to the magnetic pole surfaces 30N and 30S. A current is caused to flow through the magnetic field coil 32 via the end 32a, and the current is adjusted, whereby adjustment of the magnetic field flux is facilitated.

For example, a rotary electric machine is employed as a motor, and when large torque is required for the motor, a current for generating a magnetic flux of the same polarity as the magnetic field flux is caused to flow for increasing the magnetic field flux. In a case where a motor is rotated at high speed, a current for generating a magnetic flux of a polarity opposite to the magnetic field flux is caused to flow to weaken the magnetic field flux (which is so-called field weakening), whereby induced voltage is reduced. In contrast, in a case where the motor is rotated at low speed, a current for generating a magnetic flux of the same polarity as the magnetic field flux is caused to flow to increase the magnetic field flux, whereby torque is increased.

This results in high-speed operation as well as low-speed operation with high efficiency, which is particularly suitable for an on-vehicle motor. When it is used as a generator, the magnetic field flux is adjusted in accordance with fluctuations in the number of revolutions, and thus a required voltage is generated irrespective of the number of revolutions, which is particularly suitable for an on-vehicle alternator. Alternatively, when it is used as a train motor, it is possible to weaken the magnetic field flux in a coasting operation in which relatively long drive is performed.

The magnetic field coil 32 may be used for magnetization after providing a magnetic body which is a material of the permanent magnets 30AN and 30AS. It goes without saying that the armature 2 is used together in the magnetization.

Figure 39:
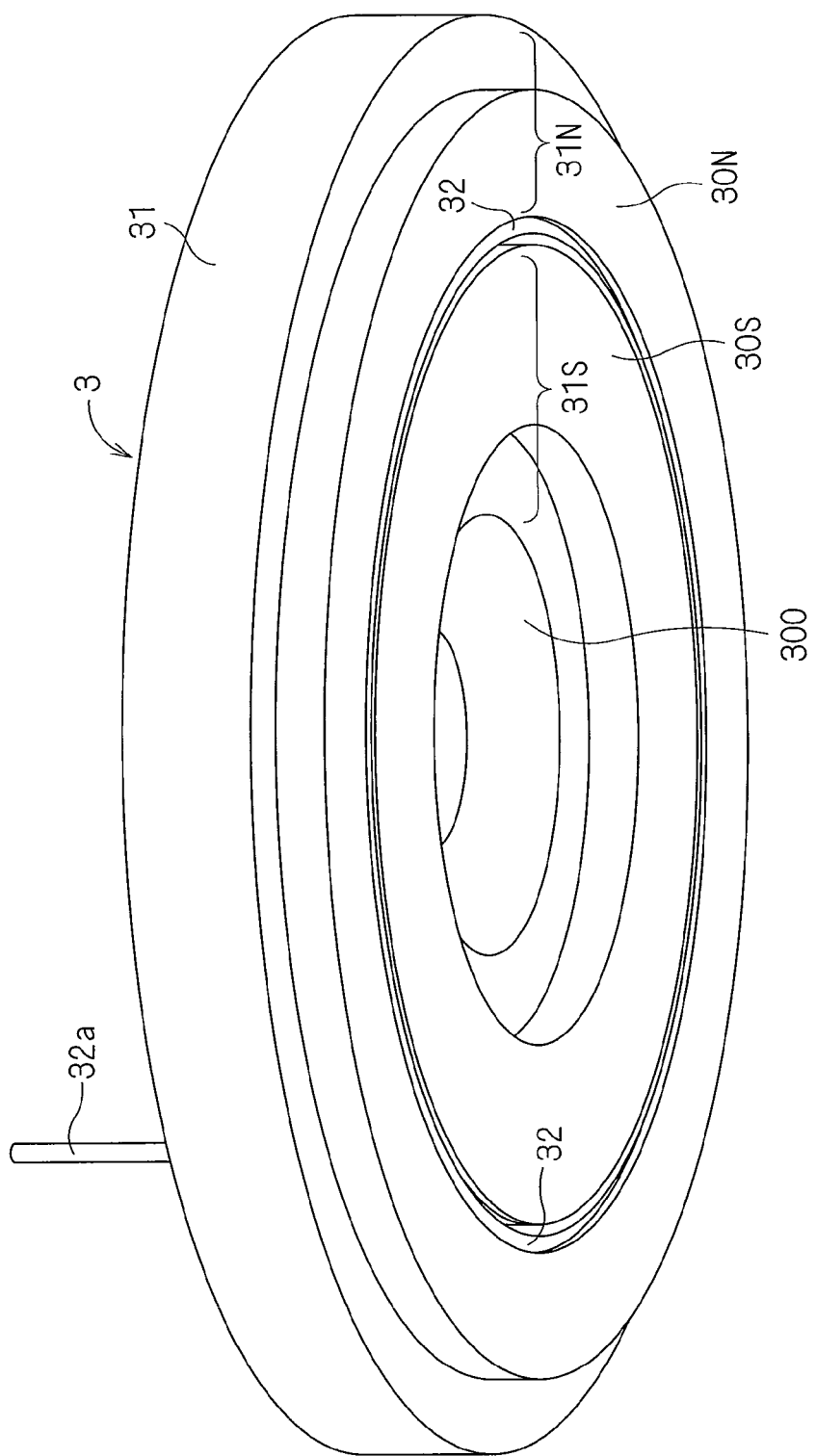
FIG. 39 is a perspective view showing a third modification of the stator.

FIG. 39 is a perspective view showing a third modification of the stator 3. The third modification has a configuration in which the permanent magnets 30AN and 30AS of the second modification may be replaced with magnetic bodies. That is, the stator 3 includes the magnetic field coil 32 and the yoke 31. The yoke 31 includes cores 31S and 31N which project toward the rotor 1 side, which sandwich the magnetic field coil 32 therebetween from the inner circumferential side and the outer circumferential side, respectively. The yoke 31 magnetically couples the cores 31N and 31S to each other on the side opposite to the rotor 1.

Note that in the present application, the terms yoke and core refer to a magnetic yoke and a magnetic core, respectively, unless particularly noted.

Surfaces of the cores 31N and 31S on the rotor 1 side function as the magnetic pole surfaces 30N and 30S, respectively, when a current is caused to flow through the magnetic field coil 32. Therefore, it is possible to adjust the magnetic field flux as in the second modification.

Moreover, in a case of low torque, it is possible to reduce cogging torque by weakening the magnetic field flux. In the case of a coasting operation during halts, cogging torque becomes zero because it does not function as a generator. For example, it rotates smoothly during the coasting operation when being employed as a train motor.

A permanent magnet is not used in this configuration, and thus it is suitable for such a rotary electric machine as used in a specific environment such as high temperature.

Figure 40:
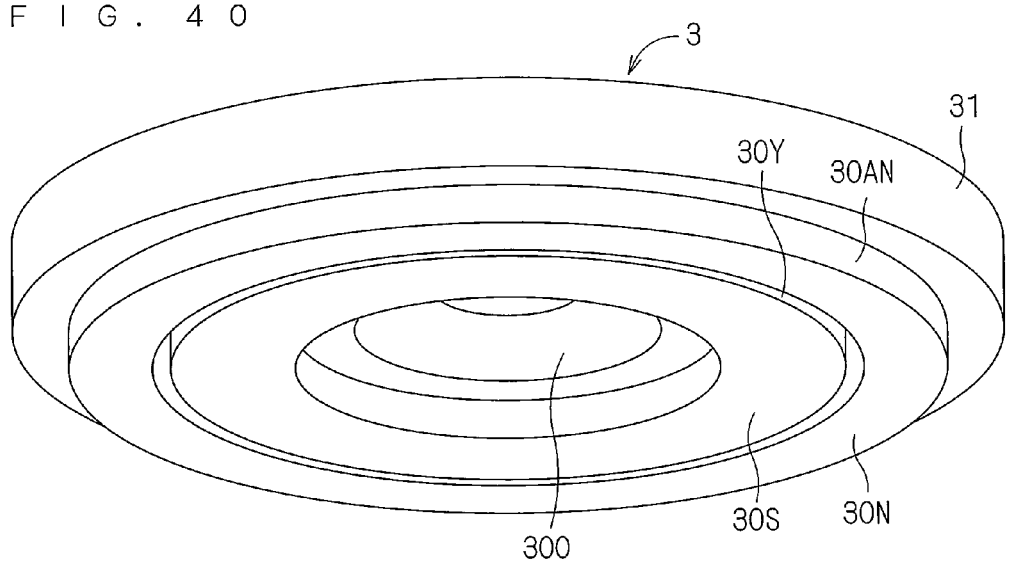
FIGS. 40 and 41 are perspective views showing a fourth modification of the stator.

FIG. 40 is a perspective view showing a fourth modification of the stator 3. The fourth modification has a configuration in which the permanent magnet 30AS of the stator 3 having the configuration shown in FIG. 1 is replaced with a core 30Y. The core 30Y is considered to constitute a part of the yoke 31 as a projection.

In the stator 3 having the configuration shown in FIG. 1, the permanent magnet 30A has both of the magnetic pole surfaces 30N and 30S. In contrast to this, in the fourth modification, the magnetic pole surface 30N is provided in one permanent magnet 30AN, and the magnetic pole surface 30S is provided as the surface of the core 30Y on the rotor 1 side. The core 30Y is magnetically coupled to the permanent magnet 30AN on the side opposite to the rotor 1.

Figure 41:
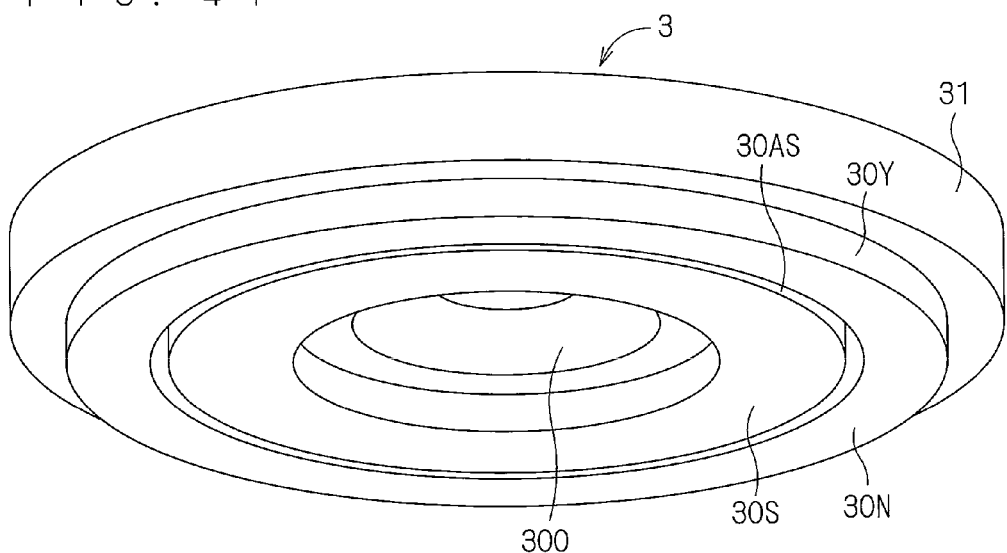

FIG. 41 is also a perspective view showing the fourth modification of the stator 3. In a configuration shown in FIG. 41, the permanent magnet 30AN of the stator 3 having the configuration shown in FIG. 1 is replaced with the core 30Y. Therefore, the magnetic pole surface 30S is provided in one permanent magnet 30AS, and the magnetic pole surface 30N is provided as the surface of the core 30Y on the rotor 1 side. The core 30Y is magnetically coupled to the permanent magnet 30AS on the side opposite to the rotor 1.

The number of permanent magnets used in the stator 3 can be reduced by employing the above-mentioned configuration. In addition, the permanent magnets are required to be magnetized in only one direction, which facilitates magnetization of permanent magnets using an air-core coil even after a rotary electric machine is assembled.

Figure 42:
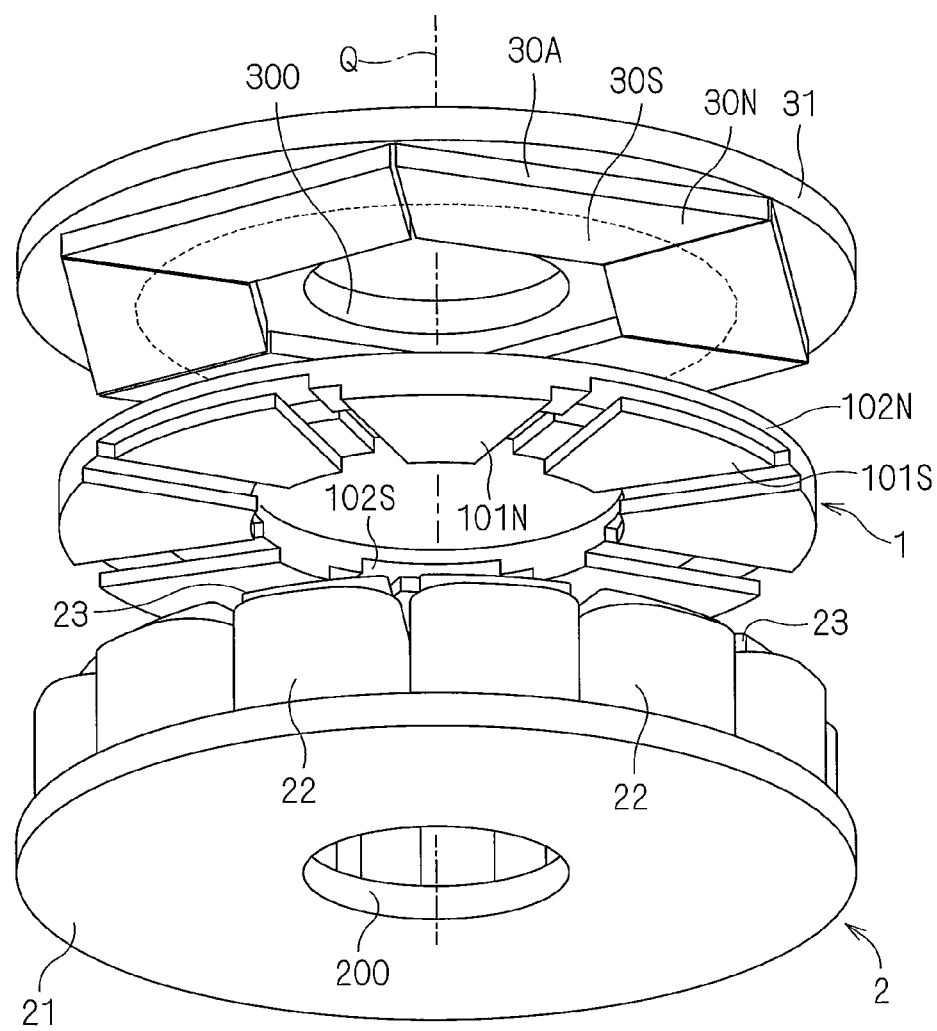
FIG. 42 is a perspective view showing a rotary electric machine in which a fifth modification of the stator is employed.

FIG. 42 is a perspective view showing a rotary electric machine in which a fifth modification of the stator 3 is employed. In the fifth modification, in the stator 3 having the configuration shown in FIG. 1, the permanent magnet 30A having an N pole and an S pole on the rotor 1 side is provided in place of the permanent magnets 30AN and 30AS which are provided separately from each other. In FIG. 42, the permanent magnet 30A has the magnetic pole surfaces 30N and 30S on the rotor 1 side. A boundary between the magnetic pole surface 30N and the magnetic pole surface 30S is indicated by a dotted line.

The yoke 31 may be omitted or may be formed of a non-magnetic body if the permanent magnet 30A as described above is employed. The permanent magnet 30A may be magnetized so that an inner side and an outer side of a disc-shaped magnet have magnetic poles different from each other. Such a form is achieved with ease in a case where the permanent magnet 30A is formed of a ferrite magnet or a bonded magnet.

The permanent magnet 30A may be divided into a plurality of pieces for the sake of manufacturing convenience. The division number is not particularly limited. The divided pieces of the permanent magnet 30A each have a fan-like shape or a trapezoidal shape. In particular, in a high-performance rare-earth sintered magnet, the trapezoidal shape is formed more easily in some cases. FIG. 42 illustrates a case where the permanent magnet 30A is divided into six trapezoidal-shaped pieces.

In order to prevent an eddy current from being generated particularly in the magnetic rings 102N and 102S of the rotor 1, an air gap generated at a position at which the divided pieces of the permanent magnet 30A are adjacent to each other is desirably as small as possible.

If the magnetic filed flux supplied to the magnetic rings 102N and 102S fluctuate depending on rotation of the rotor 1, an eddy current may be generated in the rotor 1. Therefore, the magnetic rings 102N and 102S are desirably opposed to the permanent magnet 30A on an inner side compared with a circle inscribed in an outer circumferential shape (hexagon in this case) of the permanent magnet 30A and on an outer side compared with a circle circumscribed about an inner circumferential shape (hexagon in this case) of the permanent magnet 30A.

Figure 43:
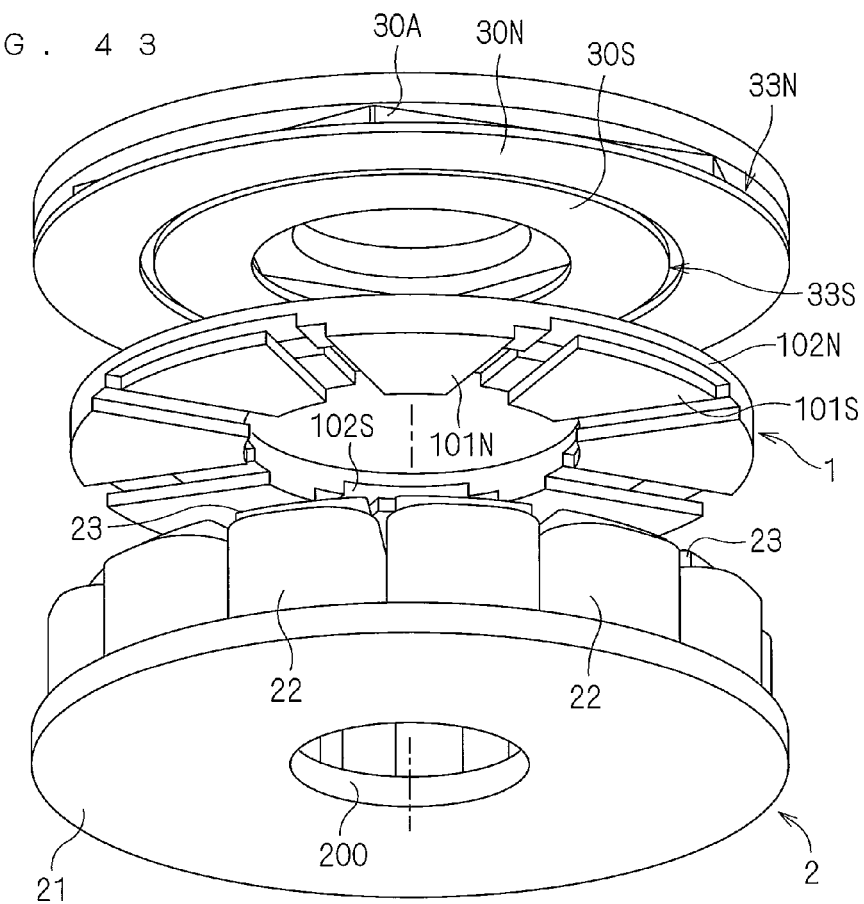
FIG. 43 is a perspective view showing a rotary electric machine in which a sixth modification of the stator is employed.

FIG. 43 is a perspective view showing a rotary electric machine in which a sixth modification of the stator 3 is employed. The sixth modification has a configuration in which auxiliary cores 33N and 33S are added to the fifth modification. The auxiliary core 33N is magnetically coupled to the magnetic pole surface 30N and is opposed to the magnetic ring 102N. The auxiliary core 33S is magnetically coupled to the magnetic pole surface 30S and is opposed to the magnetic ring 102S.

Even when the permanent magnet 30A is divided in the circumferential direction, the auxiliary cores 33N and 33S supply the rotor 1 with the magnetic field flux which is uniform in the circumferential direction. In addition, if the auxiliary cores 33N and 33S are caused to have a circular shape, they supply the rotor 1 with the magnetic field flux which is uniform in the circumference direction. Therefore, a possibility that an eddy current may be generated in the rotor 1 is lowered irrespective of an outer shape of the permanent magnet 30A, for example, even when the divided pieces are trapezoidal in shape.

Figure 44:
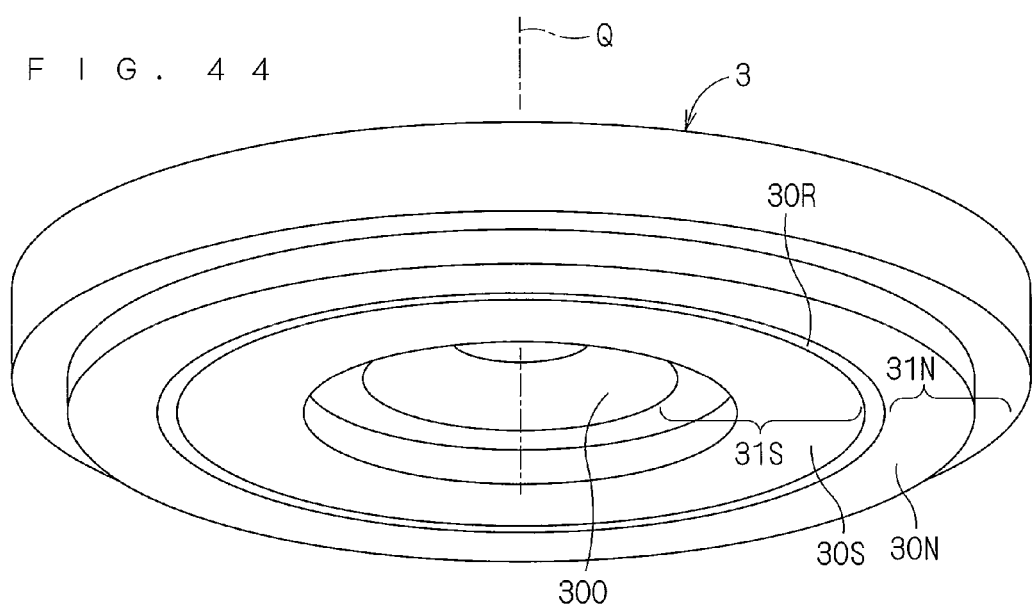

FIG. 44 and FIG. 45 are perspective views showing a seventh modification of the stator 3. FIG. 44 is the perspective view which is viewed with a tilt with respect to the rotation axis Q from the magnetic pole surfaces 30N and 30S side. FIG. 45 is the perspective view which is viewed with a tilt with respect to the rotation axis Q from the side opposite to the magnetic pole surfaces 30N and 30S. Further, FIG. 46 is a cross-sectional view showing a cross-section of the stator 3 at a position XLVI-XLVI of FIG. 45, which is parallel to the rotation axis Q.

The seventh modification has a configuration in which the magnetic field coil 32 of the second modification of the stator 3 is replaced with a permanent magnet 30R. The permanent magnet 30R has a circular shape around the rotation axis Q, and is magnetized in the radial direction. The cores 31N and 31S cover the permanent magnet 30R from an outer circumferential side and from an inner circumferential side, respectively.

The permanent magnet 30R is magnetized in the radial direction, and accordingly supplies the magnetic field flux to the cores 31N and 31S. The cores 31N and 31S show the magnetic pole surfaces 30N and 30S, respectively, on the rotor 1 side. Therefore, the magnetic flux generated by the permanent magnet 30R is supplied to the rotor 1 from the magnetic pole surfaces 30N and 30S. In FIG. 46, lines of magnetic force Φ of the magnetic field flux inside the cores 31N and 31S are schematically indicated by a dotted line.

Note that the magnetic pole surfaces 30N and 30S are desirably closer to the rotor 1 compared with the permanent magnet 30R for efficiently supplying the magnetic field flux to the rotor 1. More specifically, the cores 31N and 31S desirably project toward the rotor 1 compared with the permanent magnet 30R.

FIG. 47 is a perspective view showing a method of magnetizing the permanent magnet 30R. A circularly-shaped magnetization coil 81 is surrounded by a magnetization core 80. In the magnetization core 80, a gap 82 is open so as to extend in the circumferential direction on one side along an axis of the magnetization coil 81, which is the cores 31N and 31S side in this case.

The gap 82 is opposed to the cores 31N and 31S from a side opposite to the magnetic pole surfaces 30N and 30S. The gap 82 is disposed in a vicinity of a boundary between the cores 31N and 31S.

A circularly-shaped magnet material is disposed in advance by being sandwiched between the cores 31N and 31S from the outer circumferential side and the inner circumferential side, respectively. Then, the gap 82 is disposed as described above and a current is caused to flow through the magnetization coil 81. As a result, a magnetic flux for magnetization flows between a surface of the magnetization core 80 on the core 31N side and a surface on the core 31S side. Accordingly, the magnet material sandwiched between the cores 31N and 31S is magnetized in the radial direction, whereby the permanent magnet 30R is formed. That is, the permanent magnet 30R is easily obtained by magnetization from the side opposite to the rotor 1 even after a rotary electric machine is assembled.

FIG. 48 is a cross-sectional view showing a configuration for weakening the magnetic field flux in the seventh modification. FIG. 48 corresponds to the cross-section of FIG. 46. It is possible to weaken the magnetic field flux supplied from the magnetic pole surfaces 30N and 30S by causing a magnetic body 31B to be close to the cores 31N and 31S from the side opposite to the magnetic pole surfaces 30N and 30S. This is because, as indicated by lines of magnetic force Φ which are shown by a dotted line in FIG. 48, a part of the magnetic field flux flows in the magnetic body 31B on the side opposite to the magnetic pole surfaces 30N and 30S in a short-circuit manner.

Therefore, when a rotary electric machine is caused to rotate at high speed as a motor, the magnetic body 31B is caused to be close to the cores 31N and 31S, whereby field weakening is achieved. The magnetic body 31B is caused to be close as described above using a publicly-known actuator, for example, a servomotor.

Figure 49:
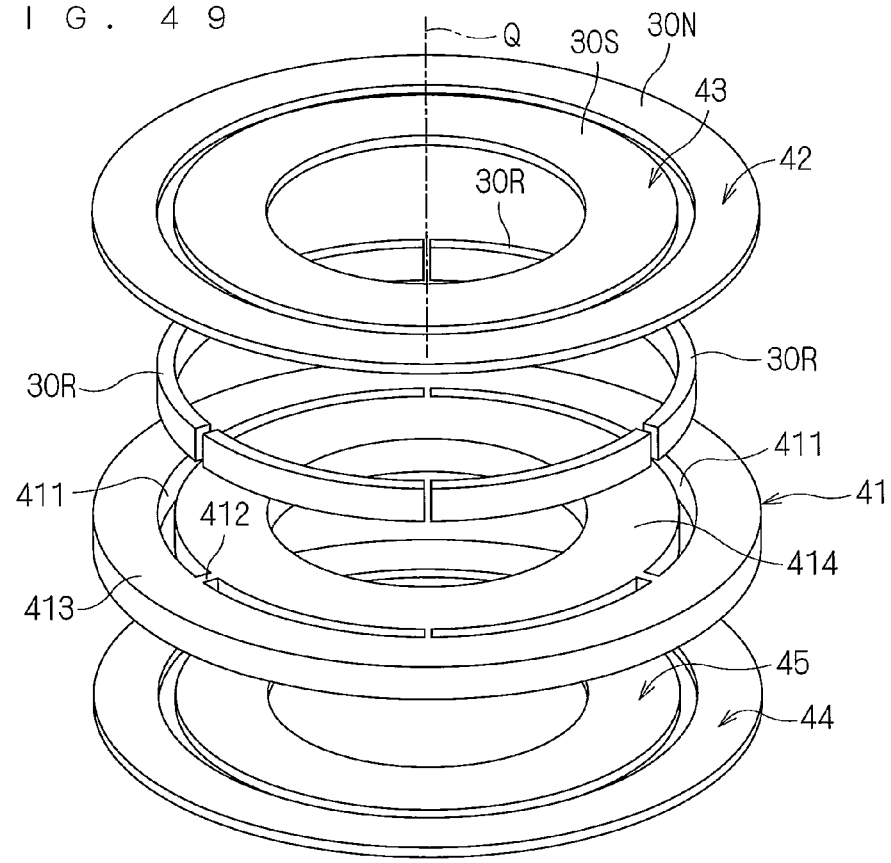
FIGS. 49 and 50 are perspective views showing an eighth modification of the stator.
Figure 50:
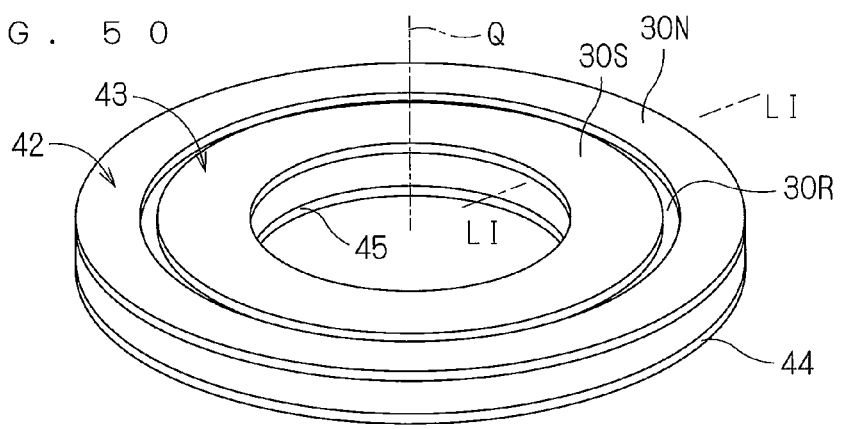
Figure 51:
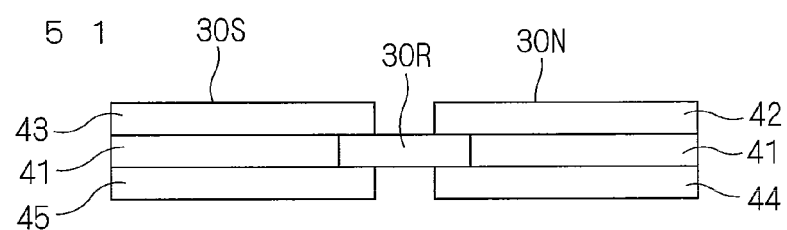
FIG. 51 shows a cross-section of the stator at a position LI-LI shown in FIG. 50.

FIG. 49 and FIG. 50 are perspective views showing an eighth modification of the stator 3. FIG. 49 and FIG. 50 are the perspective views with a tilt with respect to the rotation axis Q from the magnetic pole surfaces 30N and 30S side. In FIG. 49, they are disassembled along the rotation axis Q for easy understanding of a configuration thereof but, in actuality, they are disposed so as to be in contact with each other as shown in FIG. 50. FIG. 51 is a cross-sectional view showing a cross-section of the stator 3 at a position LI-LI shown in FIG. 50, which is parallel to the rotation axis Q.

In the eighth modification, the permanent magnet 30R magnetized in the radial direction is divided in the circumferential direction. For the sake of manufacturing convenience, there is assumed a case where it is difficult to manufacture the permanent magnet 30R to be integrally formed in a circular shape. Here, a case where each of divided ones has an arc shape is illustrated.

A magnetic holder 41 is provided with a hole 411. A non-magnetic holder 41 is provided with a rib 412, and the rib 412 couples a part 413 of the holder 41 on an outer circumferential side of the hole 411 and a part 414 of the holder 41 on an inner circumferential side of the hole 411 to each other. In other words, the hole 411 is surrounded by the rib 412, and the parts 413 and 414.

The ribs 412 are disposed at positions at which the permanent magnet 30R is divided, and thus the permanent magnet 30R is accommodated in the holes 411. In order to cause the rib 412 to essentially function as a magnetic barrier, a cross-section of the rib 412 with a normal being in the radial direction is made small to an extent that it is magnetically saturated with ease by the magnetic flux flowing in the cross-section. With such a configuration, positioning of the permanent magnet 30R is performed in the radial direction and the circumferential direction.

The holder 41 and the permanent magnet 30R accommodated in the hole 411 thereof are sandwiched between the circularly-shaped cores 42 and 43 and the circularly-shaped cores 44 and 45 along the rotation axis direction. Viewed from the center of the permanent magnet 30R, the cores 42 and 44 are disposed on the outer circumferential side, and the cores 43 and 45 are disposed on the inner circumferential side. The cores 42 and 43 show the magnetic pole surfaces 30N and 30S, respectively.

An outer circumferential edge of the core 43 and an outer circumferential edge of the core 45 sandwich an inner circumferential edge of the permanent magnet 30R therebetween, and an inner circumferential edge of the core 42 and an inner circumferential edge of the core 44 sandwich an outer circumferential edge of the permanent magnet 30R therebetween (see FIG. 51). With such a configuration, positioning of the permanent magnet 30R is performed in the rotation axis direction.

In addition, with such a configuration, the magnetic pole surfaces 30N and 30S become closer to the rotor 1 compared with the permanent magnet 30R, and thus the magnetic field flux is effectively supplied to the rotor 1.

The holder 41 and the cores 42 and 43 are composed of electromagnetic steel plates laminated in the rotation axis direction. Alternatively, electromagnetic soft iron may be employed as a material thereof. Ones which are made of electromagnetic soft iron and are not subjected to insulation may be laminated.

Figure 52:
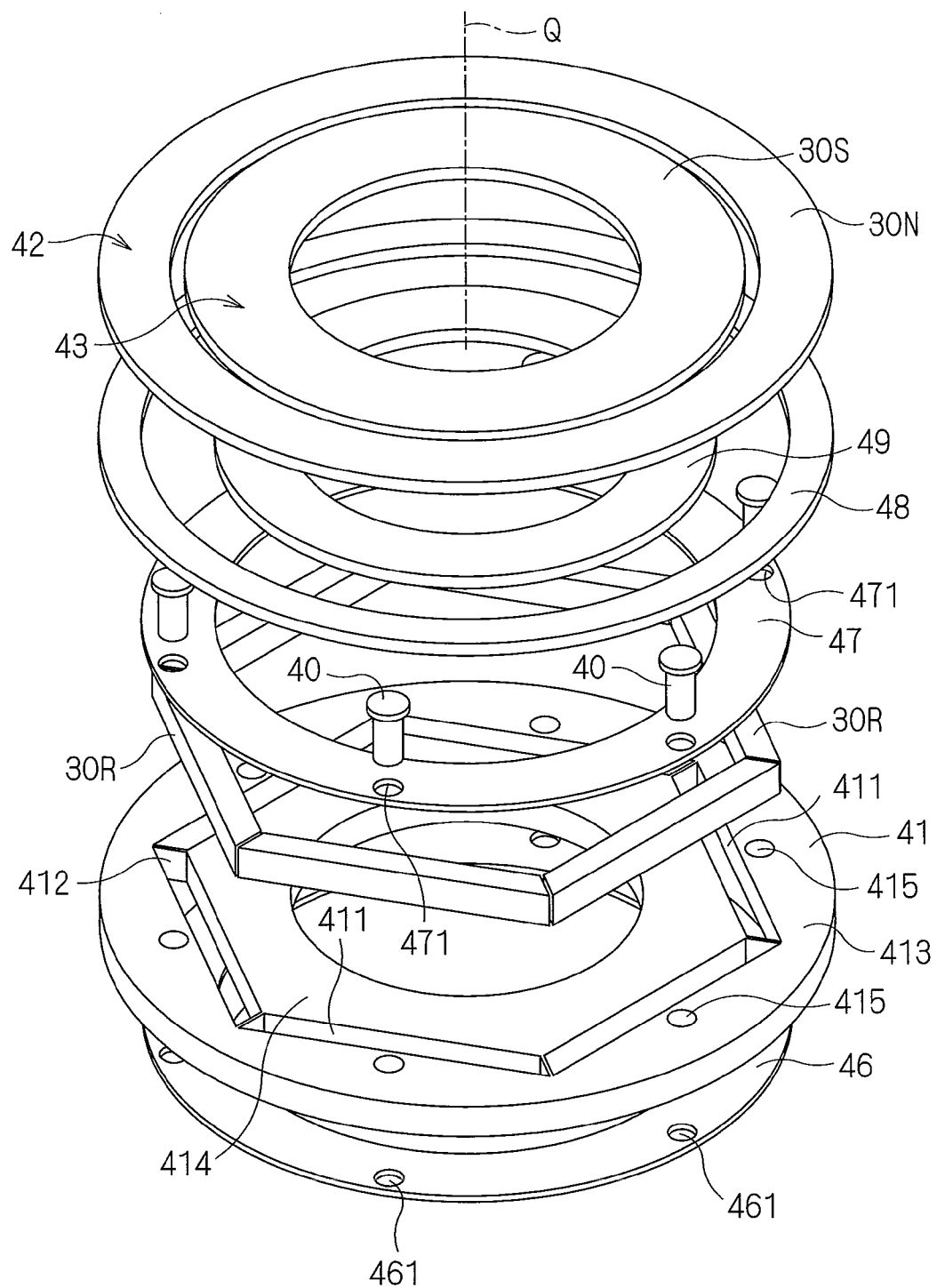
FIG. 52 is another perspective view showing the eighth modification of the stator.

FIG. 52 is also a perspective view showing the eighth modification. Here, a case where each of the divided permanent magnet 30R has a linear shape is illustrated. FIG. 52 is the perspective view with a tilt with respect to the rotation axis Q from the magnetic pole surfaces 30N and 30S side. In FIG. 52, they are disassembled along the rotation axis Q for easy understanding of a configuration thereof but, in actuality, they are disposed so as to be in contact with each other as described below.

Figure 53:
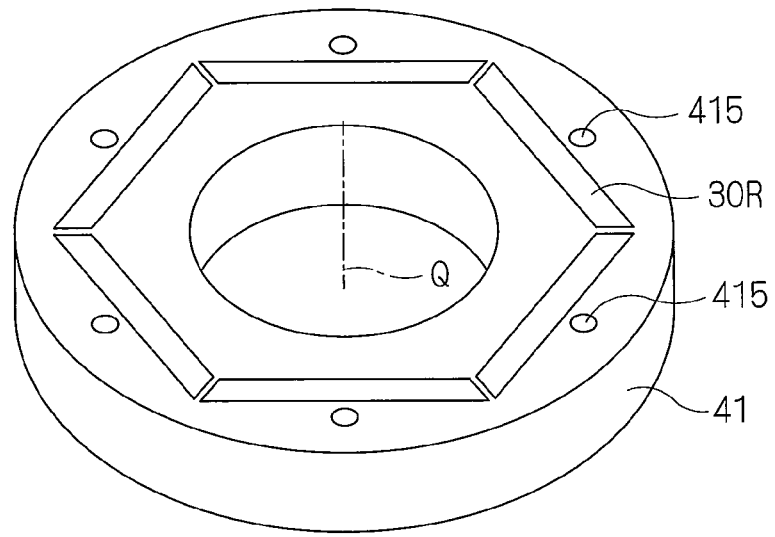
FIG. 53 is a perspective view showing a state in which permanent a magnet is accommodated in holes of a holder.

The magnetic holder 41 is provided with holes 415 for fastening in addition to the holes 411 for accommodating each of the divided permanent magnet 30R. The holes 415 are provided on the side closer to outer circumference compared with the holes 411. FIG. 53 is a perspective view showing a state in which the permanent magnet 30R is accommodated in the holes 411 of the holder 41.

Figure 54:
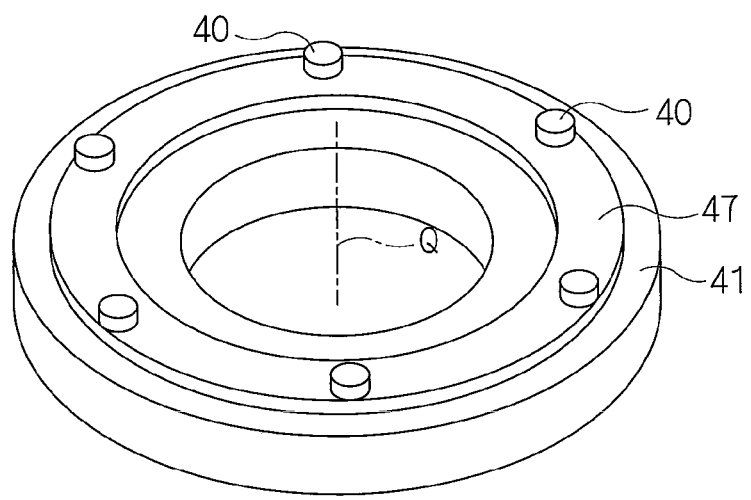
FIG. 54 is a perspective view showing a state in which a pair of fastening plates are coupled to each other.

Circularly-shaped fastening plates 46 and 47 sandwiches in the configuration shown in FIG. 53 from both sides along the rotation axis direction. Here, a case where the fastening plate 47 is disposed on the rotor 1 side is assumed. For example, the holes 415 have been subjected to thread cutting, fastening bodies 40 screwed therewith couple the fastening plates 46 and 47 to each other. As a result, positioning of the permanent magnet 30R in the rotation axis direction is performed in the holder 41. FIG. 54 is a perspective view showing a state in which a pair of fastening plates 46 and 47 are coupled to each other.

The fastening plates 46 and 47 are non-magnetic for preventing the magnetic field flux generated by the permanent magnet 30R from flowing therethrough in a short-circuit manner.

Circularly-shaped cores 48 and 49 are brought into contact with the configuration shown in FIG. 54 at parts 413 and 414 of the holder 41, respectively, from the rotor 1 side. Specifically, the cores 48 and 49 are disposed on the outer circumferential side and the inner circumferential side of the fastening plate 47, respectively.

Figure 55:
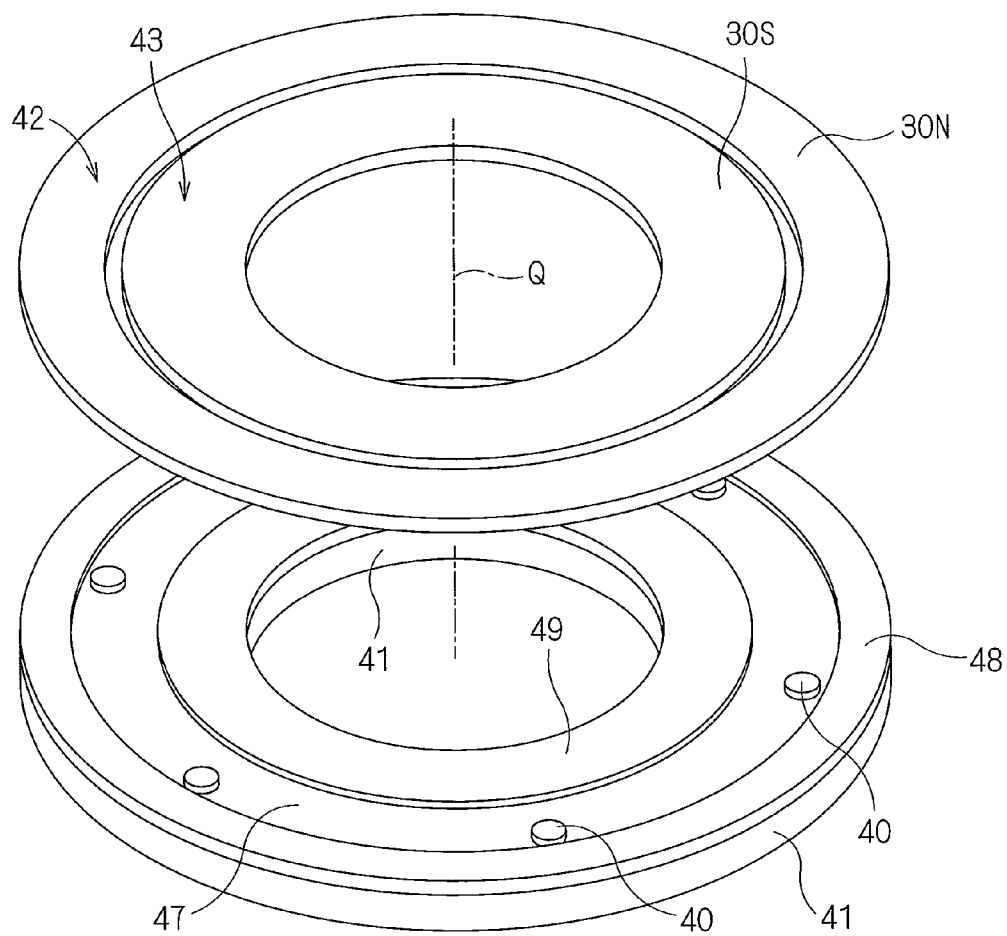
FIG. 55 is a perspective view showing a configuration in which cores are disposed and other cores.

FIG. 55 is a perspective view showing the configuration in which the cores 48 and 49 are disposed and the cores 42 and 43 are disassembled along the rotation axis direction. The cores 42 and 43 are brought into contact with the cores 48 and 49 from a side opposite to the holder 41. As a result, the magnetic pole surface of the permanent magnet 30R on the outer circumferential side and the magnetic pole surface 30N are magnetically coupled to each other through the cores 42 and 48 and the part 413. In addition, the magnetic pole surface of the permanent magnet 30R on the inner circumferential side and the magnetic pole surface 30S are magnetically coupled to each other through the cores 43 and 49 and the part 414. Accordingly, the magnetic flux generated in the permanent magnet 30R is supplied to the rotor 1 from the magnetic pole surfaces 30N and 30S.

With such a configuration, the magnetic pole surfaces 30N and 30S are closer to the rotor 1 compared with the permanent magnet 30R, and thus the magnetic field flux is effectively supplied to the rotor 1.

Fourth Embodiment

In the present embodiment, a modification in which a thrust force between the rotor 1 and the stator 3 is reduced will be described. Broadly speaking, in the modification described below, a radial component of the magnetic field flux flowing between the stator 3 and the rotor 1 is increased, and accordingly a rotational-axial component thereof is decreased.

The rotational-axial component of the magnetic field flux is decreased, and accordingly the thrust force is decreased.

Even though the radial component of the magnetic field flux is increased, magnetic field fluxes having different polarities flow in parallel to the radial direction. Accordingly, there are two types of attraction forces acting on the rotor 1 and the stator 3, which are opposite in direction to each other, and they cancel each other.

FIG. 56 to FIG. 71 are cross-sectional views each partially showing the rotor 1 and the stator 3, which show cross-sections parallel in the rotation axis direction and the radial direction. In those views, the rotation axis direction is parallel to an arrow A and is adopted in the vertical direction, while the radial direction is adopted in the horizontal direction.

Figure 56:
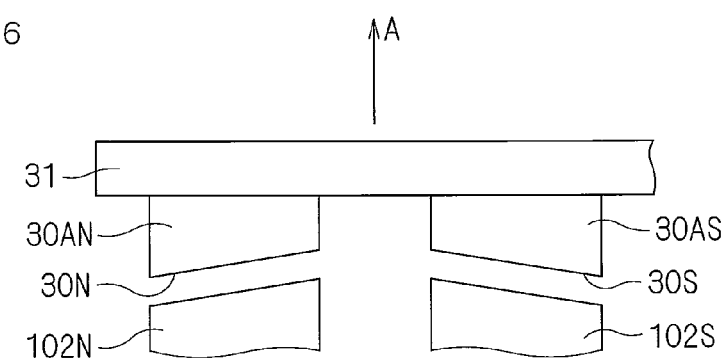

FIG. 56 illustrates a case where the permanent magnets 30AS and 30AS are employed, which have the magnetic pole surfaces 30N and 30S, respectively. Note that in a configuration shown in FIG. 56, the magnetic pole surfaces 30N and 30S are tilted in directions facing each other. The magnetic rings 102N and 102S are tilted so as to be opposed to each other. Therefore, the magnetic rings 102N and 102S approximately squarely face the magnetic pole surfaces 30N and 30S, respectively.

Compared with a case where the magnetic pole surface 30N and the magnetic ring 102N are perpendicular to the rotation axis direction, in the magnetic field flux flowing between the magnetic pole surface 30N and the magnetic ring 102N which are tilted as described above, a rotational-axial component thereof decreases. Therefore, in the attraction force acting between the magnetic pole surface 30N and the magnetic ring 102N, a component parallel to the rotation axis thereof decreases. In a similar manner, also in the attraction force acting between the magnetic pole surface 30S and the magnetic ring 102S, a component parallel to the rotation axis thereof decreases. Therefore, the thrust force acting between the rotor 1 and the stator 3 decreases.

The radial component of the attraction force acting between the magnetic pole surface 30N and the magnetic ring 102N is canceled out with the radial component of the attraction force acting between the magnetic pole surface 30S and the magnetic ring 102S, and hence a force acting between the rotor 1 and the stator 3 in the radial direction is neglected.

As described above, it is possible to reduce the thrust force acting between the rotor 1 and the stator 3 without increasing an unnecessary force in the radial direction.

Figure 57:
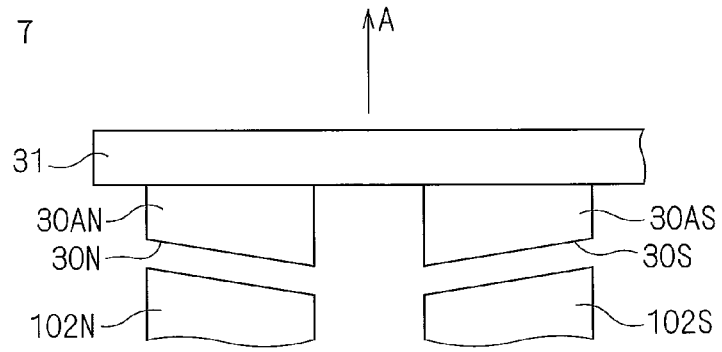

FIG. 57 shows a configuration in which all directions of tilt of the magnetic rings 102N and 102S and the magnetic pole surfaces 30N and 30S are reverse to the configuration shown in FIG. 56. That is, the magnetic pole surfaces 30N and 30S are tilted in directions so as to face each other. The magnetic rings 102N and 102S are tilted so as to face each other. Therefore, the magnetic rings 102N and 102S approximately squarely face the magnetic pole surfaces 30N and 30S, respectively, whereby the thrust force is reduced in the similar manner to the configuration shown in FIG. 56.

Figure 58:
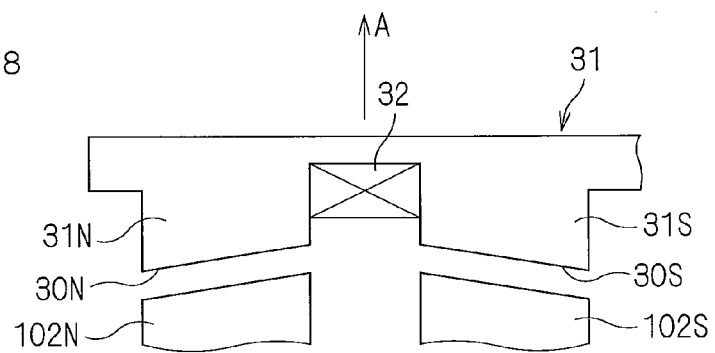
Figure 59:
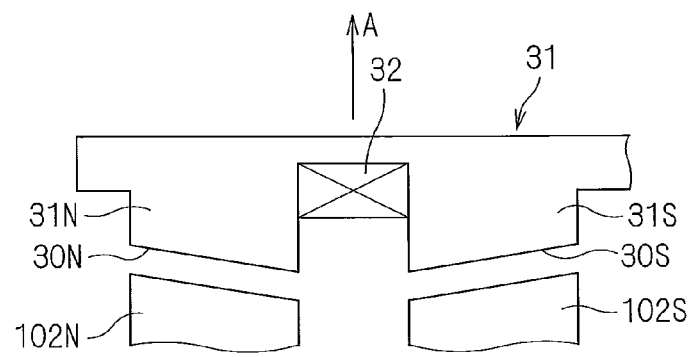

FIG. 58 and FIG. 59 each show configurations in which the magnetic rings 102N and 102S and the magnetic pole surfaces 30N and 30S are tilted while employing the third modification of the stator 3 (see FIG. 39). FIG. 58 and FIG. 59 correspond to FIG. 56 and FIG. 57, respectively, where the thrust force can be reduced.

Figure 60:
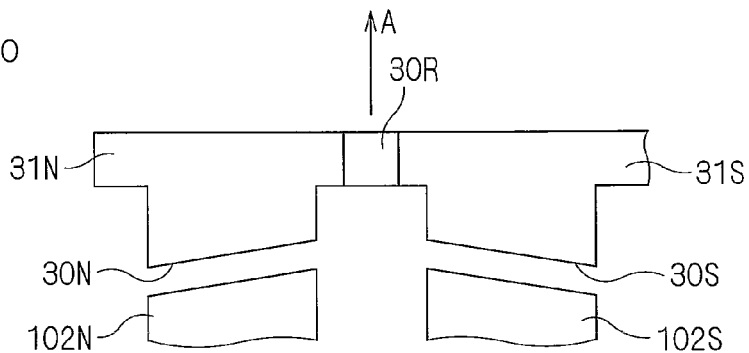
Figure 61:
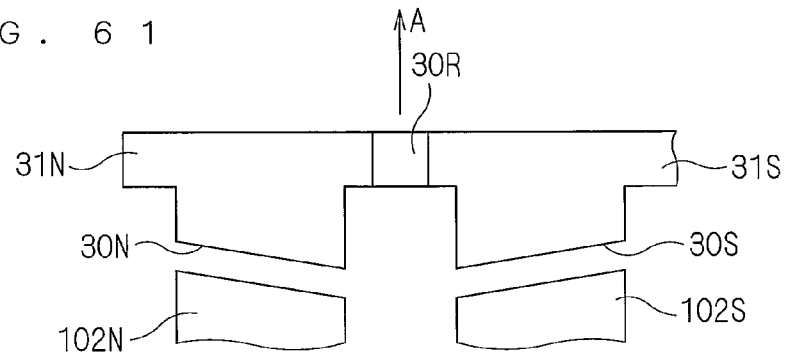

FIG. 60 and FIG. 61 each show configurations in which the magnetic rings 102N and 102S and the magnetic pole surfaces 30N and 30S are tilted while employing the seventh modification of the stator 3 (see FIG. 44). FIG. 60 and FIG. 61 correspond to FIG. 56 and FIG. 57, respectively, where the thrust force can be reduced.

Figure 62:
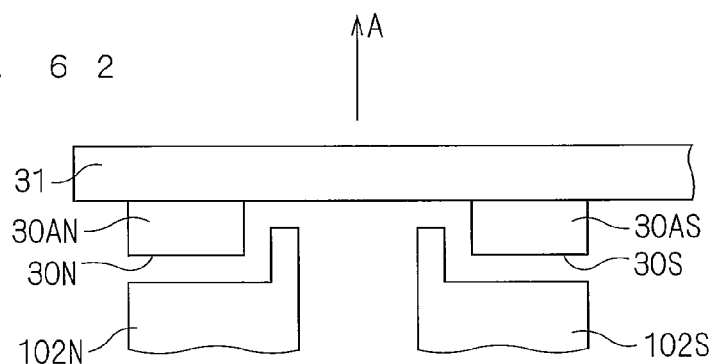
Figure 63:
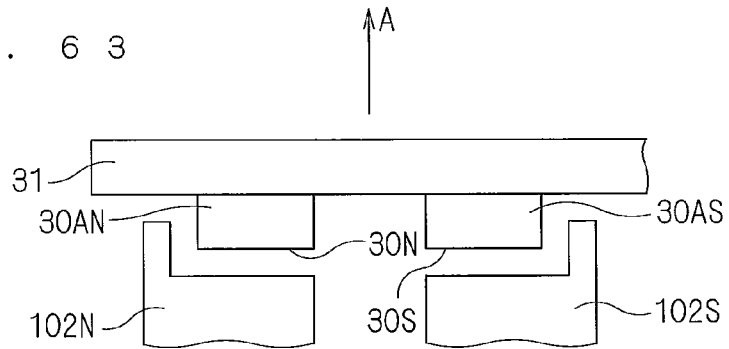

Also if the magnetic rings 102N and 102S on the magnetic pole surfaces 30N and 30S side are formed in step-like shapes in place of forming the magnetic rings 102N and 102S and the magnetic pole surfaces 30N and 30S to be tilted, the rotational-axial component of the magnetic field flux is reduced. FIG. 62 and FIG. 63 illustrate cases where the permanent magnets 30AN and 30AS are employed, and they have the magnetic pole surfaces 30N and 30S, respectively.

In the configuration shown in FIG. 62, the magnetic ring 102N projects toward the yoke 31 along the rotation axis direction on the inner circumferential side of the permanent magnet 30AN, while the magnetic ring 102S projects toward the yoke 31 along the rotation axis direction on the outer circumferential side of the permanent magnet 30AS. With such a configuration, the magnetic field flux spreads in the radial direction as closer to the magnetic ring 102N from the magnetic pole surface 30N, and also as closer to the magnetic ring 102S from the magnetic pole surface 30S. Accordingly, the rotational-axial component of the magnetic field flux is reduced.

Moreover, the direction in which the magnetic field flux spreads in the radial direction from the magnetic pole surface 30N toward the magnetic ring 102N is, when viewed from the magnetic pole surface 30N, the inner circumferential side. In addition, the direction in which the magnetic field flux spreads in the radial direction from the magnetic pole surface 30S toward the magnetic ring 102S is, when viewed from the magnetic pole surface 30S, the outer circumferential side. Accordingly, even with the above-mentioned configuration, the attraction force acting between the magnetic pole surface 30N and the magnetic ring 102N is compensated with the attraction force acting between the magnetic pole surface 30S and the magnetic ring 102S.

In the configuration shown in FIG. 63, the magnetic ring 102N projects toward the yoke 31 along the rotation axis direction on the outer circumferential side of the permanent magnet 30AN, while the magnetic ring 102S projects toward the yoke 31 along the rotation axis direction on the inner circumferential side of the permanent magnet 30AS. Also with such a configuration, an effect similar to that of the configuration shown in FIG. 62 is achieved.

Figure 64:
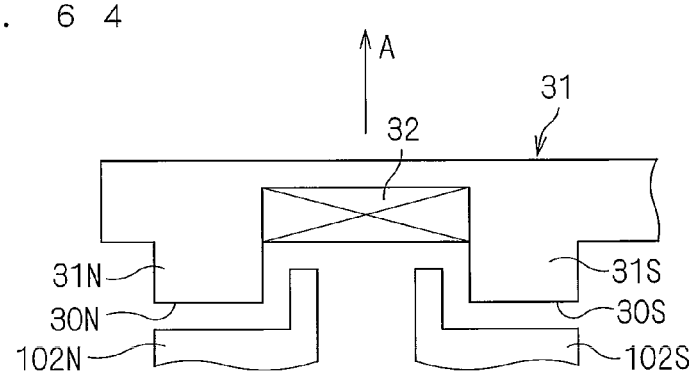
Figure 65:
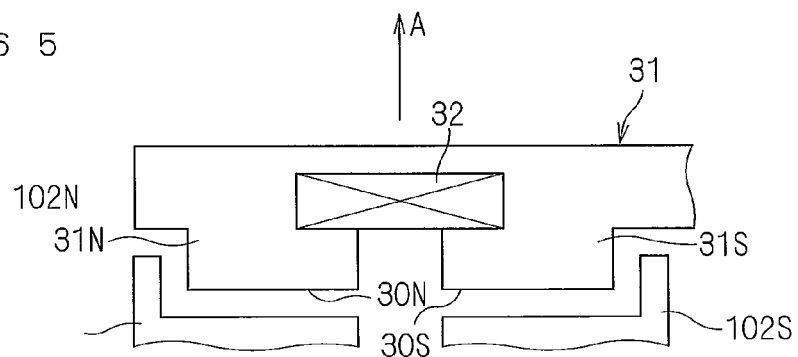

FIG. 64 and FIG. 65 each show configurations in which the magnetic rings 102N and 102S on the magnetic pole surfaces 30N and 30S side are formed in a step-like shape while employing the third modification of the stator 3. FIG. 64 and FIG. 65 correspond to FIG. 62 and FIG. 63, respectively, where the thrust force can be reduced.

In the eighth modification of the stator 3 (see FIG. 49 to FIG. 55), it is aimed to cause the magnetic pole surfaces 30N and 30S to be closer to the rotor 1 compared with the permanent magnet 30R, to thereby effectively supply the magnetic field flux to the rotor 1. However, from the viewpoint of reducing the rotational-axial component of the magnetic field flux, the permanent magnet 30R is desirably caused to project from the magnetic pole surfaces 30N and 30S.

Figure 66:
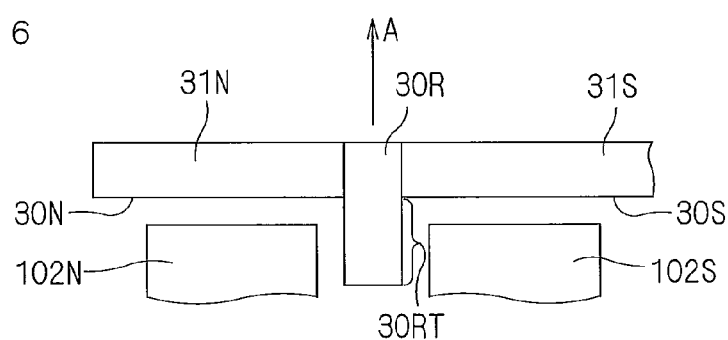

FIG. 66 shows a configuration in which the permanent magnet 30R is caused to project toward the rotor 1 side along the rotation axis direction. A part 30RT of the permanent magnet 30R projects from the cores 31N and 31S. The permanent magnet 30R is magnetized in the radial direction, and thus the magnetic field flux flows from the part 30RT in the radial direction. Accordingly, when this part is sandwiched between the magnetic rings 102N and 102S from both sides, the radial component of the magnetic field flux is increased, which reduces the rotational-axial component of the magnetic field flux.

There is also conceivable a case where shapes of the permanent magnets 30AN and 30AS are difficult to be processed and the magnetic pole surfaces 30N and 30S are difficult to be tilted with respect to the rotation axis direction. For example, there is a case where cross-sections of the permanent magnets 30AN and 30AS which are perpendicular to the circumferential direction are limited to a rectangle. In such a case, the following techniques are employed. First, as a simple one, it is conceivable to provide holes supporting the permanent magnets 30AN and 30AS to the yoke 31, with a tilt with respect to the rotation axis direction. As a result, the permanent magnets 30AN and 30AS are held while being tilted, and accordingly the magnetic pole surfaces 30N and 30S shown by the permanent magnets 30AN and 30AS themselves are tilted with respect to the rotation axis direction.

Figure 67:
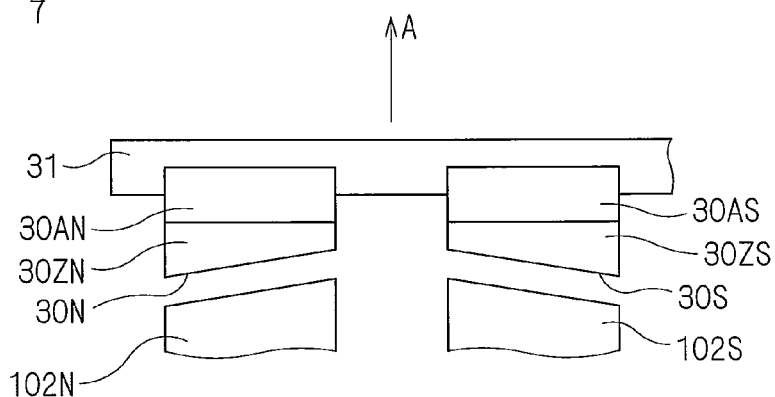
Figure 68:
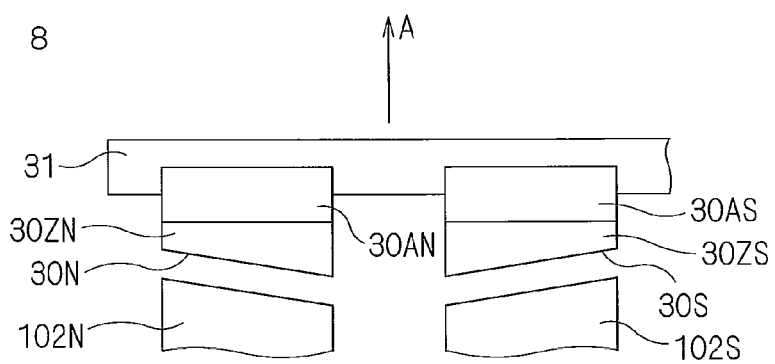

Alternatively, as shown in FIG. 67 and FIG. 68, there are provided auxiliary cores 30ZN and 30ZS which cover the permanent magnets 30AN and 30AS from the rotor 1 side and show the magnetic pole surfaces 30N and 30S on the rotor 1 side, respectively. If the auxiliary cores 30ZN and 30ZS are formed of, for example, a dust core, the magnetic pole surfaces 30N and 30S which are tilted as described above are easily provided thereto. FIG. 67 and FIG. 68 correspond to FIG. 56 and FIG. 57, respectively.

Figure 69:
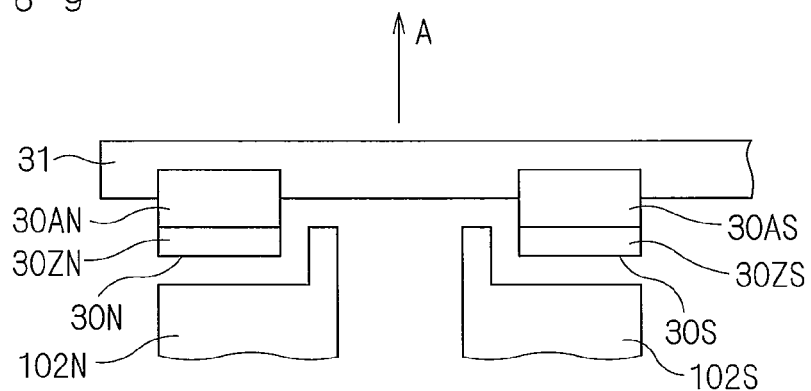
Figure 70:
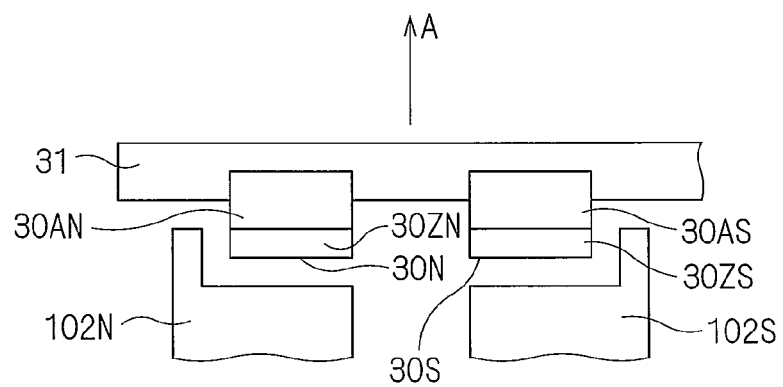

In a case where the magnetic pole surfaces 30N and 30S need not to be tilted, the permanent magnets 30AN and 30AS may be covered with the auxiliary cores 30ZN and 30ZS. FIG. 69 and FIG. 70 correspond to the configurations shown in FIG. 62 and FIG. 63, respectively, which show the configurations in which the auxiliary cores 30ZN and 30ZS are provided.

FIG. 67 to FIG. 70 illustrate modes in which the permanent magnets 30AN and 30AS are partially embedded in the yoke 31 on the side opposite to the rotor 1. However, this does not mean that the embedding as described above is presupposed when the auxiliary cores 30ZN and 30ZS are provided.

Figure 71:
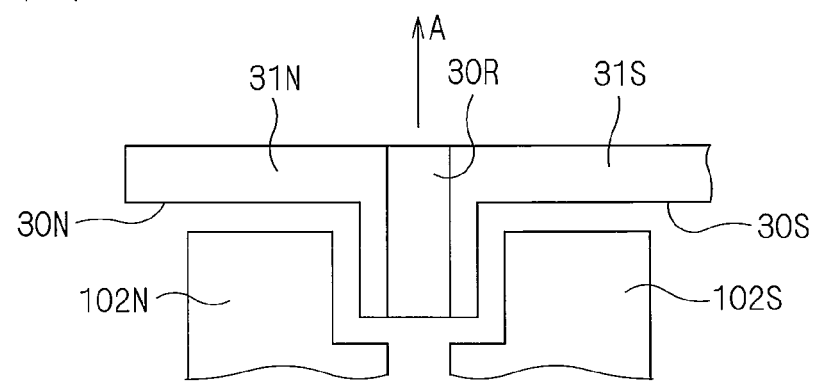

FIG. 71 corresponds to the configuration shown in FIG. 66, which illustrates a configuration in which a magnetic pole surface of the permanent magnet 30R is not exposed but covered with the cores 31N and 31S in the configuration shown in FIG. 66. Such a configuration is regarded as a configuration in which the permanent magnet 30R and the cores 31N and 31S in the vicinity thereof are caused to project toward the rotor 1 side to be interposed between the magnetic rings 102N and 102S. Alternatively, it is regarded as a configuration in which parts of the cores 31N and 31S, which parts are opposed to the magnetic rings 102N and 102S, are retracted to the side opposite to the rotor 1.

Combination of Modifications

The various modifications described in the respective embodiments above can be combined unless functions thereof are not impaired with each other. For example, it is possible to employ various modifications of the stator 3 independently of the modifications of the rotor 1.

Application to Compressor

Figure 72:
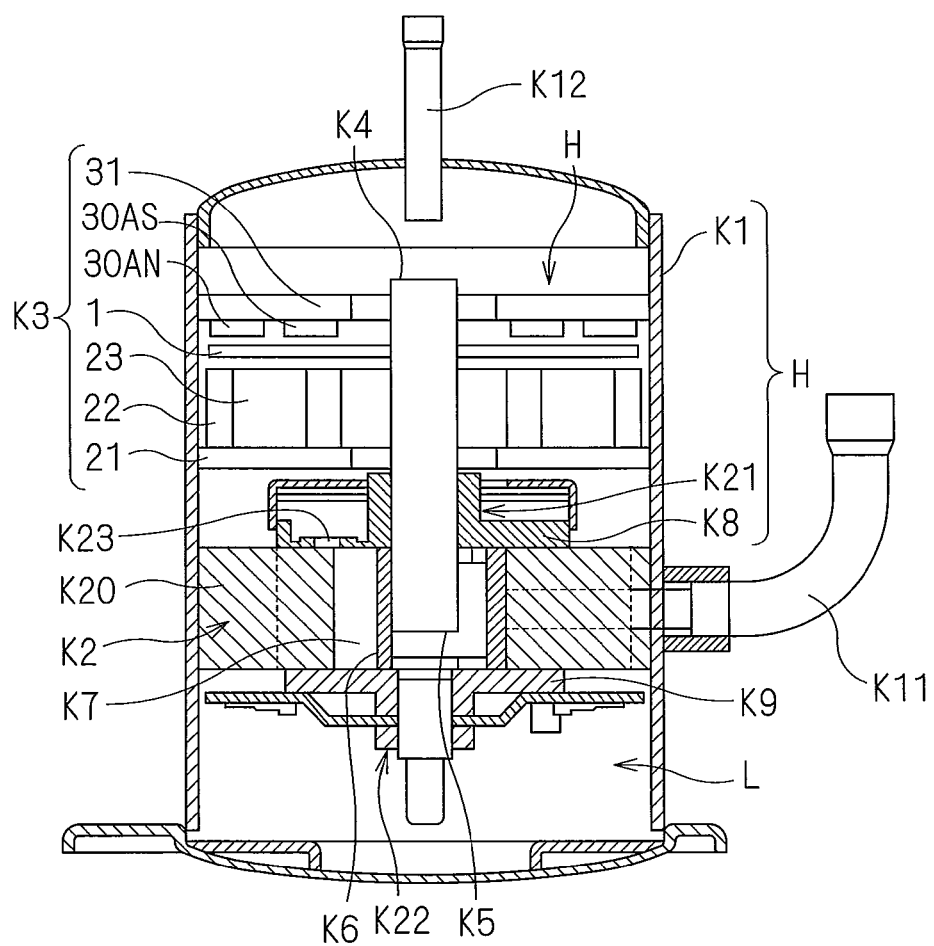
FIGS. 72 and 73 are longitudinal cross-sectional views of a compressor to which the above-mentioned rotary electric machine is applied.

FIG. 72 is a longitudinal cross-sectional view of a compressor in which the rotary electric machine described above is applied as a motor. The compressor shown in FIG. 72 is a high-pressure dome-type rotary compressor and, for example, carbon dioxide is used for a refrigerant thereof.

This compressor includes a hermetic container K1, a compression mechanism portion K2 and a motor K3. The compression mechanism portion K2 is disposed within the hermetic container K1. The motor K3 is disposed in the hermetic container K1 and on an upper side of the compression mechanism portion K2. Here, the upper side refers to an upper side along the central axis of the hermetic container K1 irrespective of whether or not the central axis of the hermetic container K1 is tilted with respect to a horizontal surface.

The motor K3 drives the compression mechanism portion K2 via a rotation shaft K4. The motor K3 has the configuration described in the embodiments above.

A suction pipe K11 is connected to a lateral side of the hermetic container K1 on a lower side, while a discharge pipe K12 is connected to an upper side of the hermetic container K1. A refrigerant gas (not shown) is supplied from the suction pipe K11 to the hermetic container K1 and is guided to an intake side of the compression mechanism portion K2. This rotary compressor is upright, and includes an oil tank provided at least in a bottom of the motor K3.

An inside of the hermetic container K1 is defined into a high-pressure region H and a low-pressure region L with the compression mechanism portion K2 sandwiched therebetween. The high-pressure region H is filled with a high-pressure refrigerant gas discharged from the compression mechanism portion K2. The motor K3 is disposed in the high-pressure region H.

The yokes 21 and 31 are disposed on a side closer to the outer circumference with respect to the rotation shaft K4 compared with the rotor 1, and are fixed to the hermetic container K1.

The compression mechanism portion K2 includes a cylinder-shaped main body K20, an upper end plate K8 and a lower end plate K9. The upper end plate K8 and the lower end plate K9 are mounted onto upper and lower opening ends of the main body K20, respectively. The rotation shaft K4 penetrates through the upper end plate K8 and the lower end plate K9, and is inserted into the inside of the main body K20. The rotation shaft K4 is rotatably supported by a bearing K21 provided to the upper end plate K8 and a bearing K22 provided to the lower end plate K9.

A crank pin K5 is provided to the rotation shaft K4 within the main body K20. A piston K6 is fitted with the crank pin K5 to be driven. A compression chamber K7 is formed between the piston K6 and a cylinder corresponding thereto. The piston K6 rotates in a state of being decentered or revolves, to thereby change a volume of the compression chamber K7.

Next, an operation of the above-mentioned rotary compressor will be described. The refrigerant gas is supplied from the suction pipe K11 to the compression chamber K7. The compression mechanism portion K2 is driven by the motor K3, whereby the refrigerant gas is compressed. The compressed refrigerant gas is transmitted, together with refrigerating machine oil (not shown), from the compression mechanism portion K2 to the upper side of the compression mechanism portion K2 via a discharge hole K23, and further via the motor K3 to be discharged from the discharge pipe K12 to an outside of the hermetic container K1.

The refrigerant gas moves within the motor K3 toward the upper side thereof together with the refrigerating machine oil. The refrigerant gas is guided to the upper side compared with the motor K3, whereas the refrigerating machine oil travels toward an inner wall of the hermetic container K1 by the centrifugal force of the rotor 1. The refrigerating machine oil adheres to the inner wall of the hermetic container K1 in a state of fine particles to be liquefied, and then returns to the upper stream side of a flow of the refrigerant gas of the motor K3 by the action of gravity.

Figure 73:
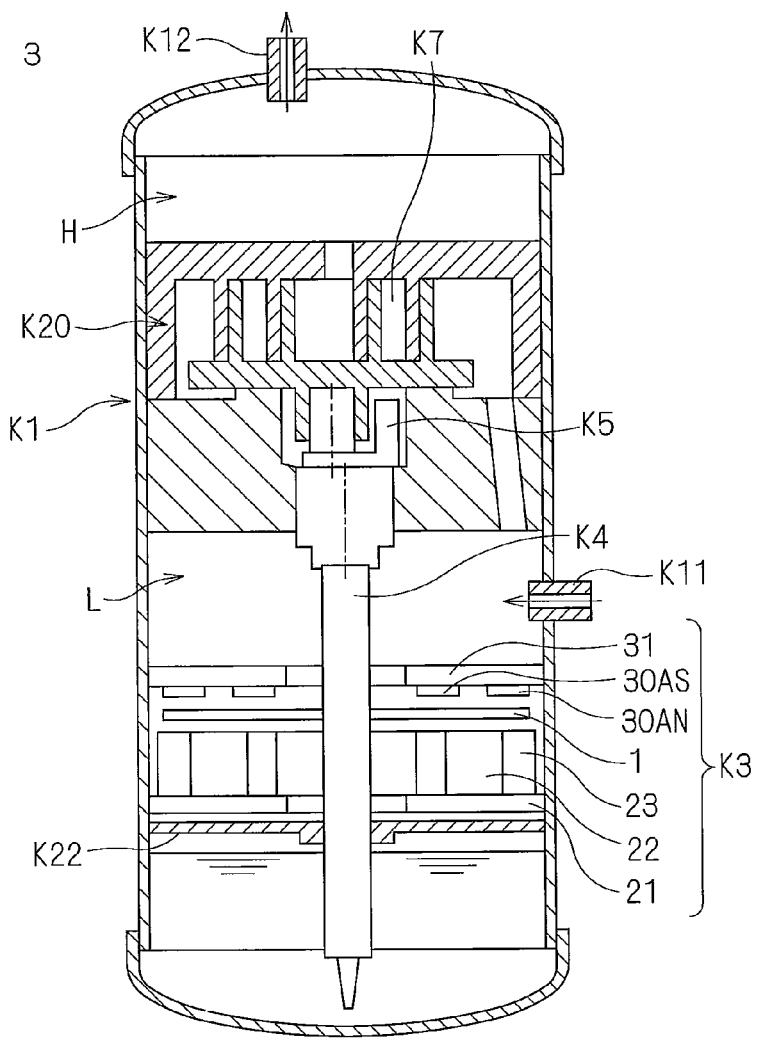

FIG. 73 is a longitudinal cross-sectional view of a compressor to which the motor according to the embodiment described above is applied. The compressor shown in FIG. 73 is a low-pressure dome-type scroll compressor and, for example, carbon dioxide is used for a refrigerant thereof.

Also in this compressor, the motor K3 is disposed in the hermetic container K1 and drives the compression mechanism portion K2 via the rotation shaft K4. The compression mechanism portion K2 has a scroll mechanism.

An inside of the hermetic container K1 is divided into the high-pressure region H and the low-pressure region L with the compression mechanism portion K2 being sandwiched therebetween. However, the motor K3 is disposed in the low-pressure region L. That is, the compression mechanism portion K2 is disposed on the upper side compared with the motor K3.

Application to Rotary Electric Machine Combined with Engine

Figure 74:
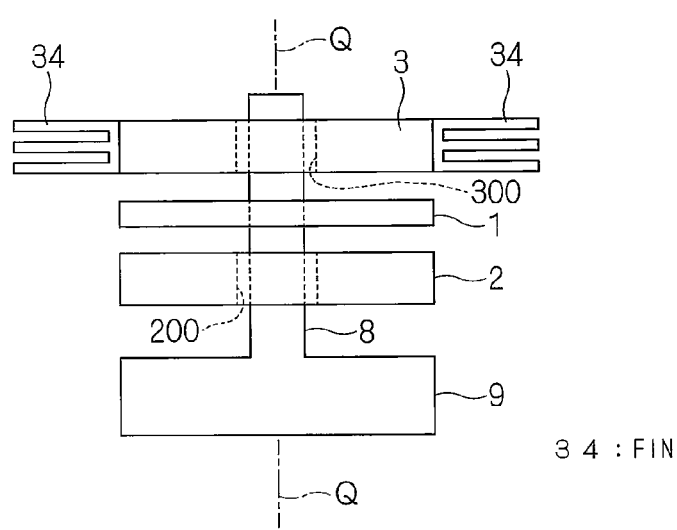
FIGS. 74 and 75 are side views illustrating a configuration of a rotating mechanism in which the rotary electric machine and an engine are combined.

FIG. 74 is a side view illustrating a configuration of a rotating mechanism in which the above-mentioned rotary electric machine including the permanent magnet 30A and an engine are combined, which shows a side view parallel to the rotation axis Q. The rotation shaft 8 is coupled to the rotor 1, and is caused to penetrate through the hole 300 of the stator 3 (for example, see FIG. 1, FIG. 2 and FIG. 8). The rotation shaft 8 is apart from the stator 3 in the hole 300 in the radial direction.

Similarly, the rotation shaft 8 passes through the hole 200 of the armature 2 (for example, see FIG. 1, FIG. 2 and FIG. 8) without rotation thereof being hampered.

The engine 9 is disposed on the side opposite to the rotor 1 with respect to the armature 2 along the rotation axis direction. In addition, the engine 9 is coupled to the rotation shaft 8, and provides and receives rotational movement with the rotation shaft 8.

With such a configuration, even if heat of the engine 9 is conducted to the rotation shaft 8, the heat is difficult to be conducted to the stator 3 because the rotation shaft 8 is apart from the stator 3. This is desirable in terms of making it difficult to generate heat demagnetization of the permanent magnet 30A provided in the stator 3.

The stator 3 is desirably provided with radiating fins 34 from the viewpoint of effectively performing heat radiation of the stator 3. The radiating fins 34 may be provided so as to extend in the radial direction from the stator 3 as illustrated in FIG. 74. Alternatively, the radiating fins 34 may be provided on the side opposite to the rotor 1.

Figure 75:
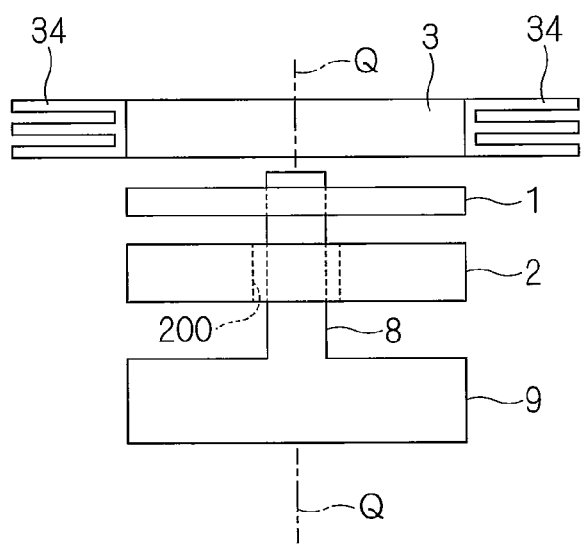

FIG. 75 is a side view illustrating a configuration in which the rotation shaft 8 is further apart from the stator 3 in the rotation axis direction in the configuration of FIG. 74. More specifically, an end of the rotation shaft 8 on the stator 3 side retracts toward the engine side in the rotation axis direction. Accordingly, heat conduction from the engine 9 to the stator 3 via the rotation shaft 8 is effectively reduced.

Figure 76:
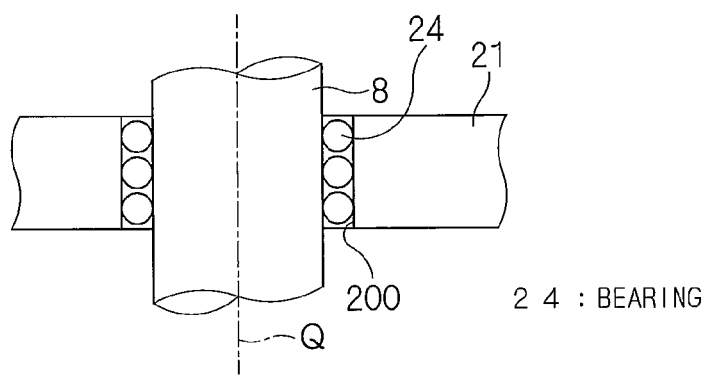
FIG. 76 is a cross-sectional view of a vicinity of a through hole.

The rotation shaft 8 is supported by the engine 9 and, in order to reduce shaft run-out of the rotation shaft 8, the rotation shaft 8 is desirably held without its rotation being hampered in the through hole 200 of the armature 2. FIG. 76 is a cross-sectional view of a vicinity of the through hole 200 of the armature 2 at a position including the rotation axis Q. Between the yoke 21 and the rotation axis 8, bearings 24 are provided in the through hole 200. For example, with such a configuration, the rotation shaft 8 is held in the through hole 200 of the armature 2 without its rotation being hampered.

While the invention has been shown and described in detail, the foregoing description is in all aspects illustrative and not restrictive. It is therefore understood that numerous modifications and variations can be devised without departing from the scope of the invention.

The invention claimed is:

1. An axial gap rotary electric machine, comprising:
   a rotor comprising a magnetic body and capable of rotating in a circumferential direction about a rotation axis;
   an armature including an armature coil opposed to said rotor on one side in a rotation axis direction parallel to said rotation axis; and
   a stator interlinking said armature coil with a magnetic field flux by supplying said rotor with said magnetic field flux on another side in said rotation axis direction, wherein said rotor includes:
   a first magnetic ring supplied with said magnetic field flux of a first polarity from said stator;
   a second magnetic ring disposed on a side closer to said rotation axis compared with said first magnetic ring and supplied with said magnetic field flux of a second polarity from said stator;
   a first magnetic plate circularly disposed in said circumferential direction so as to be opposed to said armature, magnetically separated from said second magnetic ring, and magnetically coupled to said first magnetic ring; and
   a second magnetic plate circularly disposed so as to be opposed to said armature with positions thereof in said circumferential direction alternating with the first magnetic plate, magnetically separated from said first magnetic ring and said first magnetic plate, and magnetically coupled to said second magnetic ring.

2. The axial gap rotary electric machine according to claim 1, wherein:
   a side opposite to said rotation axis of said first magnetic plate is coupled to said first magnetic ring and extends in a radial direction so as to reach said armature side of said second magnetic ring; and
   said rotation axis side of said second magnetic plate is coupled to said second magnetic ring and extends so as to reach said armature side of said first magnetic ring.

3. The axial gap rotary electric machine according to claim 1, wherein said stator includes:
   a magnetic field coil wound in said circumferential direction, for generating said magnetic field flux; and
   a magnetic field yoke sandwiching said magnetic field coil between an inner circumferential side and an outer circumferential side thereof, which are coupled to each other on a side opposite to said rotor.

4. The axial gap rotary electric machine according to claim 1, wherein said stator includes:
   a first magnetic pole surface supplying said first magnetic ring with said magnetic field flux of said first polarity;
   a second magnetic pole surface supplying said second magnetic ring with said magnetic field flux of said second polarity; and
   permanent magnets supplying said first magnetic pole surface and said second magnetic pole surface with said magnetic field flux.

5. The axial gap rotary electric machine according to claim 4, wherein:
   said permanent magnet has a circular shape around said rotation axis and is magnetized in the radial direction with respect to said rotation axis;
   said stator further includes a first core and a second core covering said permanent magnet from an outer circumferential side and an inner circumferential side, respectively; and
   said first core and said second core show said first magnetic pole surface and said second magnetic pole surface, respectively.

6. The axial gap rotary electric machine according to claim 5, wherein said stator further includes a third core for partially short-circuiting a magnetic flux generated from said permanent magnet by magnetically coupling said first core and said second core to each other from a side opposite to said rotor.

7. The axial gap rotary electric machine according to claim 4, wherein said permanent magnet shows at least any one of said first magnetic pole surface and said second magnetic pole surface.

8. The axial gap rotary electric machine according to claim 7, wherein said permanent magnet is circularly disposed in the circumferential direction.

9. The axial gap rotary electric machine according to claim 8, wherein:
   said permanent magnet shows both of said first magnetic pole surface and said second magnetic pole surface; and
   said stator further includes:
   a first auxiliary core disposed so as to be opposed to said first magnetic ring and magnetically coupled to said first magnetic pole surface; and
   a second auxiliary core disposed so as to be opposed to said second magnetic ring and magnetically coupled to said second magnetic pole surface.

10. The axial gap rotary electric machine according to claim 4, wherein:
    said permanent magnet shows any one of said first magnetic pole surface and said second magnetic pole surface; and
    said stator further includes a yoke magnetically coupled to said permanent magnet and showing another of said first magnetic pole surface and said second magnetic pole surface.

11. The axial gap rotary electric machine according to claim 4, wherein said stator further includes a magnetic field coil wound in said circumferential direction.

12. The axial gap rotary electric machine according to claim 4, wherein said rotor further includes a plurality of magnetic bodies circularly disposed so as to be opposed to said armature with positions thereof in said circumferential direction alternating with the first magnetic plate and the second magnetic plate, and magnetically coupled to each other while being magnetically separated from said first magnetic ring and said second magnetic ring.

13. The axial gap rotary electric machine according to claim 12, wherein said rotor further includes a magnetic ring coupling said plurality of magnetic bodies to each other in the circumferential direction on the side opposite to said rotation axis.

14. The axial gap rotary electric machine according to claim 12, wherein said rotor further includes a magnetic ring coupling said plurality of magnetic bodies to each other in the circumferential direction between said first magnetic ring and said second magnetic ring.

15. The axial gap rotary electric machine according to claim 12, wherein said rotor further includes a magnetic ring coupling said plurality of magnetic bodies to each other in the circumferential direction on the side opposite to said rotation axis.

16. The axial gap rotary electric machine according to claim 12, wherein said stator further includes a projection being in proximity to said plurality of magnetic bodies.

17. A rotary driving device, comprising:
the axial gap rotary electric machine according to claim 4;
a rotation shaft coupled to said rotor while being apart from said stator; and
an engine disposed on a side opposite to said rotor with respect to said armature along said rotation axis direction, and coupled to said rotation shaft to provide and receive rotational movement with said rotation shaft, wherein said armature is provided with a through hole causing said rotation shaft to penetrate therethrough without hampering rotation of said rotation shaft.

18. The rotary driving device according to claim 17, wherein an end of said rotation shaft on said stator side retracts to said engine side in said rotation axis direction with respect to said stator.

19. The rotary driving device according to claim 17, wherein said stator is provided with a heat radiation member.

* * * * *